United States Patent
Suzuoki et al.

(10) Patent No.: US 7,139,882 B2
(45) Date of Patent: Nov. 21, 2006

(54) MEMORY PROTECTION SYSTEM AND METHOD FOR COMPUTER ARCHITECTURE FOR BROADBAND NETWORKS

(75) Inventors: Masakazu Suzuoki, Tokyo (JP); Takeshi Yamazaki, Tokyo (JP)

(73) Assignee: Sony Computer Entertainment Inc. (JP)

(*) Notice: Subject to any disclaimer, the term of this patent is extended or adjusted under 35 U.S.C. 154(b) by 479 days.

(21) Appl. No.: 10/371,322

(22) Filed: Feb. 21, 2003

(65) Prior Publication Data

US 2003/0229765 A1 Dec. 11, 2003

Related U.S. Application Data

(63) Continuation of application No. 09/816,020, filed on Mar. 22, 2001, now Pat. No. 6,526,491.

(51) Int. Cl.
*G06F 12/00* (2006.01)

(52) U.S. Cl. ............... 711/153; 711/148; 711/173
(58) Field of Classification Search ............ 711/147, 711/153, 148, 173
See application file for complete search history.

(56) References Cited

U.S. PATENT DOCUMENTS

| | | | |
|---|---|---|---|
| 3,576,544 A | 4/1971 | Cordero et al. | |
| 4,037,214 A | 7/1977 | Birney et al. | |
| 4,332,009 A | 5/1982 | Gerson | |
| 4,422,088 A | 12/1983 | Gfeller | |
| 4,430,705 A | 2/1984 | Cannavino et al. | |
| 4,545,016 A | 10/1985 | Berger | |
| 4,589,064 A | 5/1986 | Chiba et al. | |
| 4,732,446 A | 3/1988 | Gipson et al. | |
| 4,782,443 A | 11/1988 | Matsumoto | |
| 4,903,234 A | 2/1990 | Sakuraba et al. | |
| 4,939,682 A | 7/1990 | Falk | |
| 4,954,982 A | 9/1990 | Tateishi et al. | |
| 5,037,173 A | 8/1991 | Sampsell et al. | |
| 5,056,000 A | 10/1991 | Chang | |

(Continued)

FOREIGN PATENT DOCUMENTS

EP 0077404 4/1983

(Continued)

OTHER PUBLICATIONS

Masakazu Suzuoki, Playstation 2 Yur Maikuropurosessesa Emotion Engine (Microprocessor Emotion Engine for PlayStation 2), bit, Kyoritsu Shuppan Col, Ltd., Jan. 1, 2000, pp. 11-18, vol. 32, No. 1.

(Continued)

*Primary Examiner*—Hiep T. Nguyen
(74) *Attorney, Agent, or Firm*—Lerner, David, Littenberg, Krumholz & Mentlik, LLP

(57) ABSTRACT

A computer architecture and programming model for high speed processing over broadband networks are provided. The architecture employs a consistent modular structure, a common computing module and uniform software cells. The common computing module includes a control processor, a plurality of processing units, a plurality of local memories from which the processing units process programs, a direct memory access controller and a shared main memory. A synchronized system and method for the coordinated reading and writing of data to and from the shared main memory by the processing units also are provided. A hardware sandbox structure is provided for security against the corruption of data among the programs being processed by the processing units. The uniform software cells contain both data and applications and are structured for processing by any of the processors of the network. Each software cell is uniquely identified on the network. A system and method for creating a dedicated pipeline for processing streaming data also are provided.

11 Claims, 42 Drawing Sheets

U.S. PATENT DOCUMENTS

| | | | |
|---|---|---|---|
| 5,093,879 A | 3/1992 | Bregman et al. | |
| 5,131,054 A | 7/1992 | Smith | |
| 5,144,691 A | 9/1992 | August et al. | |
| 5,159,700 A | 10/1992 | Reid et al. | |
| 5,216,633 A | 6/1993 | Weon et al. | |
| 5,268,973 A | 12/1993 | Jenevein | |
| 5,339,310 A | 8/1994 | Taniguchi | |
| 5,355,481 A | 10/1994 | Sluijter | |
| 5,410,727 A | 4/1995 | Jaffe et al. | |
| 5,487,146 A | 1/1996 | Guttag et al. | |
| 5,497,465 A | 3/1996 | Chin et al. | |
| 5,513,337 A | 4/1996 | Gillespie et al. | |
| 5,519,875 A | 5/1996 | Yokoyama et al. | |
| 5,581,777 A | 12/1996 | Kim et al. | |
| 5,619,671 A | 4/1997 | Bryant et al. | |
| 5,630,162 A | 5/1997 | Wilkinson et al. | |
| 5,652,853 A * | 7/1997 | Duvalsaint et al. | 711/203 |
| 5,724,551 A | 3/1998 | Greenstein et al. | |
| 5,729,712 A | 3/1998 | Whittaker | |
| 5,787,309 A | 7/1998 | Greenstein et al. | |
| 5,848,435 A | 12/1998 | Brant et al. | |
| 5,850,534 A | 12/1998 | Kranich | |
| 5,892,966 A | 4/1999 | Petrick et al. | |
| 5,900,019 A | 5/1999 | Greenstein et al. | |
| 5,940,870 A | 8/1999 | Chi et al. | |
| 5,991,858 A | 11/1999 | Weinlander | |
| 6,035,381 A | 3/2000 | Mita et al. | |
| 6,076,149 A | 6/2000 | Usami et al. | |
| 6,173,389 B1 | 1/2001 | Pechanek et al. | |
| 6,192,514 B1 | 2/2001 | Lurndal | |
| 6,209,065 B1 | 3/2001 | Van Doren et al. | |
| 6,212,605 B1 | 4/2001 | Arimilli et al. | |
| 6,219,073 B1 | 4/2001 | Suzuoki | |
| 6,289,434 B1 | 9/2001 | Roy | |
| 6,334,139 B1 | 12/2001 | Sakakura | |
| 6,336,187 B1 | 1/2002 | Kern et al. | |
| 6,341,338 B1 * | 1/2002 | Dennie | 711/147 |
| 6,360,303 B1 * | 3/2002 | Wisler et al. | 711/152 |
| 6,393,459 B1 | 5/2002 | Lurndal | |
| 6,421,736 B1 | 7/2002 | Breslau et al. | |
| 6,424,988 B1 | 7/2002 | Lurndal | |
| 6,467,012 B1 | 10/2002 | Alvarez et al. | |
| 6,477,170 B1 | 11/2002 | Lu et al. | |
| 6,480,941 B1 * | 11/2002 | Franke et al. | 711/153 |
| 6,510,496 B1 * | 1/2003 | Tarui et al. | 711/147 |
| 6,510,498 B1 * | 1/2003 | Holzle et al. | 711/153 |
| 6,567,839 B1 | 5/2003 | Borkenhagen et al. | |
| 6,643,708 B1 | 11/2003 | Francis et al. | |
| 6,647,208 B1 | 11/2003 | Kirby | |
| 6,668,317 B1 | 12/2003 | Bernstein et al. | |
| 6,694,380 B1 | 2/2004 | Wolrich et al. | |
| 6,766,350 B1 | 7/2004 | Moreau | |
| 6,799,207 B1 | 9/2004 | Corl, Jr. et al. | |
| 6,840,818 B1 | 1/2005 | Itou | |
| 6,848,109 B1 | 1/2005 | Kuhn | |
| 6,965,974 B1 * | 11/2005 | Bays et al. | 711/153 |
| 2002/0010807 A1 | 1/2002 | Multer et al. | |
| 2002/0016863 A1 | 2/2002 | Lurndal | |
| 2002/0052914 A1 * | 5/2002 | Zalewski et al. | 709/203 |
| 2002/0056037 A1 | 5/2002 | Wolrich et al. | |
| 2002/0078285 A1 | 6/2002 | Hofstee et al. | |
| 2002/0078308 A1 | 6/2002 | Altman et al. | |
| 2002/0087815 A1 | 7/2002 | Arimilli et al. | |
| 2004/0205747 A1 | 10/2004 | Bernstein et al. | |

FOREIGN PATENT DOCUMENTS

| | | |
|---|---|---|
| EP | 0 461 926 A2 | 12/1991 |
| EP | 0 730 237 A1 | 9/1996 |
| EP | 0 871 142 A2 | 10/1998 |
| GB | 2326254 | 12/1998 |
| JP | 54-012643 | 1/1979 |
| JP | 54-146555 | 11/1979 |
| JP | 56-111962 | 9/1981 |
| JP | 56-123051 | 9/1981 |
| JP | 57-006952 | 1/1982 |
| JP | 57-176456 | 10/1982 |
| JP | 61-180352 | 8/1986 |
| JP | 63-019058 | 1/1988 |
| JP | 64-012364 | 1/1989 |
| JP | 64-023342 | 1/1989 |
| JP | 01-217689 | 8/1989 |
| JP | 02-012361 | 1/1990 |
| JP | 02-057237 | 2/1990 |
| JP | 02-210542 | 8/1990 |
| JP | 04-288643 | 10/1992 |
| JP | 05-054009 | 3/1993 |
| JP | 05-151183 | 6/1993 |
| JP | 05-242057 | 9/1993 |
| JP | 06-012333 | 1/1994 |
| JP | 07-287064 | 10/1995 |
| JP | 08-161283 | 6/1996 |
| JP | 08-180018 | 7/1996 |
| JP | 08-212178 | 8/1996 |
| JP | 08-235143 | 9/1996 |
| JP | 08-249261 | 9/1996 |
| JP | 09-198361 | 7/1997 |
| JP | 09-311839 | 12/1997 |
| JP | 10-126771 | 5/1998 |
| JP | 10-269165 | 10/1998 |
| JP | 10-334055 A1 | 12/1998 |
| JP | 11-003306 | 1/1999 |
| JP | 11-039215 | 2/1999 |
| JP | 11-232247 | 8/1999 |
| JP | 11-338833 | 12/1999 |
| JP | 2000-057329 | 2/2000 |
| JP | 2000-222384 | 8/2000 |
| JP | 2002-032218 | 1/2002 |

OTHER PUBLICATIONS

Ted Painter, et al., "Perceptual Coding of Digital Audio," Proceedings of the IEEE, vol. 88, No. 4, Apr. 2000, pp. 451-513.

William J. Dally, et al., "The Message-Driven Processor: A Multicomputer Processing Node with Efficient Mechanisms," IEEE Micro, Apr. 1992, pp. 23-39.

Baer, et al. "On the Inclusion Properties for Multi-Level Cache Hierarchies," Proceedings of the Annual International Symposium on Computer Architecture, Honolulu, Hawaii, May 30-Jun. 2, 1988, Washington, IEEE Computer Society Press, pp. 73-80.

Masakazu Suzuoki, "Development of a Microprocessor with a 128b CPU, 2 Vector Processors with 10 Floating Point Units," IPSJ Journal, vol. 41, No. 4, Apr. 10, 2000.

Mamoru Maekawa, "Distributed Operating System," Kyoritsu Shuppan Co., Ltd., Dec. 25, 1991, pp. 175-183.

"IBM System/370 Extended Architecture Instruction Manual," IBM Japan, Apr. 1984, pp. 3-8 to 3-10.

"IBM Wins Playstation 3 Contract," BBC News, Mar. 12, 2001.

* cited by examiner

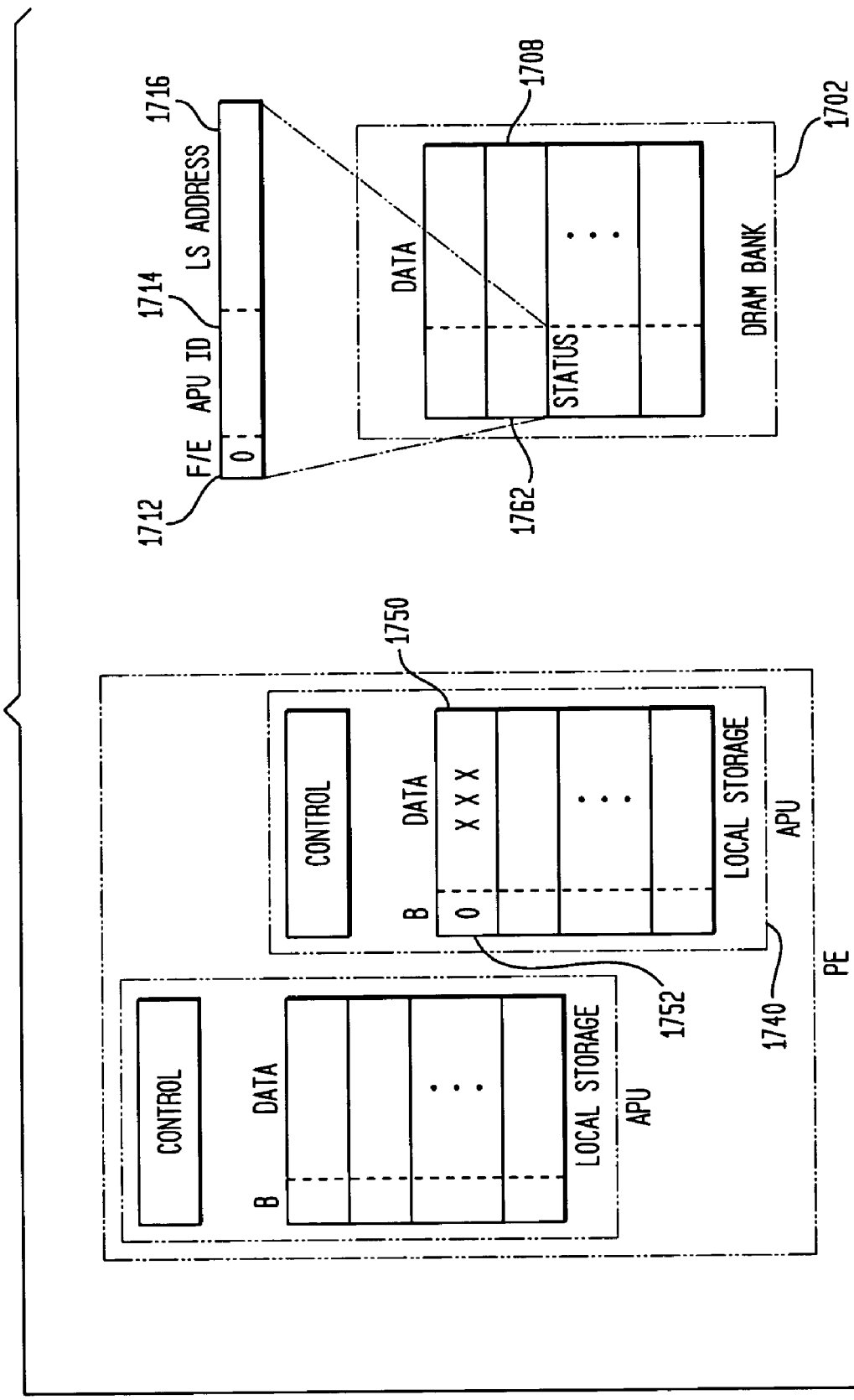

| ID | | |
|---|---|---|
| 0 | APU KEY | KEY MASK |
| 1 | APU KEY | KEY MASK |
| 2 | APU KEY | KEY MASK |
| | ⋮ | |
| 7 | APU KEY | KEY MASK |

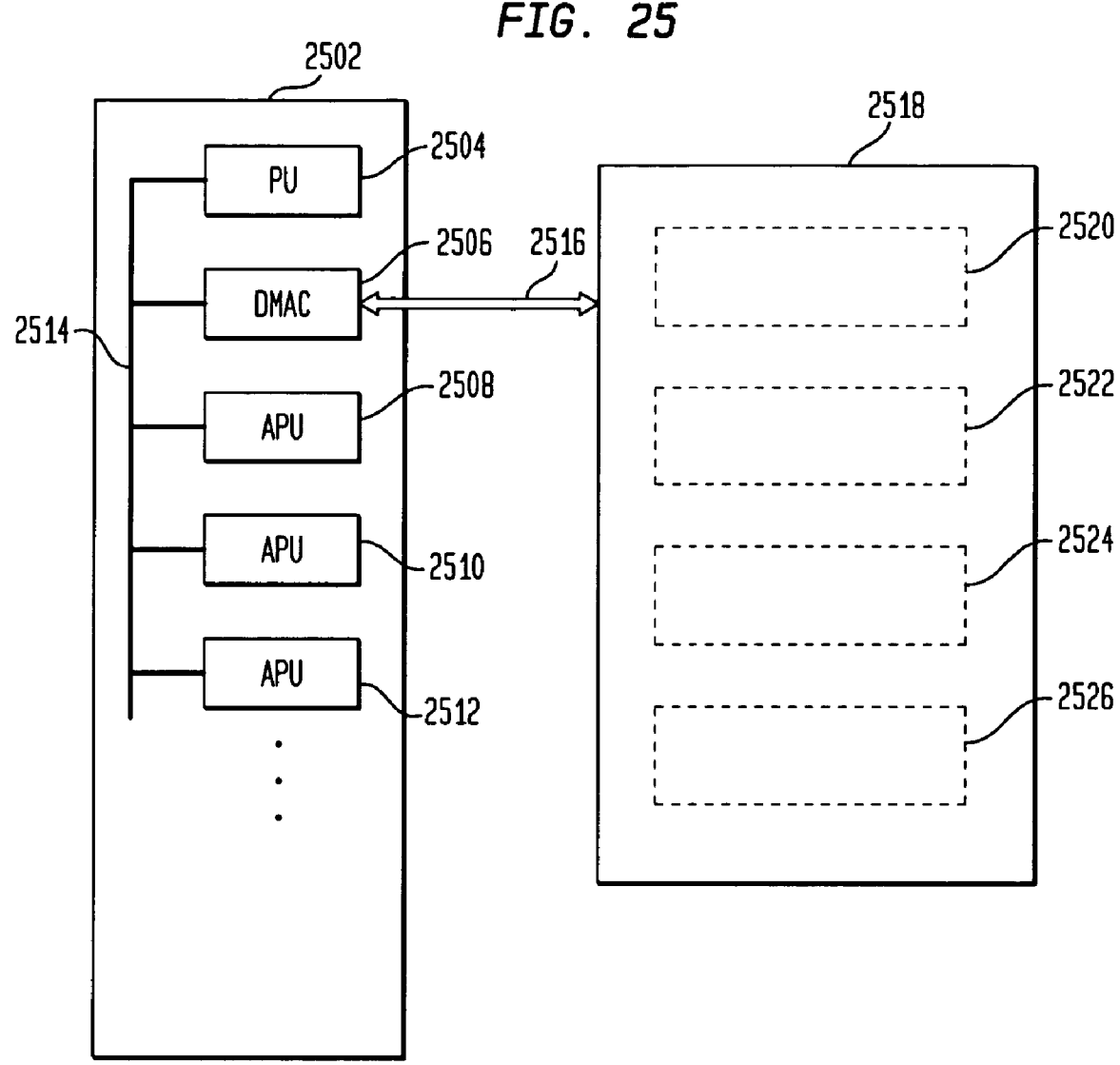

MEMORY PROTECTION SYSTEM AND METHOD FOR COMPUTER ARCHITECTURE FOR BROADBAND NETWORKS

CROSS-REFERENCE TO RELATED APPLICATIONS

This is a continuation of commonly assigned, U.S. patent application entitled "Memory Protection System and Method for Computer Architecture for Broadband Networks," application Ser. No. 09/816020, filed Mar. 22, 2001 now U.S. Pat. No. 6,526,491; the disclosure of which is incorporated by reference herein.

BACKGROUND OF THE INVENTION

The present invention relates to an architecture for computer processors and computer networks and, in particular, to an architecture for computer processors and computer networks in a broadband environment. The present invention further relates to a programming model for such an architecture.

The computers and computing devices of current computer networks, e.g., local area networks (LANs) used in office networks and global networks such as the Internet, were designed principally for stand-alone computing. The sharing of data and application programs ("applications") over a computer network was not a principal design goal of these computers and computing devices. These computers and computing devices also typically were designed using a wide assortment of different processors made by a variety of different manufacturers, e.g., Motorola, Intel, Texas Instruments, Sony and others. Each of these processors has its own particular instruction set and instruction set architecture (ISA), i.e., its own particular set of assembly language instructions and structure for the principal computational units and memory units for performing these instructions. A programmer is required to understand, therefore, each processor's instruction set and ISA to write applications for these processors. This heterogeneous combination of computers and computing devices on today's computer networks complicates the processing and sharing of data and applications. Multiple versions of the same application often are required, moreover, to accommodate this heterogeneous environment.

The types of computers and computing devices connected to global networks, particularly the Internet, are extensive. In addition to personal computers (PCs) and servers, these computing devices include cellular telephones, mobile computers, personal digital assistants (PDAs), set top boxes, digital televisions and many others. The sharing of data and applications among this assortment of computers and computing devices presents substantial problems.

A number of techniques have been employed in an attempt to overcome these problems. These techniques include, among others, sophisticated interfaces and complicated programming techniques. These solutions often require substantial increases in processing power to implement. They also often result in a substantial increase in the time required to process applications and to transmit data over networks.

Data typically are transmitted over the Internet separately from the corresponding applications. This approach avoids the necessity of sending the application with each set of transmitted data corresponding to the application. While this approach minimizes the amount of bandwidth needed, it also often causes frustration among users. The correct application, or the most current application, for the transmitted data may not be available on the client's computer. This approach also requires the writing of a multiplicity of versions of each application for the multiplicity of different ISAs and instruction sets employed by the processors on the network.

The Java model attempts to solve this problem. This model employs a small application ("applet") complying with a strict security protocol. Applets are sent from a server computer over the network to be run by a client computer ("client"). To avoid having to send different versions of the same applet to clients employing different ISAs, all Java applets are run on a client's Java virtual machine. The Java virtual machine is software emulating a computer having a Java ISA and Java instruction set. This software, however, runs on the client's ISA and the client's instruction set. A version of the Java virtual machine is provided for each different ISA and instruction set of the clients. A multiplicity of different versions of each applet, therefore, is not required. Each client downloads only the correct Java virtual machine for its particular ISA and instruction set to run all Java applets.

Although providing a solution to the problem of having to write different versions of an application for each different ISA and instruction set, the Java processing model requires an additional layer of software on the client's computer. This additional layer of software significantly degrades a processor's processing speed. This decrease in speed is particularly significant for real-time, multimedia applications. A downloaded Java applet also may contain viruses, processing malfunctions, etc. These viruses and malfunctions can corrupt a client's database and cause other damage. Although a security protocol employed in the Java model attempts to overcome this problem by implementing a software "sandbox," i.e., a space in the client's memory beyond which the Java applet cannot write data, this software-driven security model is often insecure in its implementation and requires even more processing.

Real-time, multimedia, network applications are becoming increasingly important. These network applications require extremely fast processing speeds. Many thousands of megabits of data per second may be needed in the future for such applications. The current architecture of networks, and particularly that of the Internet, and the programming model presently embodied in, e.g., the Java model, make reaching such processing speeds extremely difficult.

Therefore, a new computer architecture, a new architecture for computer networks and a new programming model are required. This new architecture and programming model should overcome the problems of sharing data and applications among the various members of a network without imposing added computational burdens. This new computer architecture and programming model also should overcome the security problems inherent in sharing applications and data among the members of a network.

SUMMARY OF THE INVENTION

In one aspect, the present invention provides a new architecture for computers, computing devices and computer networks. In another aspect, the present invention provides a new programming model for these computers, computing devices and computer networks.

In accordance with the present invention, all members of a computer network, i.e., all computers and computing devices of the network, are constructed from a common computing module. This common computing module has a consistent structure and preferably employs the same ISA. The members of the network can be, e.g., clients, servers, PCs, mobile computers, game machines, PDAs, set top boxes, appliances, digital televisions and other devices using computer processors. The consistent modular structure enables efficient, high speed processing of applications and data by the network's members and the rapid transmission of applications and data over the network. This structure also simplifies the building of members of the network of various sizes and processing power and the preparation of applications for processing by these members.

In another aspect, the present invention provides a new programming model for transmitting data and applications over a network and for processing data and applications among the network's members. This programming model employs a software cell transmitted over the network for processing by any of the network's members. Each software cell has the same structure and can contain both applications and data. As a result of the high speed processing and transmission speed provided by the modular computer architecture, these cells can be rapidly processed. The code for the applications preferably is based upon the same common instruction set and ISA. Each software cell preferably contains a global identification (global ID) and information describing the amount of computing resources required for the cell's processing. Since all computing resources have the same basic structure and employ the same ISA, the particular resource performing this processing can be located anywhere on the network and dynamically assigned.

The basic processing module is a processor element (PE). A PE preferably comprises a processing unit (PU), a direct memory access controller (DMAC) and a plurality of attached processing units (APUs). In a preferred embodiment, a PE comprises eight APUs. The PU and the APUs interact with a shared dynamic random access memory (DRAM) preferably having a cross-bar architecture. The PU schedules and orchestrates the processing of data and applications by the APUs. The APUs perform this processing in a parallel and independent manner. The DMAC controls accesses by the PU and the APUs to the data and applications stored in the shared DRAM.

In accordance with this modular structure, the number of PEs employed by a member of the network is based upon the processing power required by that member. For example, a server may employ four PEs, a workstation may employ two PEs and a PDA may employ one PE. The number of APUs of a PE assigned to processing a particular software cell depends upon the complexity and magnitude of the programs and data within the cell.

In a preferred embodiment, a plurality of PEs are associated with a shared DRAM. The DRAM preferably is segregated into a plurality of sections, and each of these sections is segregated into a plurality of memory banks. In a particularly preferred embodiment, the DRAM comprises sixty-four memory banks, and each bank has one megabyte of storage capacity. Each section of the DRAM preferably is controlled by a bank controller, and each DMAC of a PE preferably accesses each bank controller. The DMAC of each PE in this embodiment, therefore, can access any portion of the shared DRAM.

In another aspect, the present invention provides a synchronized system and method for an APU's reading of data from, and the writing of data to, the shared DRAM. This system avoids conflicts among the multiple APUs and multiple PEs sharing the DRAM. In accordance with this system and method, an area of the DRAM is designated for storing a plurality of full-empty bits. Each of these full-empty bits corresponds to a designated area of the DRAM. The synchronized system is integrated into the hardware of the DRAM and, therefore, avoids the computational overhead of a data synchronization scheme implemented in software.

The present invention also implements sandboxes within the DRAM to provide security against the corruption of data for a program being processed by one APU from data for a program being processed by another APU. Each sandbox defines an area of the shared DRAM beyond which a particular APU, or set of APUs, cannot read or write data.

In another aspect, the present invention provides a system and method for the PUs' issuance of commands to the APUs to initiate the APUs' processing of applications and data. These commands, called APU remote procedure calls (ARPCs), enable the PUs to orchestrate and coordinate the APUs' parallel processing of applications and data without the APUs performing the role of co-processors.

In another aspect, the present invention provides a system and method for establishing a dedicated pipeline structure for the processing of streaming data. In accordance with this system and method, a coordinated group of APUs, and a coordinated group of memory sandboxes associated with these APUs, are established by a PU for the processing of these data. The pipeline's dedicated APUs and memory sandboxes remain dedicated to the pipeline during periods that the processing of data does not occur. In other words, the dedicated APUs and their associated sandboxes are placed in a reserved state during these periods.

In another aspect, the present invention provides an absolute timer for the processing of tasks. This absolute timer is independent of the frequency of the clocks employed by the APUs for the processing of applications and data. Applications are written based upon the time period for tasks defined by the absolute timer. If the frequency of the clocks employed by the APUs increases because of, e.g., enhancements to the APUs, the time period for a given task as defined by the absolute timer remains the same. This scheme enables the implementation of enhanced processing times by newer versions of the APUs without disabling these newer APUs from processing older applications written for the slower processing times of older APUs.

The present invention also provides an alternative scheme to permit newer APUs having faster processing speeds to process older applications written for the slower processing speeds of older APUs. In this alternative scheme, the particular instructions or microcode employed by the APUs in processing these older applications are analyzed during processing for problems in the coordination of the APUs' parallel processing created by the enhanced speeds. "No operation" ("NOOP") instructions are inserted into the instructions executed by some of these APUs to maintain the sequential completion of processing by the APUs expected by the program. By inserting these NOOPs into these instructions, the correct timing for the APUs' execution of all instructions are maintained.

In another aspect, the present invention provides a chip package containing an integrated circuit into which is integrated an optical wave guide.

DESCRIPTION OF THE DRAWINGS

FIG. 25 illustrates the structure of a dedicated pipeline for processing streaming data in accordance with the present invention.

DETAILED DESCRIPTION OF THE PREFERRED EMBODIMENTS

Figure 1:
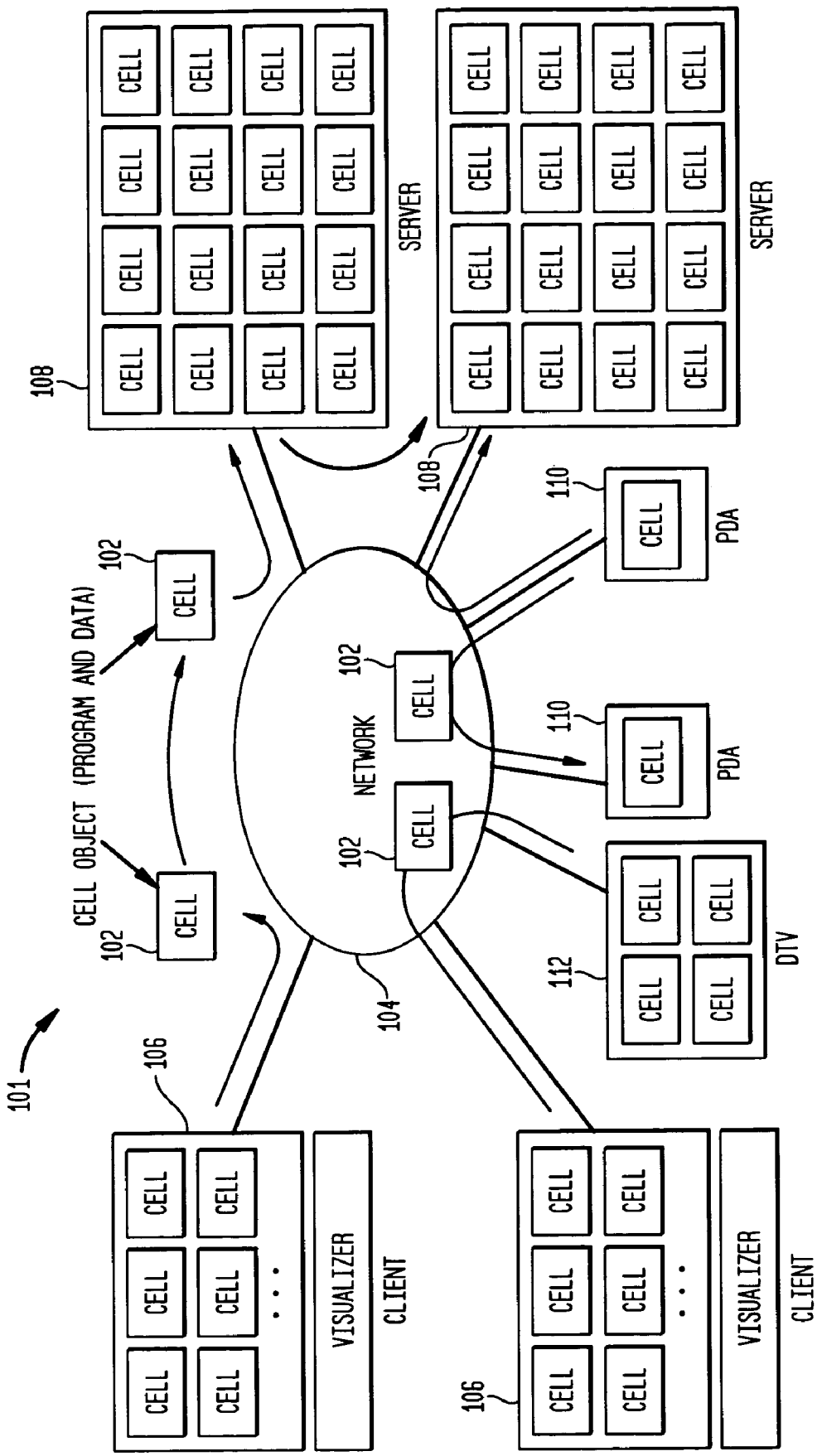
FIG. 1 illustrates the overall architecture of a computer network in accordance with the present invention.

The overall architecture for a computer system 101 in accordance with the present invention is shown in FIG. 1.

As illustrated in this figure, system 101 includes network 104 to which is connected a plurality of computers and computing devices. Network 104 can be a LAN, a global network, such as the Internet, or any other computer network.

The computers and computing devices connected to network 104 (the network's "members") include, e.g., client computers 106, server computers 108, personal digital assistants (PDAs) 110, digital television (DTV) 112 and other wired or wireless computers and computing devices. The processors employed by the members of network 104 are constructed from the same common computing module. These processors also preferably all have the same ISA and perform processing in accordance with the same instruction set. The number of modules included within any particular processor depends upon the processing power required by that processor.

For example, since servers 108 of system 101 perform more processing of data and applications than clients 106, servers 108 contain more computing modules than clients 106. PDAs 110, on the other hand, perform the least amount of processing. PDAs 110, therefore, contain the smallest number of computing modules. DTV 112 performs a level of processing between that of clients 106 and servers 108. DTV 112, therefore, contains a number of computing modules between that of clients 106 and servers 108. As discussed below, each computing module contains a processing controller and a plurality of identical processing units for performing parallel processing of the data and applications transmitted over network 104.

This homogeneous configuration for system 101 facilitates adaptability, processing speed and processing efficiency. Because each member of system 101 performs processing using one or more (or some fraction) of the same computing module, the particular computer or computing device performing the actual processing of data and applications is unimportant. The processing of a particular application and data, moreover, can be shared among the network's members. By uniquely identifying the cells comprising the data and applications processed by system 101 throughout the system, the processing results can be transmitted to the computer or computing device requesting the processing regardless of where this processing occurred. Because the modules performing this processing have a common structure and employ a common ISA, the computational burdens of an added layer of software to achieve compatibility among the processors is avoided. This architecture and programming model facilitates the processing speed necessary to execute, e.g., real-time, multimedia applications.

To take further advantage of the processing speeds and efficiencies facilitated by system 101, the data and applications processed by this system are packaged into uniquely identified, uniformly formatted software cells 102. Each software cell 102 contains, or can contain, both applications and data. Each software cell also contains an ID to globally identify the cell throughout network 104 and system 101. This uniformity of structure for the software cells, and the software cells' unique identification throughout the network, facilitates the processing of applications and data on any computer or computing device of the network. For example, a client 106 may formulate a software cell 102 but, because of the limited processing capabilities of client 106, transmit this software cell to a server 108 for processing. Software cells can migrate, therefore, throughout network 104 for processing on the basis of the availability of processing resources on the network.

The homogeneous structure of processors and software cells of system 101 also avoids many of the problems of today's heterogeneous networks. For example, inefficient programming models which seek to permit processing of applications on any ISA using any instruction set, e.g., virtual machines such as the Java virtual machine, are avoided. System 101, therefore, can implement broadband processing far more effectively and efficiently than today's networks.

Figure 2:
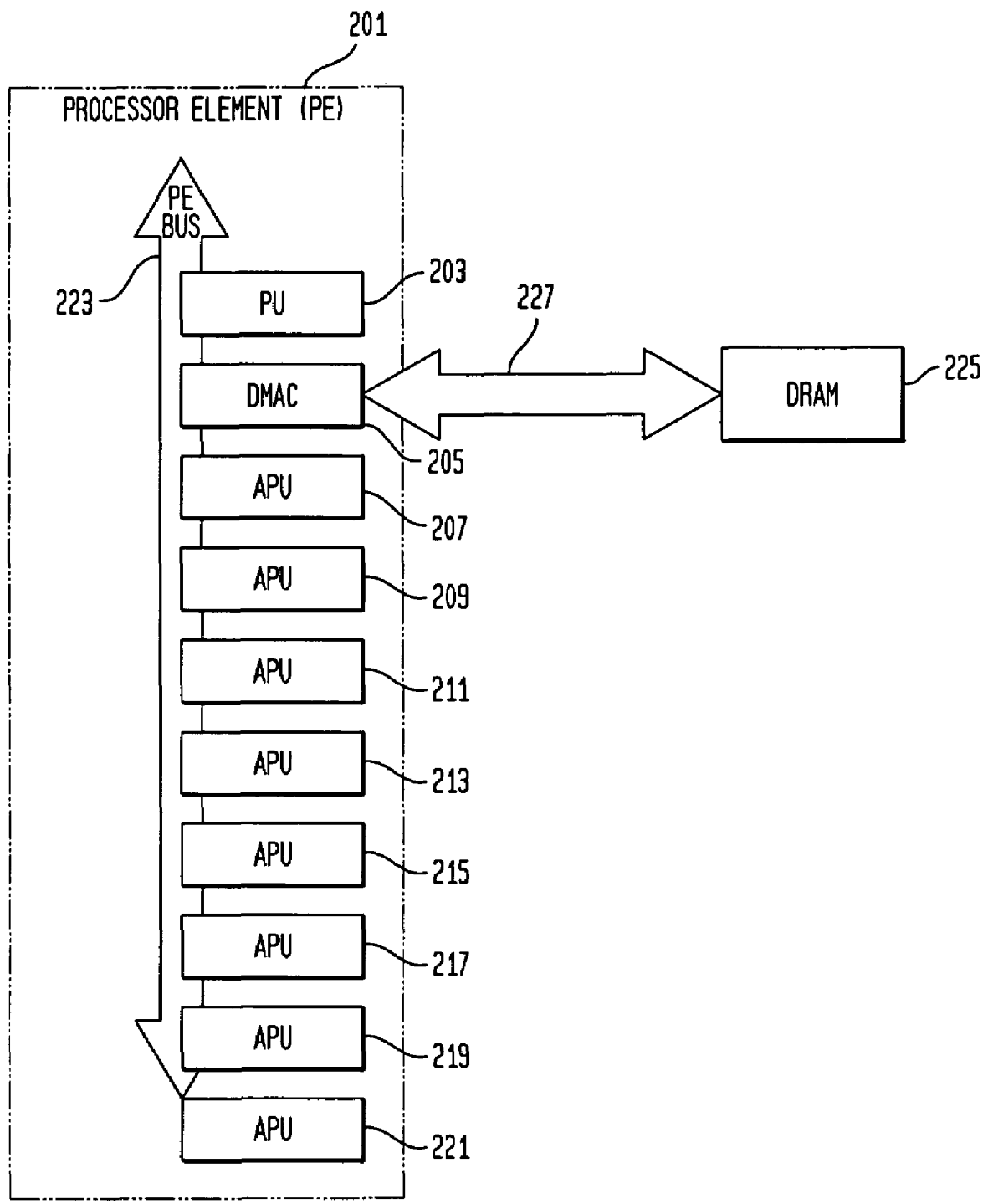
FIG. 2 is a diagram illustrating the structure of a processor element (PE) in accordance with the present invention.

The basic processing module for all members of network 104 is the processor element (PE). FIG. 2 illustrates the structure of a PE. As shown in this figure, PE 201 comprises a processing unit (PU) 203, a direct memory access controller (DMAC) 205 and a plurality of attached processing units (APUs), namely, APU 207, APU 209, APU 211, APU 213, APU 215, APU 217, APU 219 and APU 221. A local PE bus 223 transmits data and applications among the APUs, DMAC 205 and PU 203. Local PE bus 223 can have, e.g., a conventional architecture or be implemented as a packet switch network. Implementation as a packet switch network, while requiring more hardware, increases available bandwidth.

PE 201 can be constructed using various methods for implementing digital logic. PE 201 preferably is constructed, however, as a single integrated circuit employing a complementary metal oxide semiconductor (CMOS) on a silicon substrate. Alternative materials for substrates include gallium arsinide, gallium aluminum arsinide and other so-called III-B compounds employing a wide variety of dopants. PE 201 also could be implemented using superconducting material, e.g., rapid single-flux-quantum (RSFQ) logic.

PE 201 is closely associated with a dynamic random access memory (DRAM) 225 through a high bandwidth memory connection 227. DRAM 225 functions as the main memory for PE 201. Although a DRAM 225 preferably is a dynamic random access memory, DRAM 225 could be implemented using other means, e.g., as a static random access memory (SRAM), a magnetic random access memory (MRAM), an optical memory or a holographic memory. DMAC 205 facilitates the transfer of data between DRAM 225 and the APUs and PU of PE 201. As further discussed below, DMAC 205 designates for each APU an exclusive area in DRAM 225 into which only the APU can write data and from which only the APU can read data. This exclusive area is designated a "sandbox."

PU 203 can be, e.g., a standard processor capable of stand-alone processing of data and applications. In operation, PU 203 schedules and orchestrates the processing of data and applications by the APUs. The APUs preferably are single instruction, multiple data (SIMD) processors. Under the control of PU 203, the APUs perform the processing of these data and applications in a parallel and independent manner. DMAC 205 controls accesses by PU 203 and the APUs to the data and applications stored in the shared DRAM 225. Although PE 201 preferably includes eight APUs, a greater or lesser number of APUs can be employed in a PE depending upon the processing power required. Also, a number of PEs, such as PE 201, may be joined or packaged together to provide enhanced processing power.

Figure 3:
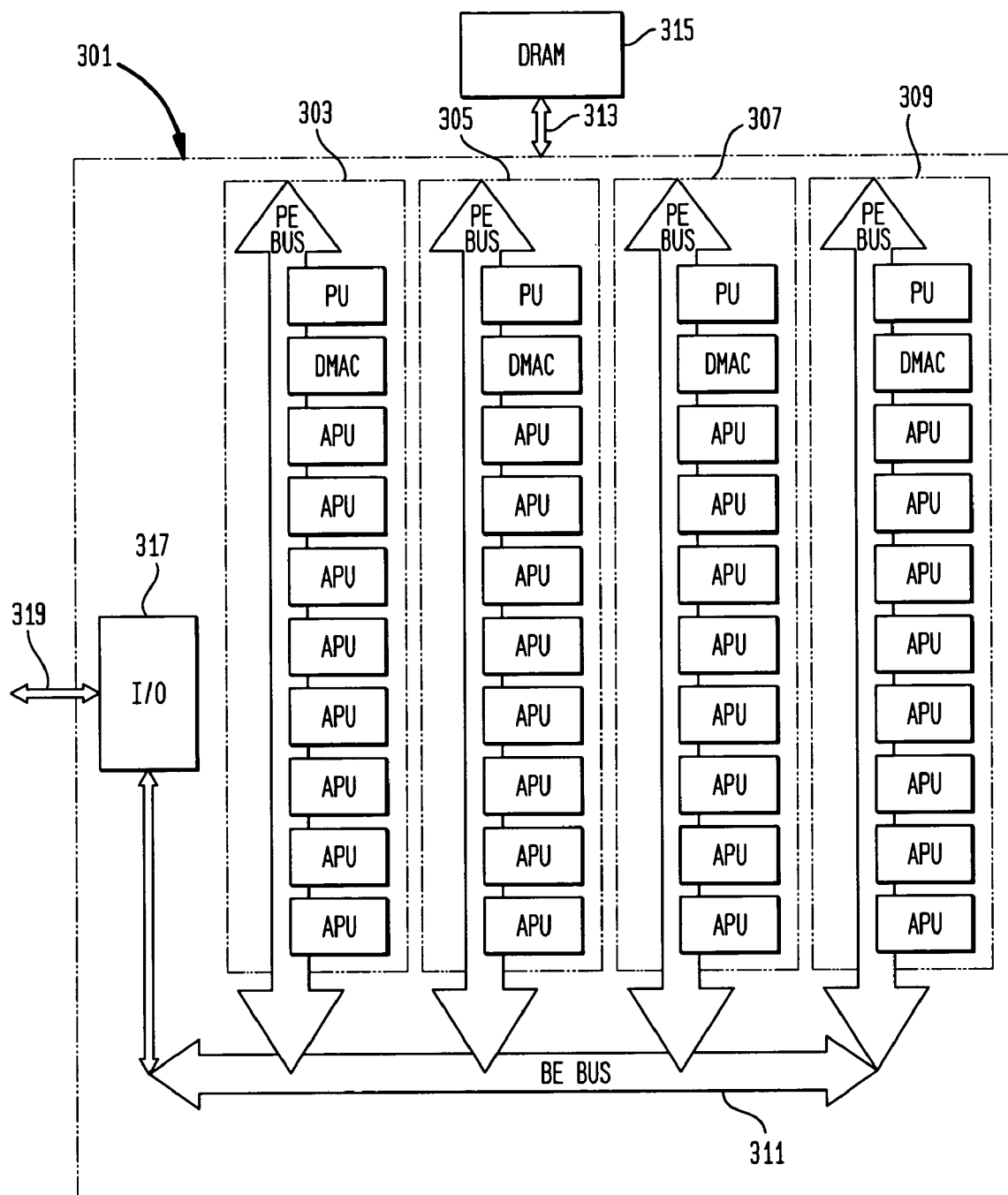
FIG. 3 is a diagram illustrating the structure of a broadband engine (BE) in accordance with the present invention.

For example, as shown in FIG. 3, four PEs may be packaged or joined together, e.g., within one or more chip packages, to form a single processor for a member of network 104. This configuration is designated a broadband engine (BE). As shown in FIG. 3, BE 301 contains four PEs, namely, PE 303, PE 305, PE 307 and PE 309. Communications among these PEs are over BE bus 311. Broad bandwidth memory connection 313 provides communication between shared DRAM 315 and these PEs. In lieu of BE bus 311, communications among the PEs of BE 301 can occur through DRAM 315 and this memory connection.

Input/output (I/O) interface 317 and external bus 319 provide communications between broadband engine 301 and the other members of network 104. Each PE of BE 301 performs processing of data and applications in a parallel and independent manner analogous to the parallel and independent processing of applications and data performed by the APUs of a PE.

Figure 4:
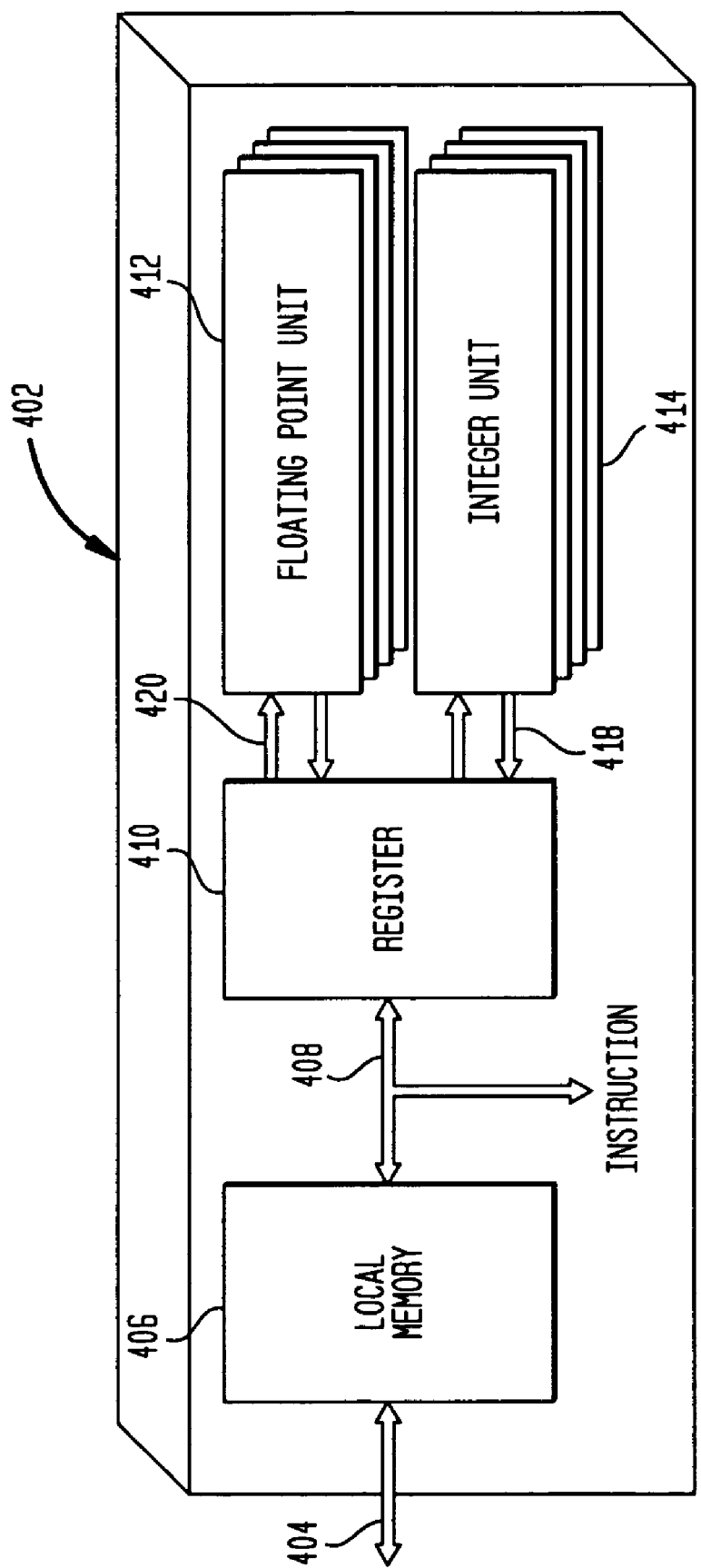
FIG. 4 is a diagram illustrating the structure of an attached processing unit (APU) in accordance with the present invention.

FIG. 4 illustrates the structure of an APU. APU 402 includes local memory 406, registers 410, four floating point units 412 and four integer units 414. Again, however, depending upon the processing power required, a greater or lesser number of floating points units 512 and integer units 414 can be employed. In a preferred embodiment, local memory 406 contains 128 kilobytes of storage, and the capacity of registers 410 is 128×128 bits. Floating point units 412 preferably operate at a speed of 32 billion floating point operations per second (32 GFLOPS), and integer units 414 preferably operate at a speed of 32 billion operations per second (32 GOPS).

Local memory 402 is not a cache memory. Local memory 402 is preferably constructed as an SRAM. Cache coherency support for an APU is unnecessary. A PU may require cache coherency support for direct memory accesses initiated by the PU. Cache coherency support is not required, however, for direct memory accesses initiated by an APU or for accesses from and to external devices.

APU 402 further includes bus 404 for transmitting applications and data to and from the APU. In a preferred embodiment, this bus is 1,024 bits wide. APU 402 further includes internal busses 408, 420 and 418. In a preferred embodiment, bus 408 has a width of 256 bits and provides communications between local memory 406 and registers 410. Busses 420 and 418 provide communications between, respectively, registers 410 and floating point units 412, and registers 410 and integer units 414. In a preferred embodiment, the width of busses 418 and 420 from registers 410 to the floating point or integer units is 384 bits, and the width of busses 418 and 420 from the floating point or integer units to registers 410 is 128 bits. The larger width of these busses from registers 410 to the floating point or integer units than from these units to registers 410 accommodates the larger data flow from registers 410 during processing. A maximum of three words are needed for each calculation. The result of each calculation, however, normally is only one word.

Figure 5:
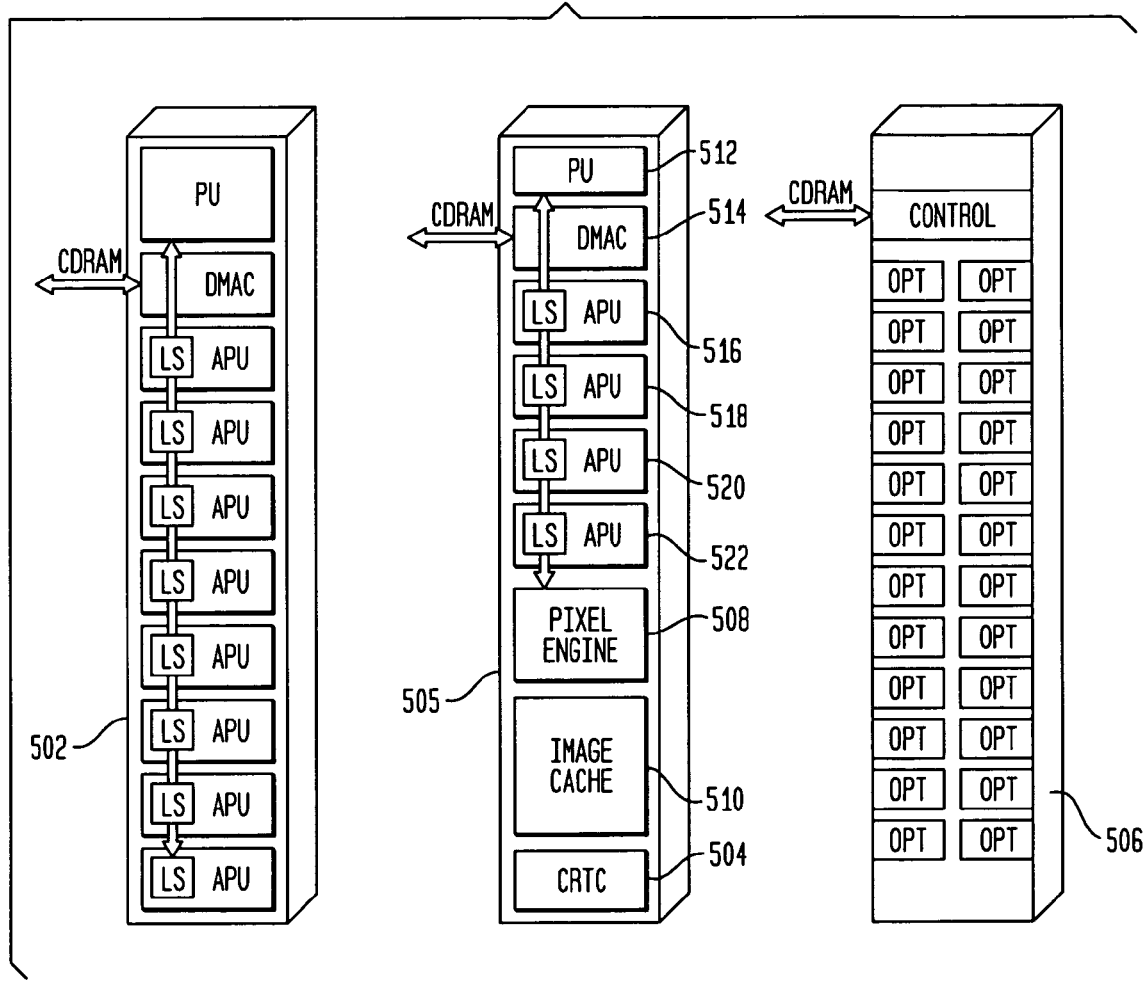
FIG. 5 is a diagram illustrating the structure of a processor element, visualizer (VS) and an optical interface in accordance with the present invention.
Figure 6:
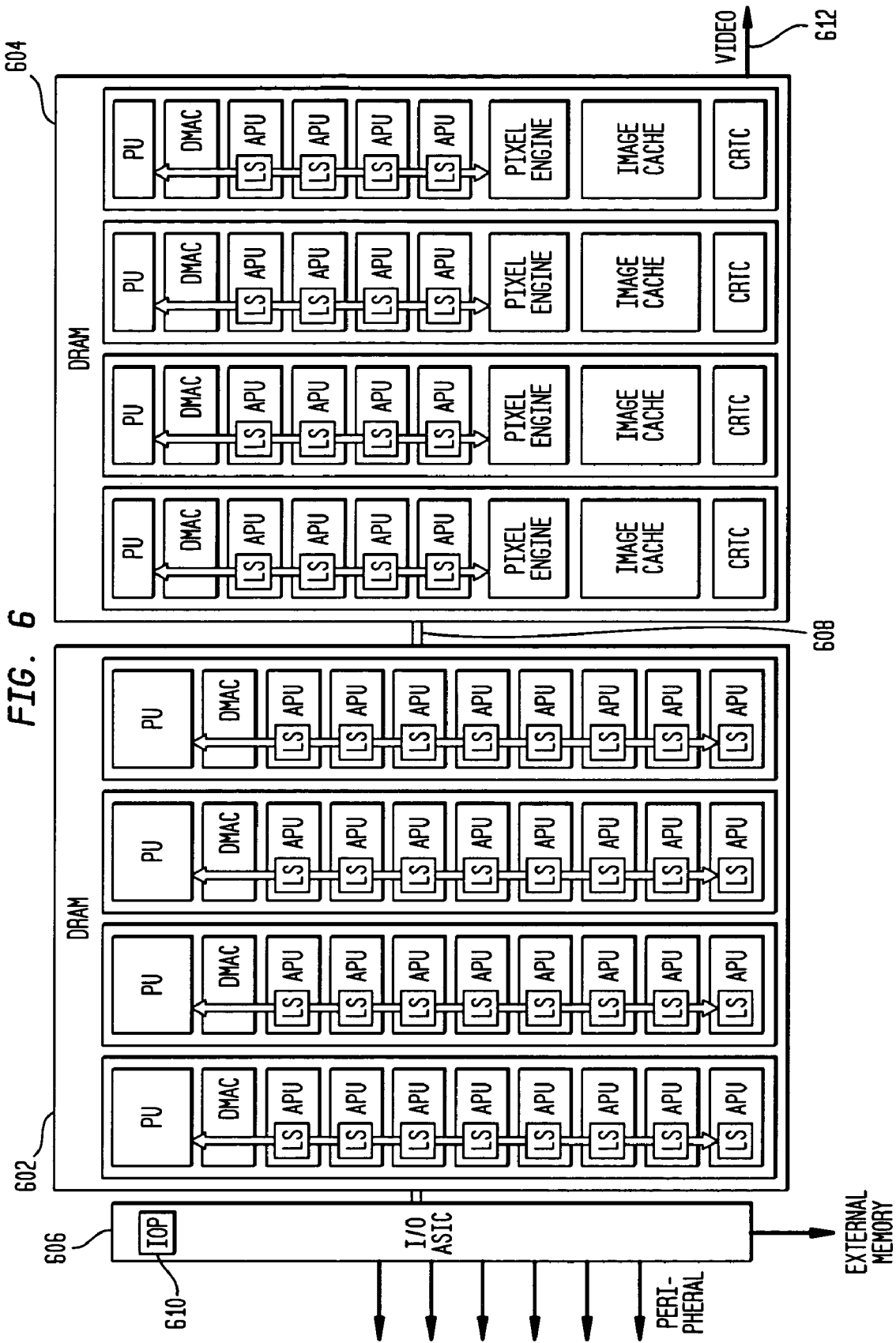
FIG. 6 is a diagram illustrating one combination of processor elements in accordance with the present invention.

FIGS. 5–10 further illustrate the modular structure of the processors of the members of network 104. For example, as shown in FIG. 5, a processor may comprise a single PE 502. As discussed above, this PE typically comprises a PU, DMAC and eight APUs. Each APU includes local storage (LS). On the other hand, a processor may comprise the structure of visualizer (VS) 505. As shown in FIG. 5, VS 505 comprises PU 512, DMAC 514 and four APUs, namely, APU 516, APU 518, APU 520 and APU 522. The space within the chip package normally occupied by the other four APUs of a PE is occupied in this case by pixel engine 508, image cache 510 and cathode ray tube controller (CRTC) 504. Depending upon the speed of communications required for PE 502 or VS 505, optical interface 506 also may be included on the chip package.

Using this standardized, modular structure, numerous other variations of processors can be constructed easily and efficiently. For example, the processor shown in FIG. 6 comprises two chip packages, namely, chip package 602 comprising a BE and chip package 604 comprising four VSs. Input/output (I/O) 606 provides an interface between the BE of chip package 602 and network 104. Bus 608 provides communications between chip package 602 and chip package 604. Input output processor (IOP) 610 controls the flow of data into and out of I/O 606. I/O 606 may be fabricated as an application specific integrated circuit (ASIC). The output from the VSs is video signal 612.

Figure 7:
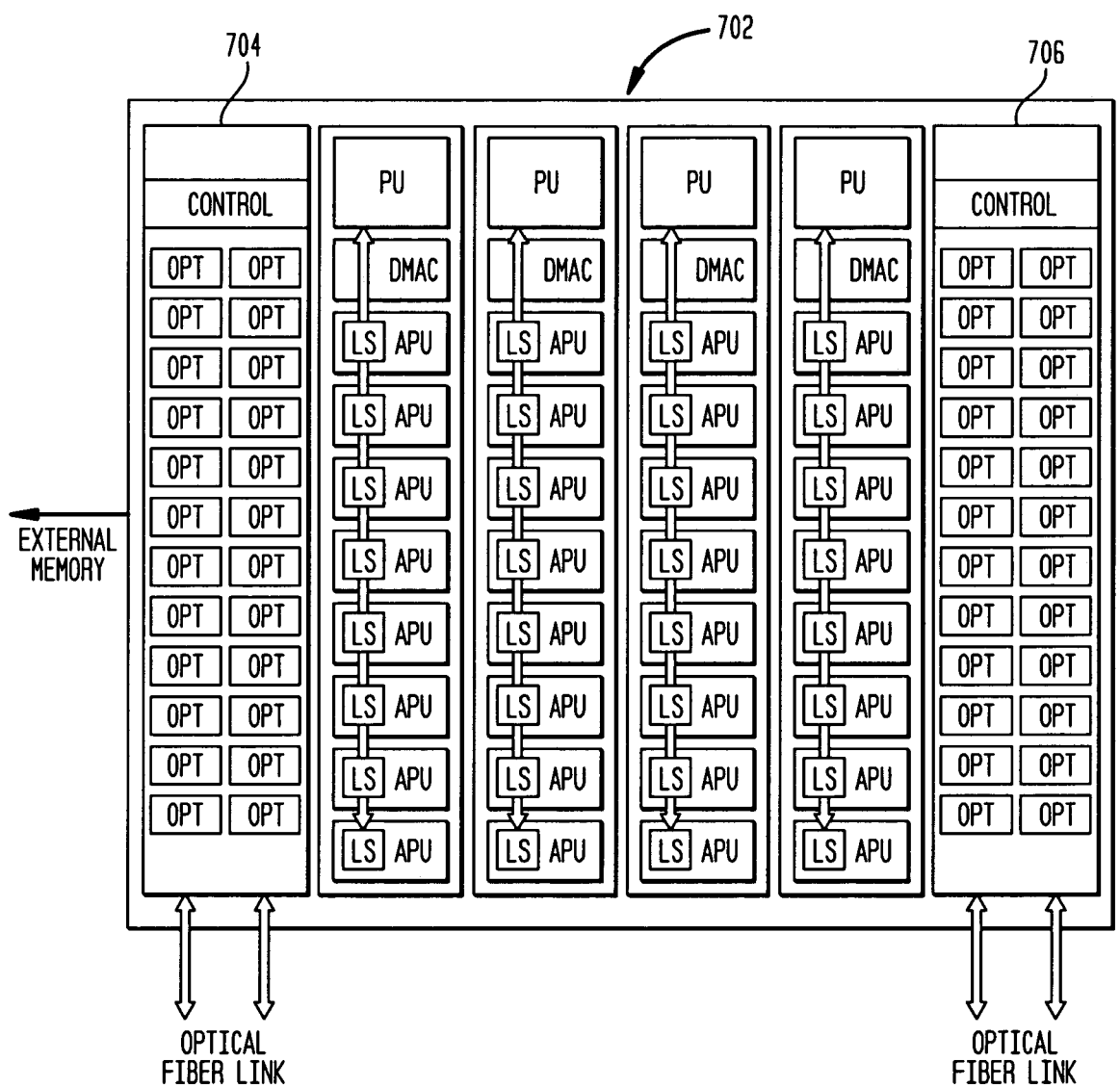
FIG. 7 illustrates another combination of processor elements in accordance with the present invention.

FIG. 7 illustrates a chip package for a BE 702 with two optical interfaces 704 and 706 for providing ultra high speed communications to the other members of network 104 (or other chip packages locally connected). BE 702 can function as, e.g., a server on network 104.

Figure 8:
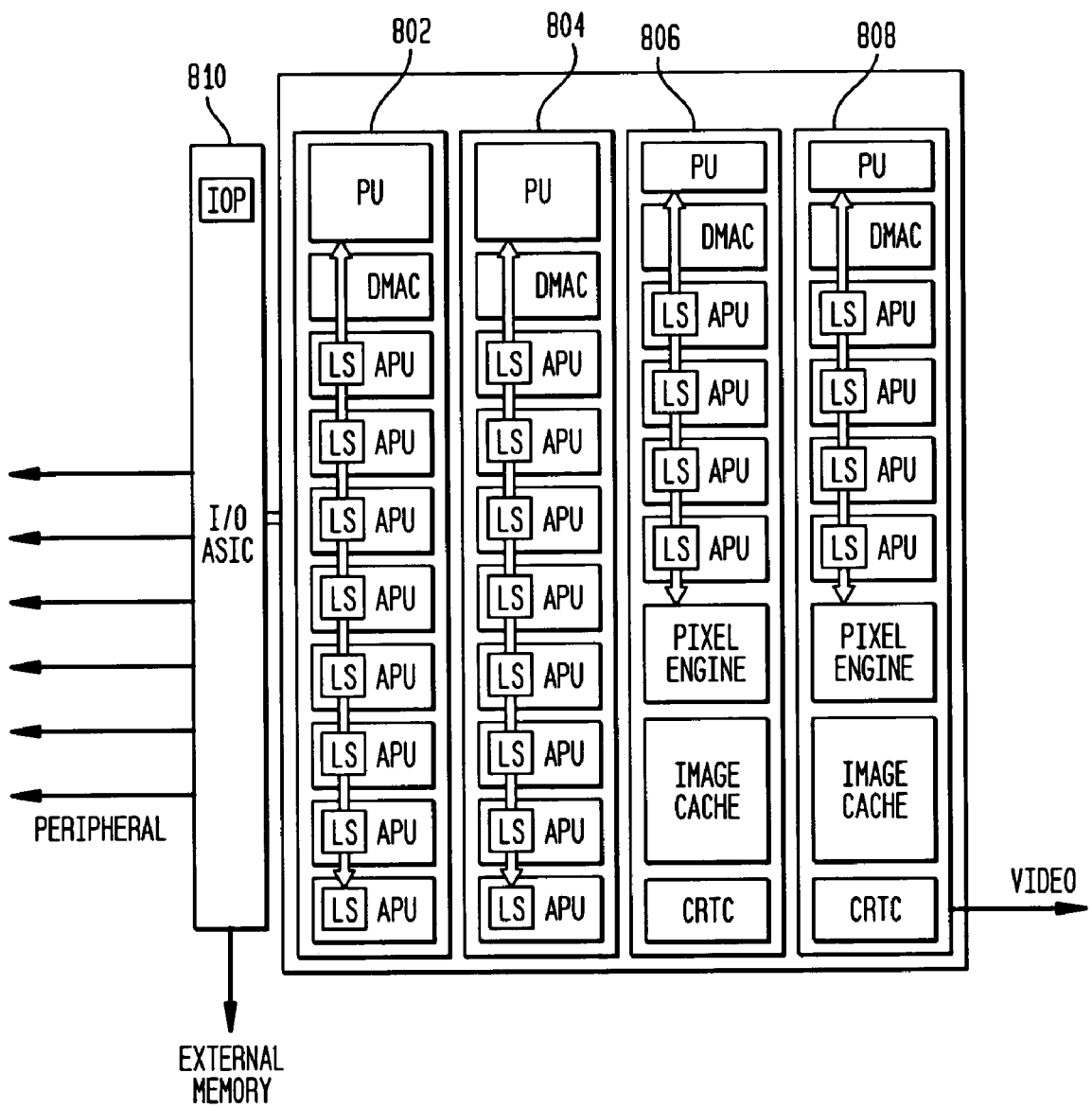
FIG. 8 illustrates yet another combination of processor elements in accordance with the present invention.

The chip package of FIG. 8 comprises two PEs 802 and 804 and two VSs 806 and 808. An I/O 810 provides an interface between the chip package and network 104. The output from the chip package is a video signal. This configuration may function as, e.g., a graphics work station.

Figure 9:
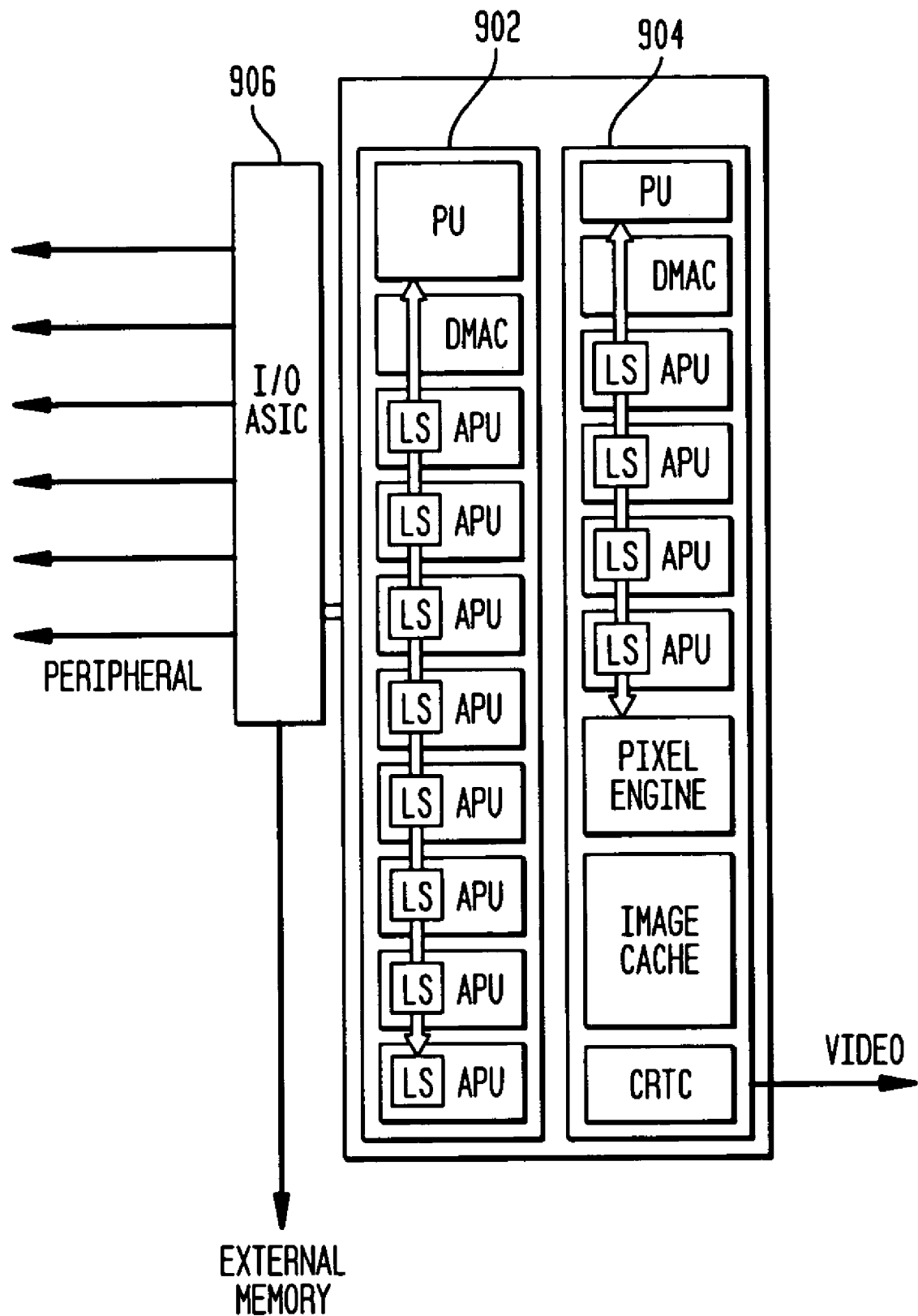
FIG. 9 illustrates yet another combination of processor elements in accordance with the present invention.

FIG. 9 illustrates yet another configuration. This configuration contains one-half of the processing power of the configuration illustrated in FIG. 8. Instead of two PEs, one PE 902 is provided, and instead of two VSs, one VS 904 is provided. I/O 906 has one-half the bandwidth of the I/O illustrated in FIG. 8. Such a processor also may function, however, as a graphics work station.

Figure 10:
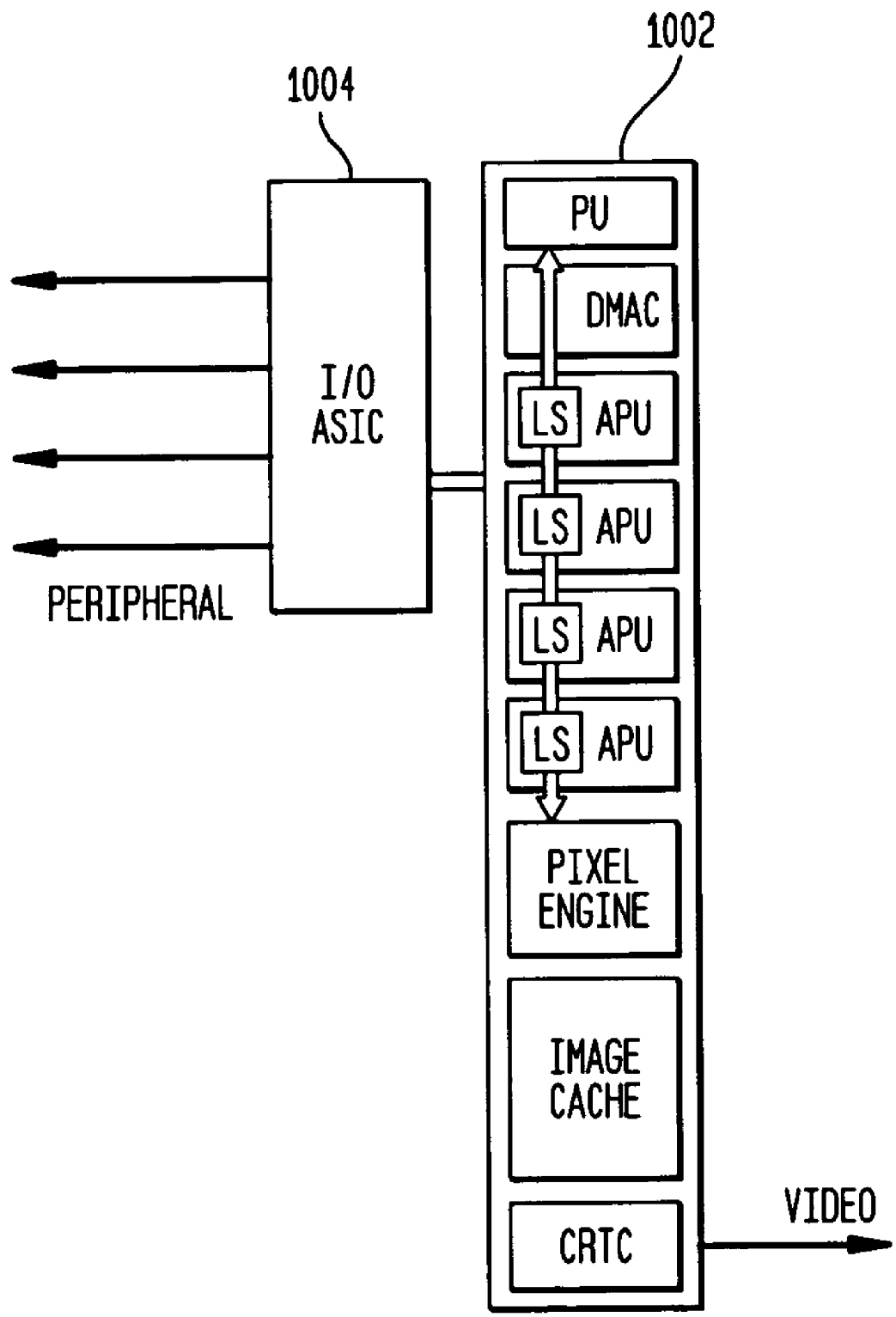
FIG. 10 illustrates yet another combination of processor elements in accordance with the present invention.

A final configuration is shown in FIG. 10. This processor consists of only a single VS 1002 and an I/O 1004. This configuration may function as, e.g., a PDA.

Figure 11A:
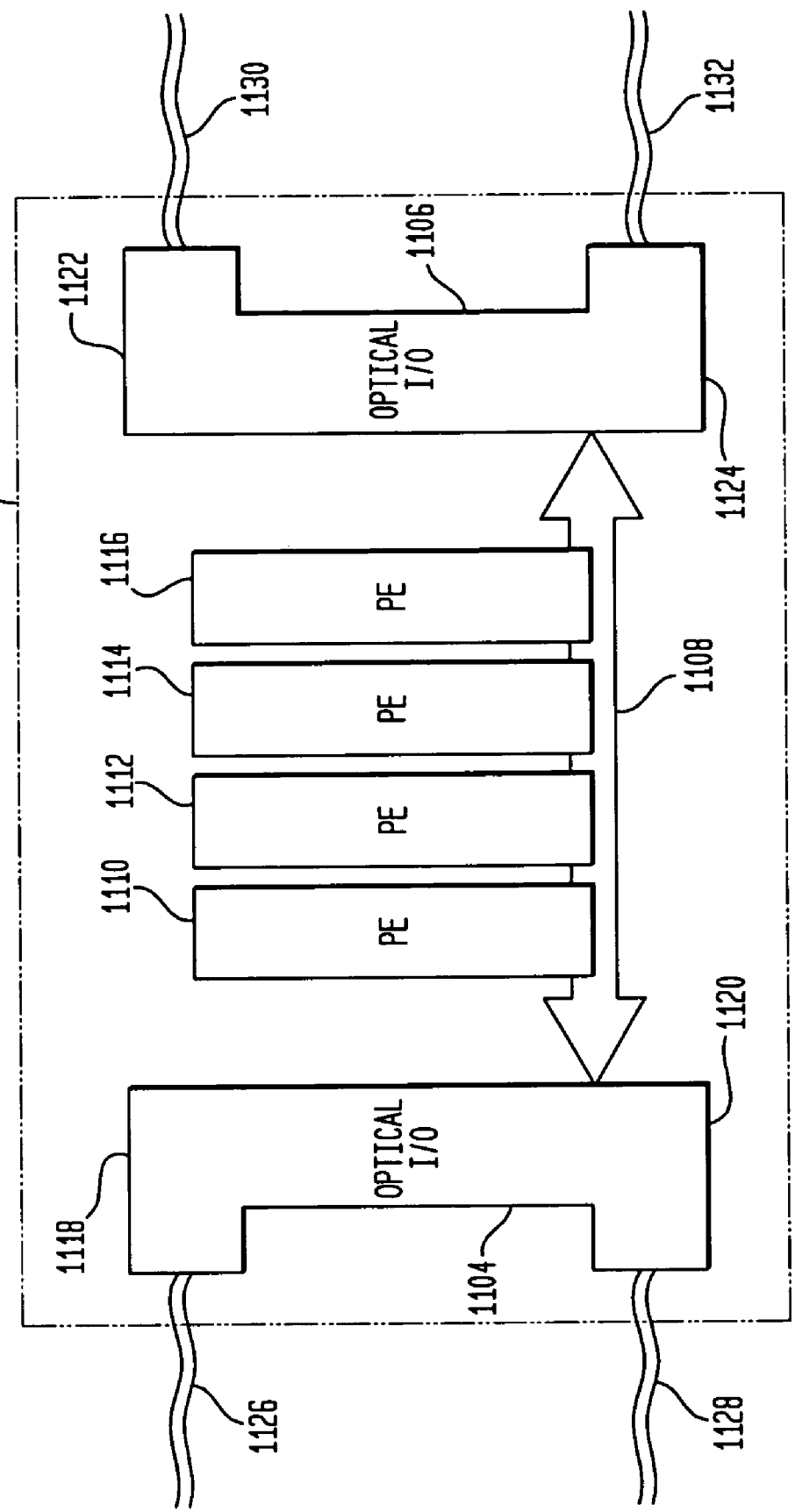
FIG. 11A illustrates the integration of optical interfaces within a chip package in accordance with the present invention.

FIG. 11A illustrates the integration of optical interfaces into a chip package of a processor of network 104. These optical interfaces convert optical signals to electrical signals and electrical signals to optical signals and can be constructed from a variety of materials including, e.g., gallium arsinide, aluminum gallium arsinide, germanium and other elements or compounds. As shown in this figure, optical interfaces 1104 and 1106 are fabricated on the chip package of BE 1102. BE bus 1108 provides communication among the PEs of BE 1102, namely, PE 1110, PE 1112, PE 1114, PE 1116, and these optical interfaces. Optical interface 1104 includes two ports, namely, port 1118 and port 1120, and optical interface 1106 also includes two ports, namely, port 1122 and port 1124. Ports 1118, 1120, 1122 and 1124 are connected to, respectively, optical wave guides 1126, 1128, 1130 and 1132. Optical signals are transmitted to and from BE 1102 through these optical wave guides via the ports of optical interfaces 1104 and 1106.

Figure 11B:
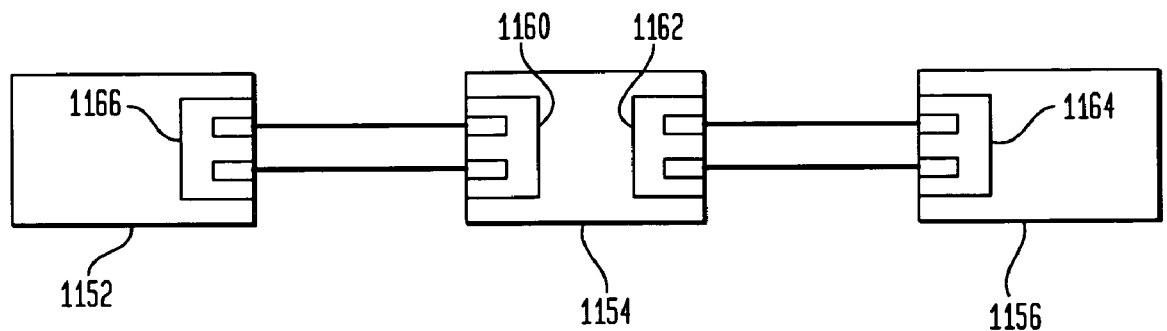
FIG. 11B is a diagram of one configuration of processors using the optical interfaces of FIG. 11A.

A plurality of BEs can be connected together in various configurations using such optical wave guides and the four optical ports of each BE. For example, as shown in FIG. 11B, two or more BEs, e.g., BE 1152, BE 1154 and BE 1156, can be connected serially through such optical ports. In this example, optical interface 1166 of BE 1152 is connected through its optical ports to the optical ports of optical interface 1160 of BE 1154. In a similar manner, the optical ports of optical interface 1162 on BE 1154 are connected to the optical ports of optical interface 1164 of BE 1156.

Figure 11C:
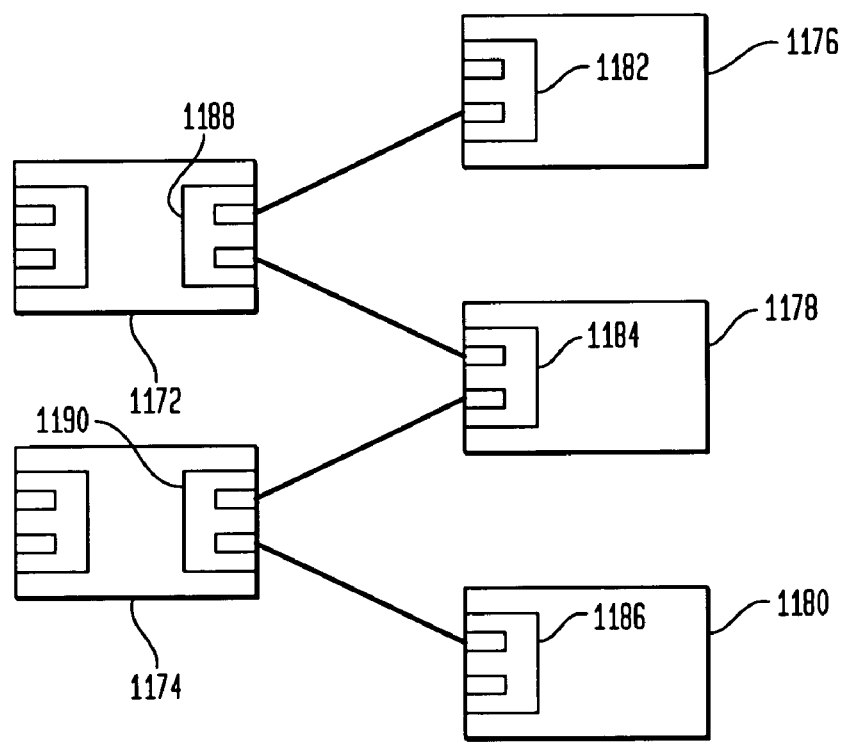
FIG. 11C is a diagram of another configuration of processors using the optical interfaces of FIG. 11A.

A matrix configuration is illustrated in FIG. 11C. In this configuration, the optical interface of each BE is connected to two other BEs. As shown in this figure, one of the optical ports of optical interface 1188 of BE 1172 is connected to an optical port of optical interface 1182 of BE 1176. The other optical port of optical interface 1188 is connected to an optical port of optical interface 1184 of BE 1178. In a similar manner, one optical port of optical interface 1190 of BE 1174 is connected to the other optical port of optical interface 1184 of BE 1178. The other optical port of optical interface 1190 is connected to an optical port of optical interface 1186 of BE 1180. This matrix configuration can be extended in a similar manner to other BEs.

Using either a serial configuration or a matrix configuration, a processor for network 104 can be constructed of any desired size and power. Of course, additional ports can be added to the optical interfaces of the BEs, or to processors having a greater or lesser number of PEs than a BE, to form other configurations.

Figure 12A:
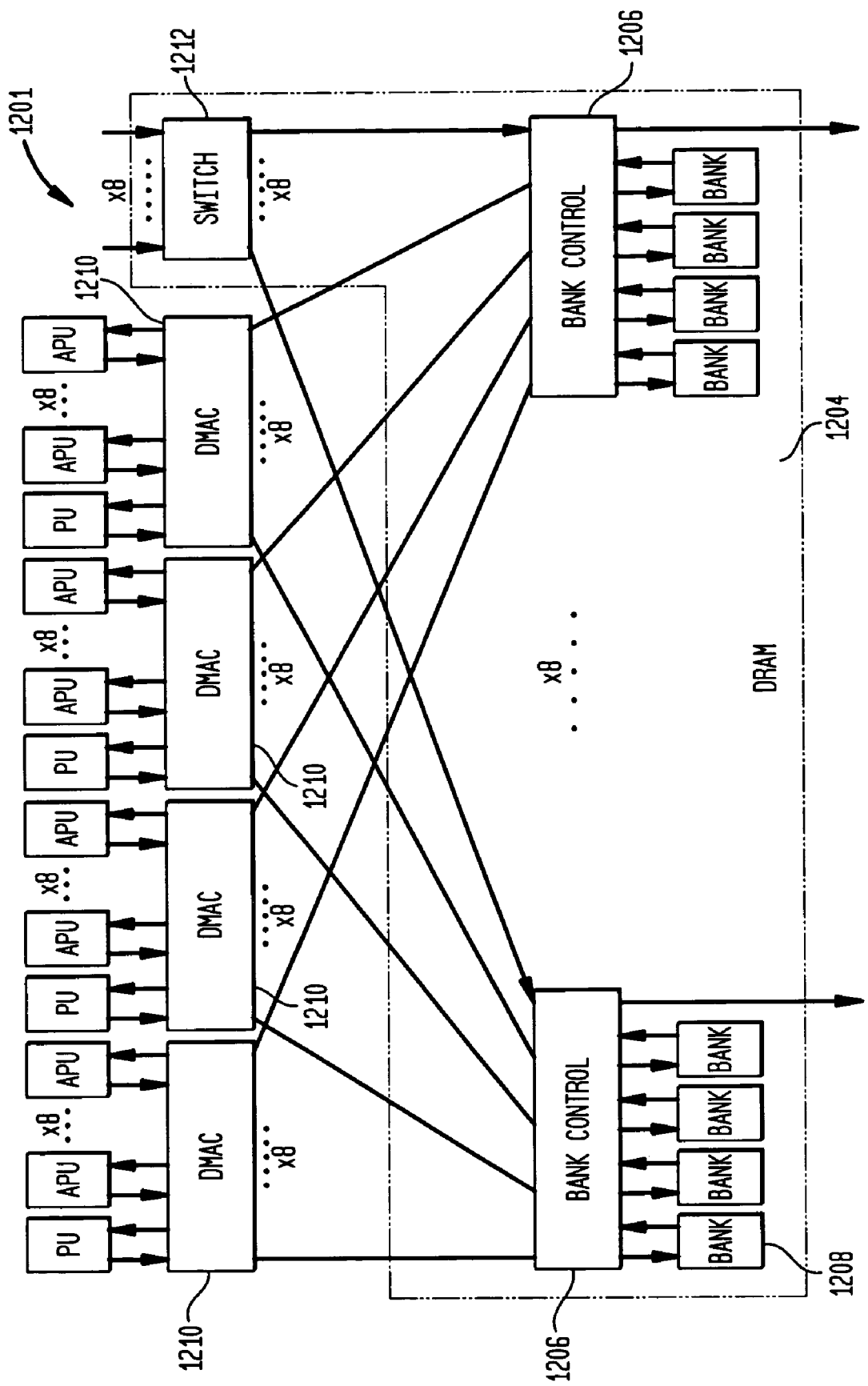
FIG. 12A illustrates the structure of a memory system in accordance with the present invention.

FIG. 12A illustrates the control system and structure for the DRAM of a BE. A similar control system and structure is employed in processors having other sizes and containing more or less PEs. As shown in this figure, a cross-bar switch connects each DMAC 1210 of the four PEs comprising BE 1201 to eight bank controls 1206. Each bank control 1206 controls eight banks 1208 (only four are shown in the figure) of DRAM 1204. DRAM 1204, therefore, comprises a total of sixty-four banks. In a preferred embodiment, DRAM 1204 has a capacity of 64 megabytes, and each bank has a capacity of 1 megabyte. The smallest addressable unit within each bank, in this preferred embodiment, is a block of 1024 bits.

BE 1201 also includes switch unit 1212. Switch unit 1212 enables other APUs on BEs closely coupled to BE 1201 to access DRAM 1204. A second BE, therefore, can be closely coupled to a first BE, and each APU of each BE can address twice the number of memory locations normally accessible to an APU. The direct reading or writing of data from or to the DRAM of a first BE from or to the DRAM of a second BE can occur through a switch unit such as switch unit 1212.

Figure 12B:
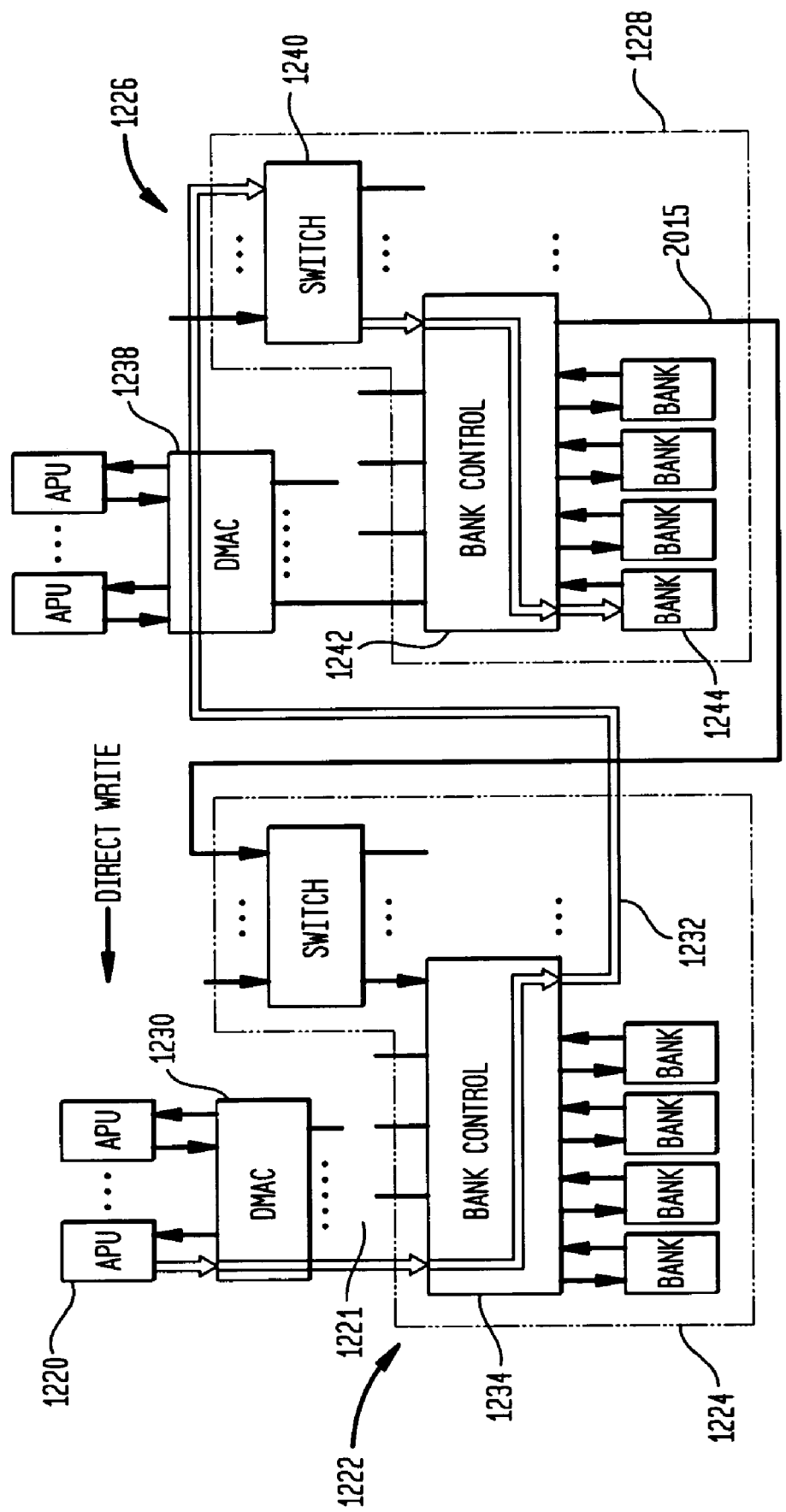
FIG. 12B illustrates the writing of data from a first broadband engine to a second broadband engine in accordance with the present invention.

For example, as shown in FIG. 12B, to accomplish such writing, the APU of a first. BE, e.g., APU 1220 of BE 1222, issues a write command to a memory location of a DRAM of a second BE, e.g., DRAM 1228 of BE 1226 (rather than, as in the usual case, to DRAM 1224 of BE 1222). DMAC 1230 of BE 1222 sends the write command through cross-bar switch 1221 to bank control 1234, and bank control 1234 transmits the command to an external port 1232 connected to bank control 1234. DMAC 1238 of BE 1226 receives the write command and transfers this command to switch unit 1240 of BE 1226. Switch unit 1240 identifies the DRAM address contained in the write command and sends the data for storage in this address through bank control 1242 of BE 1226 to bank 1244 of DRAM 1228. Switch unit 1240, therefore, enables both DRAM 1224 and DRAM 1228 to function as a single memory space for the APUs of BE 1222.

Figure 13:
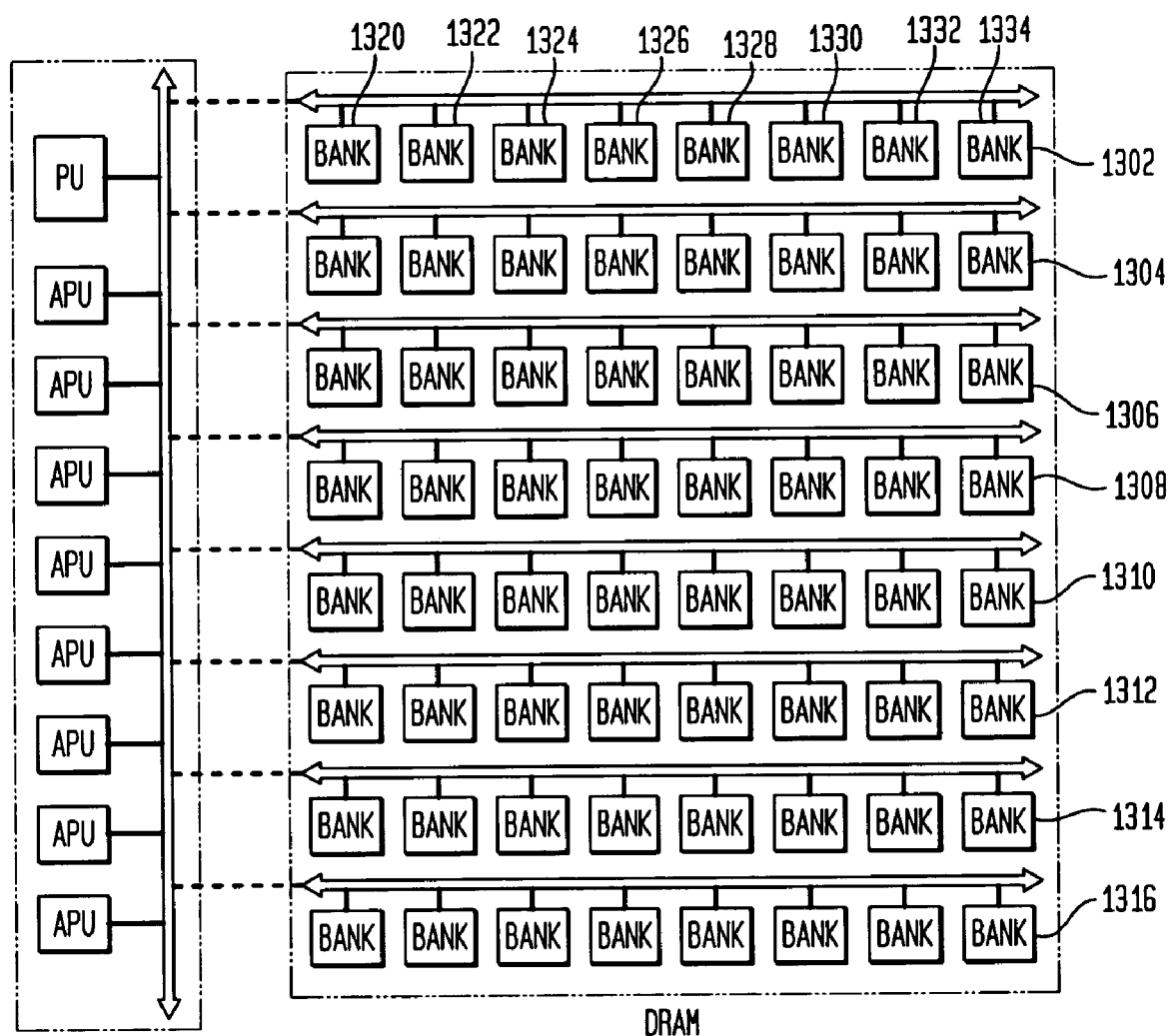
FIG. 13 is a diagram of the structure of a shared memory for a processor element in accordance with the present invention.

FIG. 13 shows the configuration of the sixty-four banks of a DRAM. These banks are arranged into eight rows, namely, rows 1302, 1304, 1306, 1308, 1310, 1312, 1314 and 1316 and eight columns, namely, columns 1320, 1322, 1324, 1326, 1328, 1330, 1332 and 1334. Each row is controlled by a bank controller. Each bank controller, therefore, controls eight megabytes of memory.

Figure 14A:
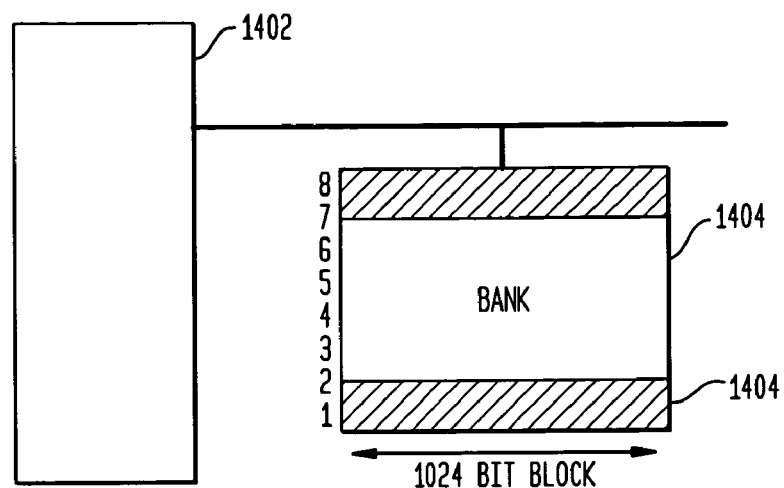
FIG. 14A illustrates one structure for a bank of the memory shown in FIG. 13.
Figure 14B:
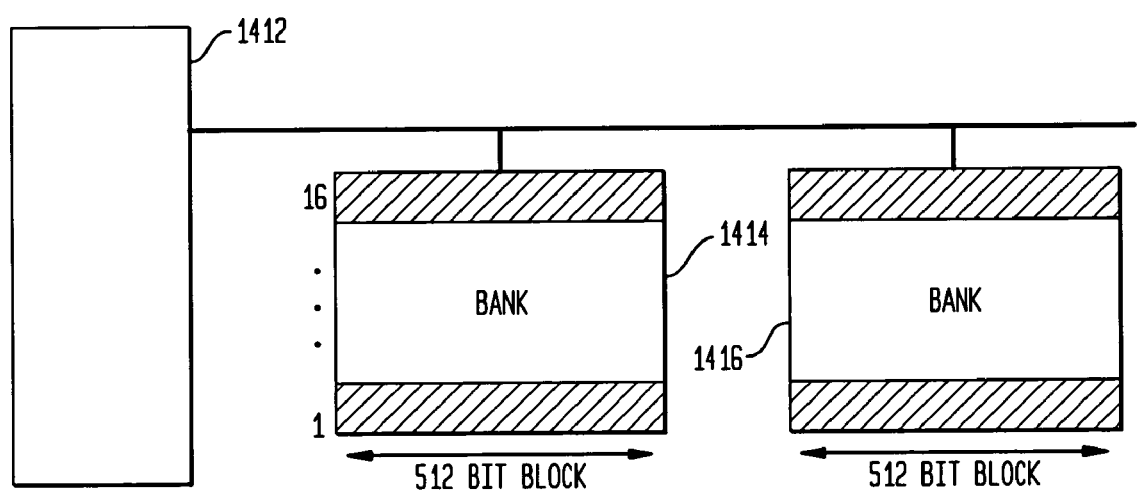
FIG. 14B illustrates another structure for a bank of the memory shown in FIG. 13.

FIGS. 14A and 14B illustrate different configurations for storing and accessing the smallest addressable memory unit of a DRAM, e.g., a block of 1024 bits. In FIG. 14A, DMAC 1402 stores in a single bank 1404 eight 1024 bit blocks 1406. In FIG. 14B, on the other hand, while DMAC 1412 reads and writes blocks of data containing 1024 bits, these blocks are interleaved between two banks, namely, bank 1414 and bank 1416. Each of these banks, therefore, contains sixteen blocks of data, and each block of data contains 512 bits. This interleaving can facilitate faster accessing of the DRAM and is useful in the processing of certain applications.

Figure 15:
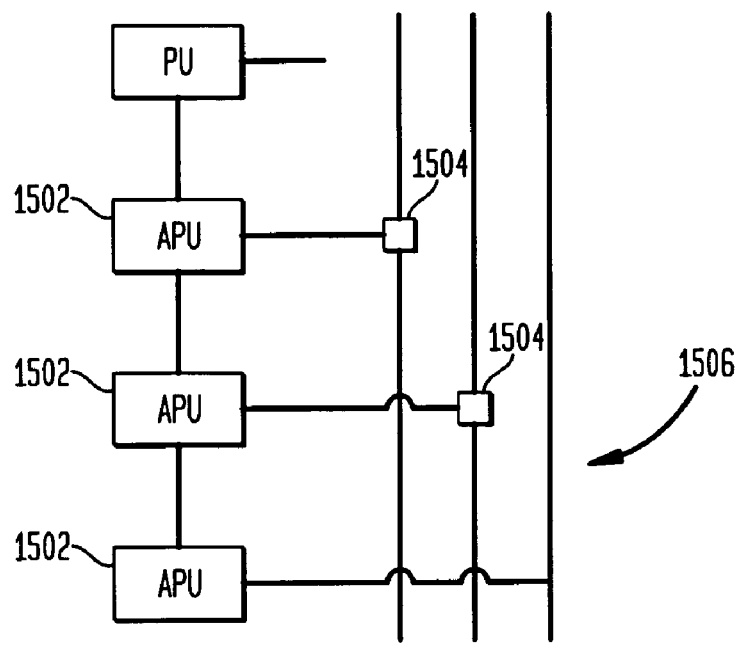
FIG. 15 illustrates a structure for a direct memory access controller in accordance with the present invention.

FIG. 15 illustrates the architecture for a DMAC 1504 within a PE. As illustrated in this figure, the structural hardware comprising DMAC 1506 is distributed throughout the PE such that each APU 1502 has direct access to a structural node 1504 of DMAC 1506. Each node executes the logic appropriate for memory accesses by the APU to which the node has direct access.

Figure 16:
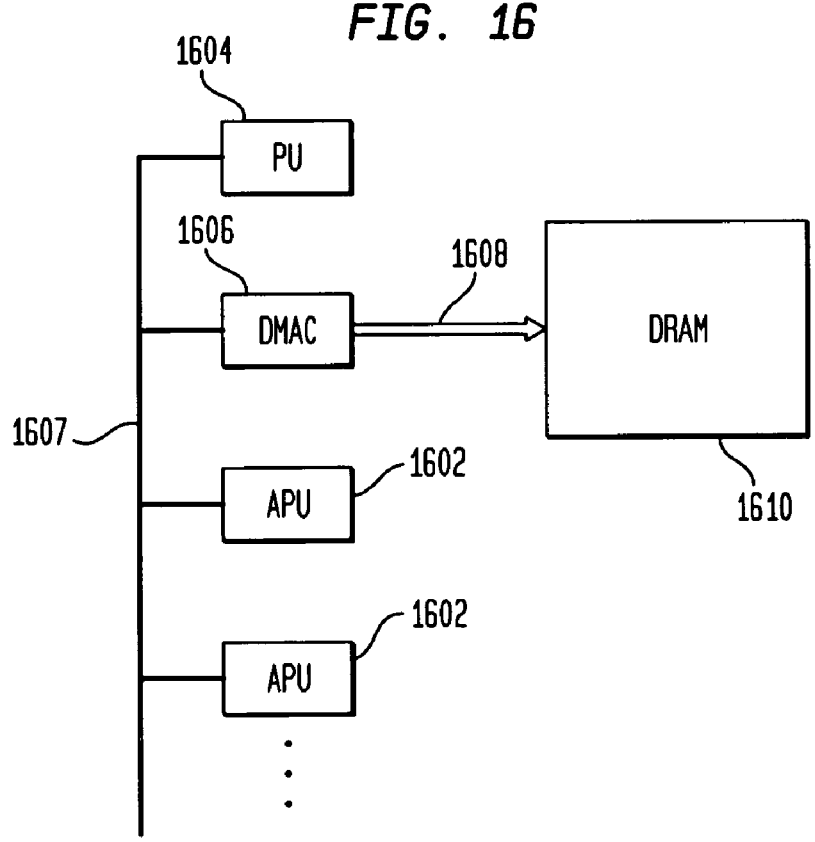
FIG. 16 illustrates an alternative structure for a direct memory access controller in accordance with the present invention.

FIG. 16 shows an alternative embodiment of the DMAC, namely, a non-distributed architecture. In this case, the structural hardware of DMAC 1606 is centralized. APUs 1602 and PU 1604 communicate with DMAC 1606 via local PE bus 1607. DMAC 1606 is connected through a cross-bar switch to a bus 1608. Bus 1608 is connected to DRAM 1610.

As discussed above, all of the multiple APUs of a PE can independently access data in the shared DRAM. As a result, a first APU could be operating upon particular data in its local storage at a time during which a second APU requests these data. If the data were provided to the second APU at that time from the shared DRAM, the data could be invalid because of the first APU's ongoing processing which could change the data's value. If the second processor received the data from the shared DRAM at that time, therefore, the second processor could generate an erroneous result. For example, the data could be a specific value for a global variable. If the first processor changed that value during its processing, the second processor would receive an outdated value. A scheme is necessary, therefore, to synchronize the APUs' reading and writing of data from and to memory locations within the shared DRAM. This scheme must prevent the reading of data from a memory location upon which another APU currently is operating in its local storage and, therefore, which are not current, and the writing of data into a memory location storing current data.

To overcome these problems, for each addressable memory location of the DRAM, an additional segment of memory is allocated in the DRAM for storing status information relating to the data stored in the memory location. This status information includes a full/empty (F/E) bit, the identification of an APU (APU ID) requesting data from the memory location and the address of the APU's local storage (LS address) to which the requested data should be read. An addressable memory location of the DRAM can be of any size. In a preferred embodiment, this size is 1024 bits.

The setting of the F/E bit to 1 indicates that the data stored in the associated memory location are current. The setting of the F/E bit to 0, on the other hand, indicates that the data stored in the associated memory location are not current. If an APU requests the data when this bit is set to 0, the APU is prevented from immediately reading the data. In this case, an APU ID identifying the APU requesting the data, and an LS address identifying the memory location within the local storage of this APU to which the data are to be read when the data become current, are entered into the additional memory segment.

An additional memory segment also is allocated for each memory location within the local storage of the APUs. This additional memory segment stores one bit, designated the "busy bit." The busy bit is used to reserve the associated LS memory location for the storage of specific data to be retrieved from the DRAM. If the busy bit is set to 1 for a particular memory location in local storage, the APU can use this memory location only for the writing of these specific data. On the other hand, if the busy bit is set to 0 for a particular memory location in local storage, the APU can use this memory location for the writing of any data.

Figure 17A:
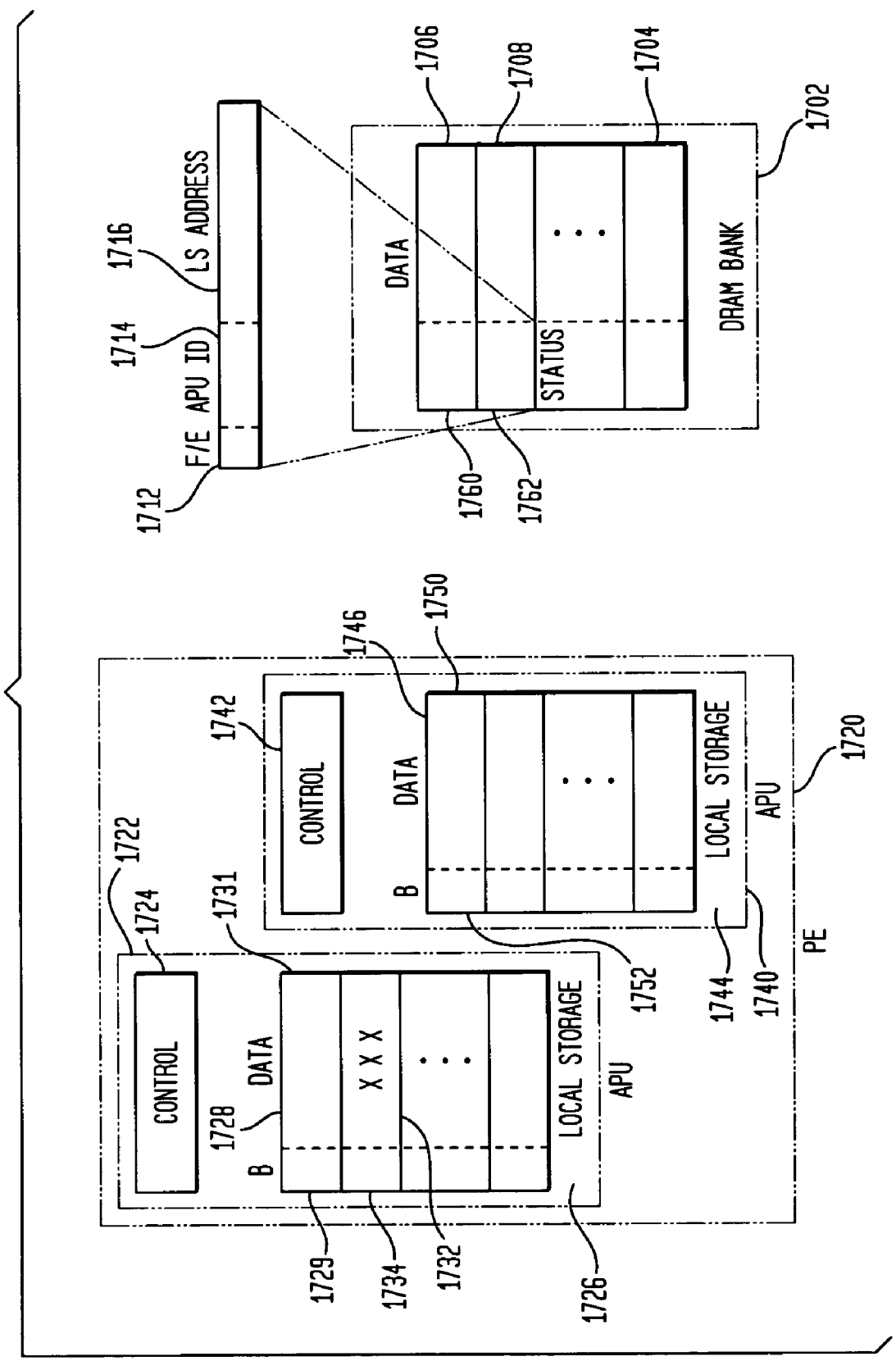
FIGS. 17A–17O illustrate the operation of data synchronization in accordance with the present invention.

Examples of the manner in which the F/E bit, the APU ID, the LS address and the busy bit are used to synchronize the reading and writing of data from and to the shared DRAM of a PE are illustrated in FIGS. 17A–17O.

As shown in FIG. 17A, one or more PEs, e.g., PE 1720, interact with DRAM 1702. PE 1720 includes APU 1722 and APU 1740. APU 1722 includes control logic 1724, and APU 1740 includes control logic 1742. APU 1722 also includes local storage 1726. This local storage includes a plurality of addressable memory locations 1728. APU 1740 includes local storage 1744, and this local storage also includes a plurality of addressable memory locations 1746. All of these addressable memory locations preferably are 1024 bits in size.

An additional segment of memory is associated with each LS addressable memory location. For example, memory segments 1729 and 1734 are associated with, respectively, local memory locations 1731 and 1732, and memory segment 1752 is associated with local memory location 1750. A "busy bit," as discussed above, is stored in each of these additional memory segments. Local memory location 1732 is shown with several Xs to indicate that this location contains data.

DRAM 1702 contains a plurality of addressable memory locations 1704, including memory locations 1706 and 1708. These memory locations preferably also are 1024 bits in size. An additional segment of memory also is associated with each of these memory locations. For example, additional memory segment 1760 is associated with memory location 1706, and additional memory segment 1762 is associated with memory location 1708. Status information relating to the data stored in each memory location is stored in the memory segment associated with the memory location. This status information includes, as discussed above, the F/E bit, the APU ID and the LS address. For example, for memory location 1708, this status information includes F/E bit 1712, APU ID 1714 and LS address 1716.

Using the status information and the busy bit, the synchronized reading and writing of data from and to the shared DRAM among the APUs of a PE, or a group of PEs, can be achieved.

Figure 17B:
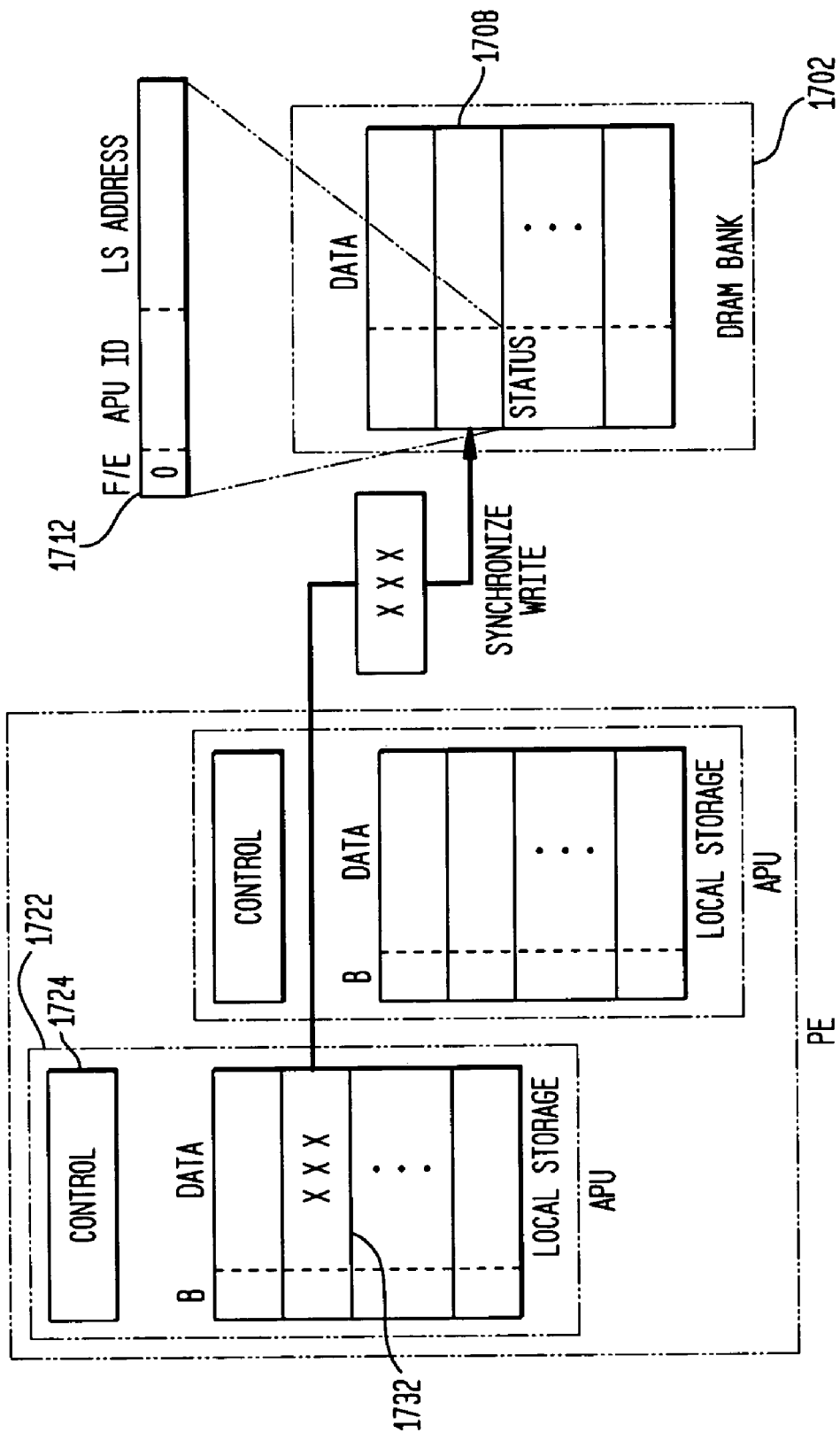

FIG. 17B illustrates the initiation of the synchronized writing of data from LS memory location 1732 of APU 1722 to memory location 1708 of DRAM 1702. Control 1724 of APU 1722 initiates the synchronized writing of these data. Since memory location 1708 is empty, F/E bit 1712 is set to 0. As a result, the data in LS location 1732 can be written into memory location 1708. If this bit were set to 1 to indicate that memory location 1708 is full and contains current, valid data, on the other hand, control 1722 would receive an error message and be prohibited from writing data into this memory location.

Figure 17C:
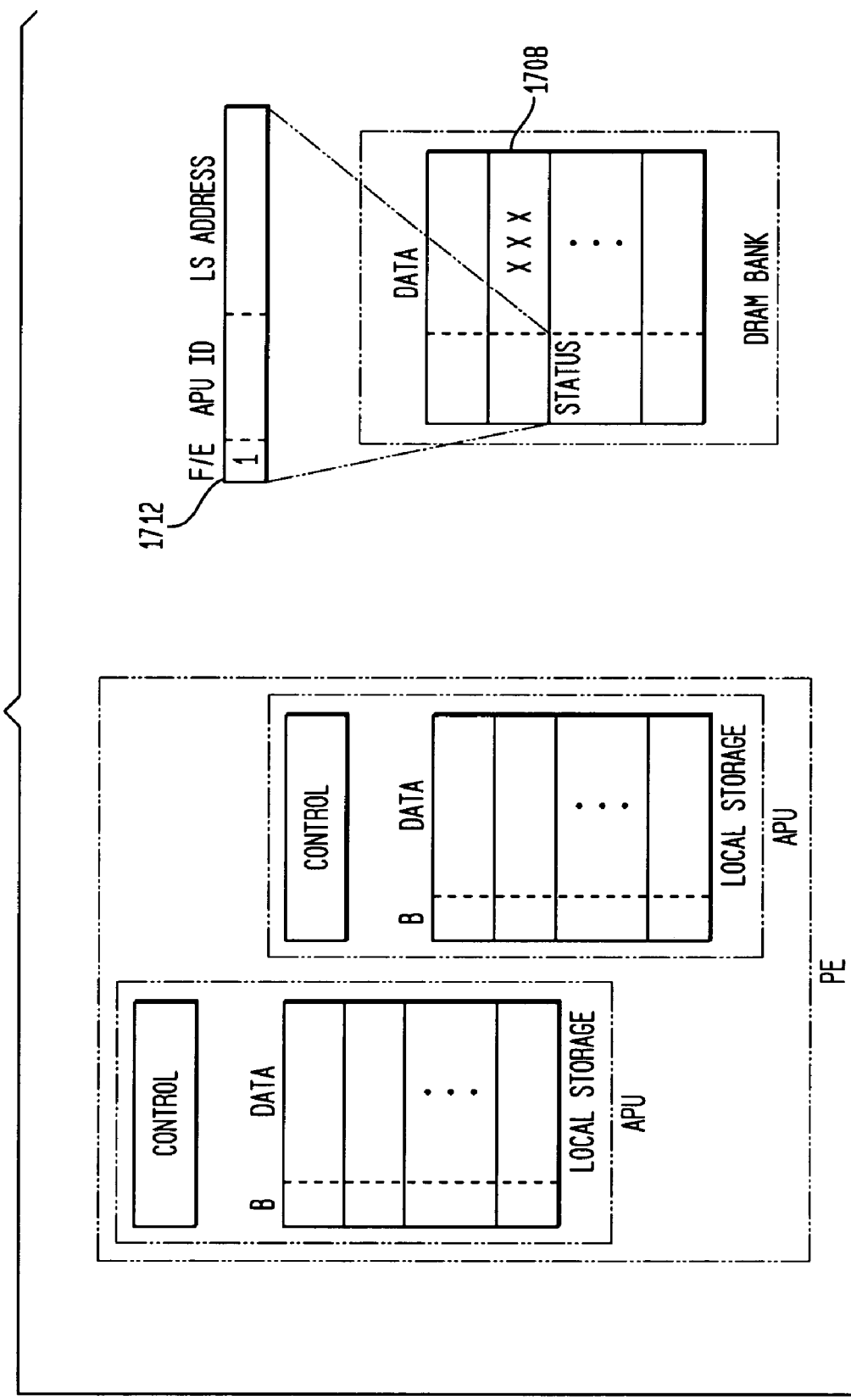

The result of the successful synchronized writing of the data into memory location 1708 is shown in FIG. 17C. The written data are stored in memory location 1708, and F/E bit 1712 is set to 1. This setting indicates that memory location 1708 is full and that the data in this memory location are current and valid.

Figure 17D:
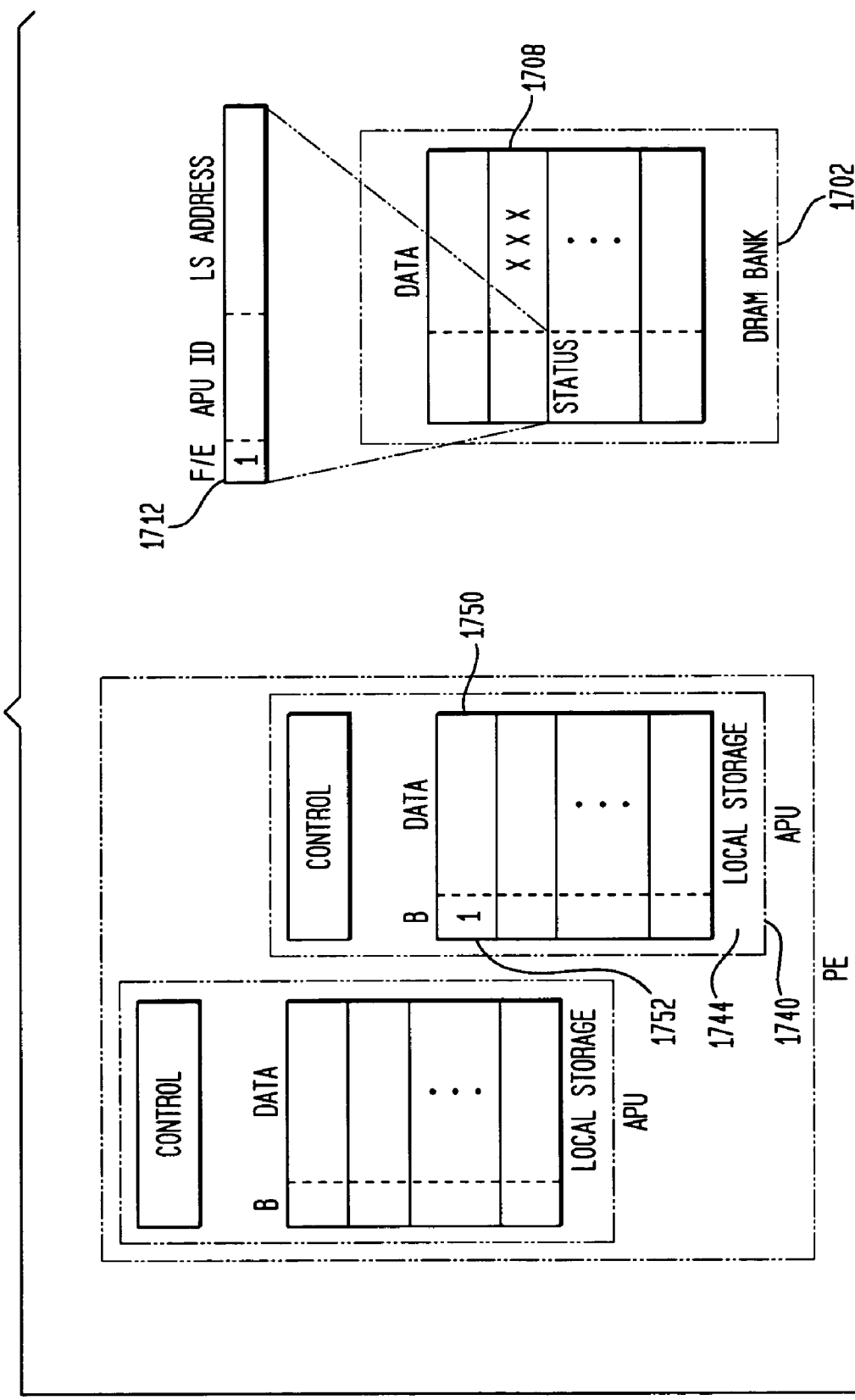

FIG. 17D illustrates the initiation of the synchronized reading of data from memory location 1708 of DRAM 1702 to LS memory location 1750 of local storage 1744. To initiate this reading, the busy bit in memory segment 1752 of LS memory location 1750 is set to 1 to reserve this memory location for these data. The setting of this busy bit to 1 prevents APU 1740 from storing other data in this memory location.

Figure 17E:
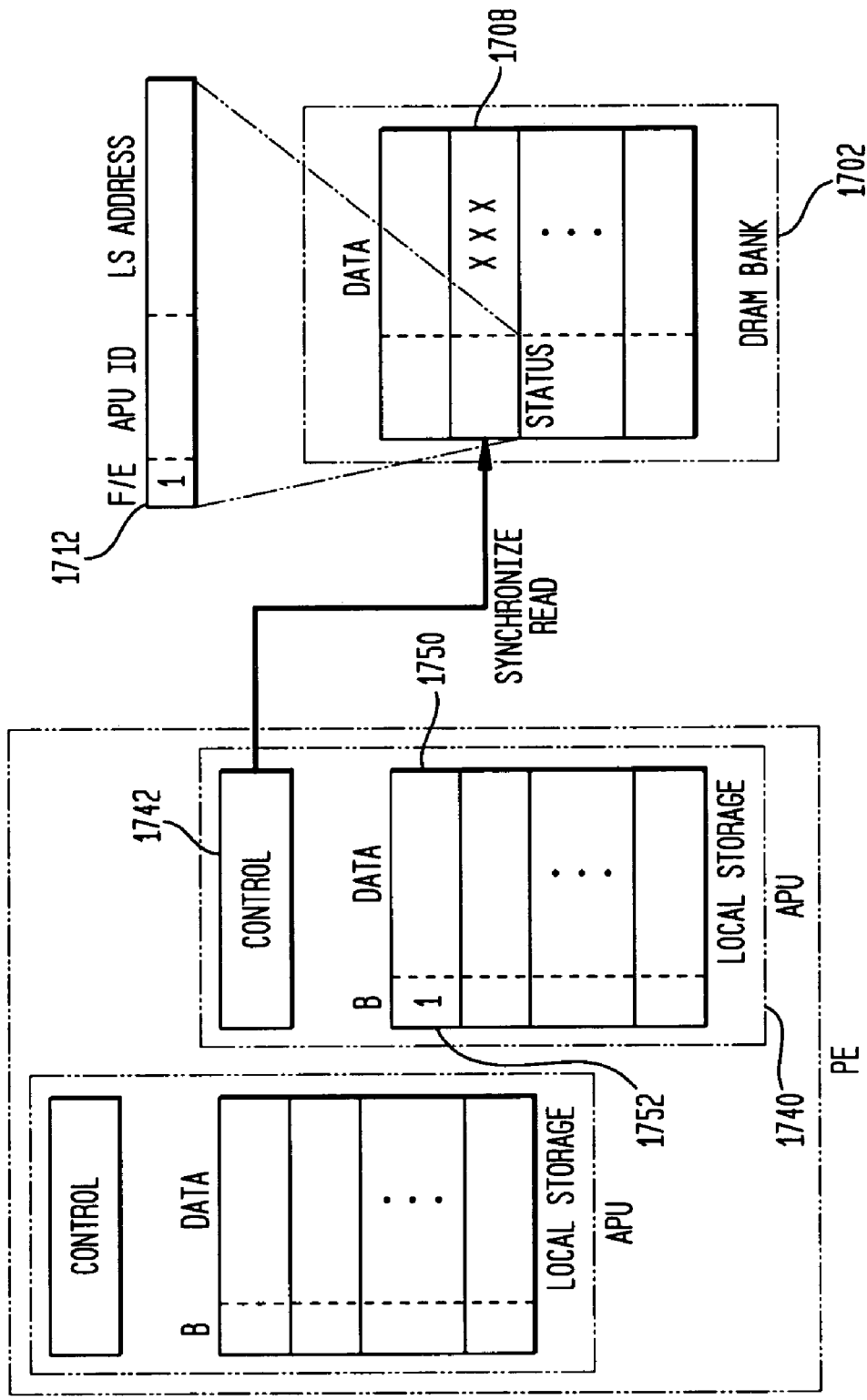
Figure 17F:
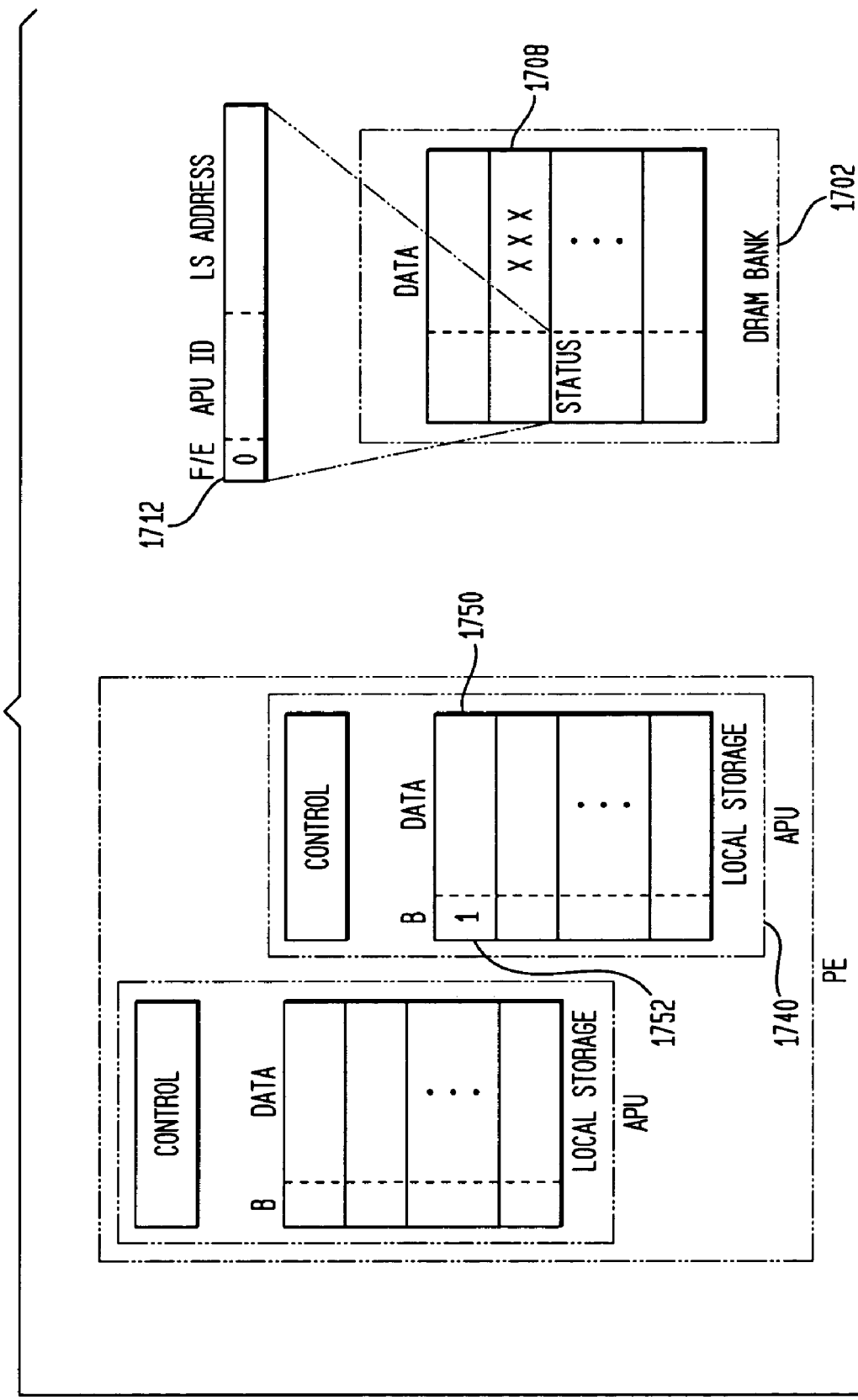

As shown in FIG. 17E, control logic 1742 next issues a synchronize read command for memory location 1708 of DRAM 1702. Since F/E bit 1712 associated with this memory location is set to 1, the data stored in memory location 1708 are considered current and valid. As a result, in preparation for transferring the data from memory location 1708 to LS memory location 1750, F/E bit 1712 is set to 0. This setting is shown in FIG. 17F. The setting of this bit to 0 indicates that, following the reading of these data, the data in memory location 1708 will be invalid.

Figure 17G:
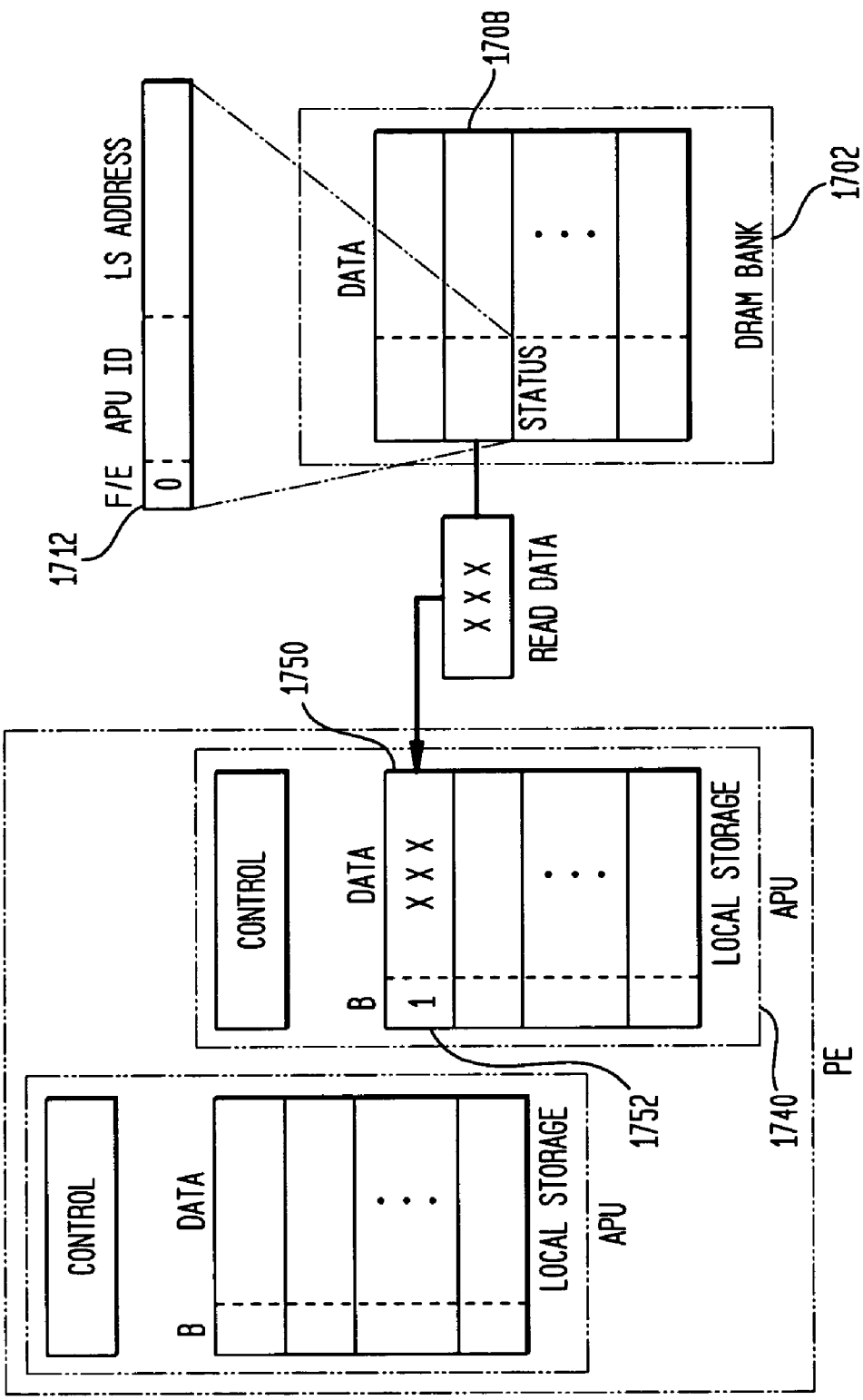
Figure 17H:
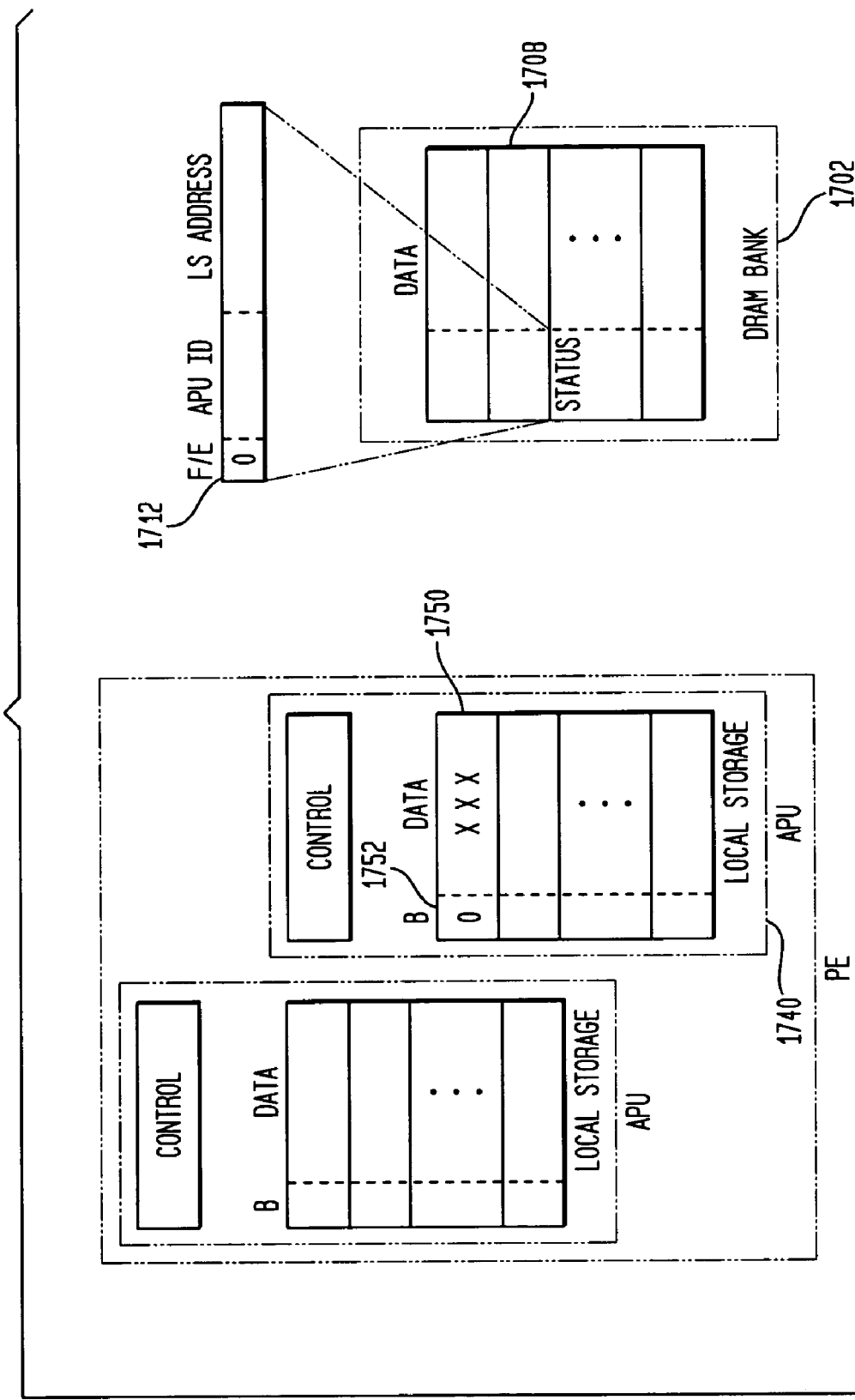

As shown in FIG. 17G, the data within memory location 1708 next are read from memory location 1708 to LS memory location 1750. FIG. 17H shows the final state. A copy of the data in memory location 1708 is stored in LS memory location 1750. F/E bit 1712 is set to 0 to indicate that the data in memory location 1708 are invalid. This invalidity is the result of alterations to these data to be made by APU 1740. The busy bit in memory segment 1752 also is set to 0. This setting indicates that LS memory location 1750 now is available to APU 1740 for any purpose, i.e., this LS memory location no longer is in a reserved state waiting for the receipt of specific data. LS memory location 1750, therefore, now can be accessed by APU 1740 for any purpose.

Figure 17I:
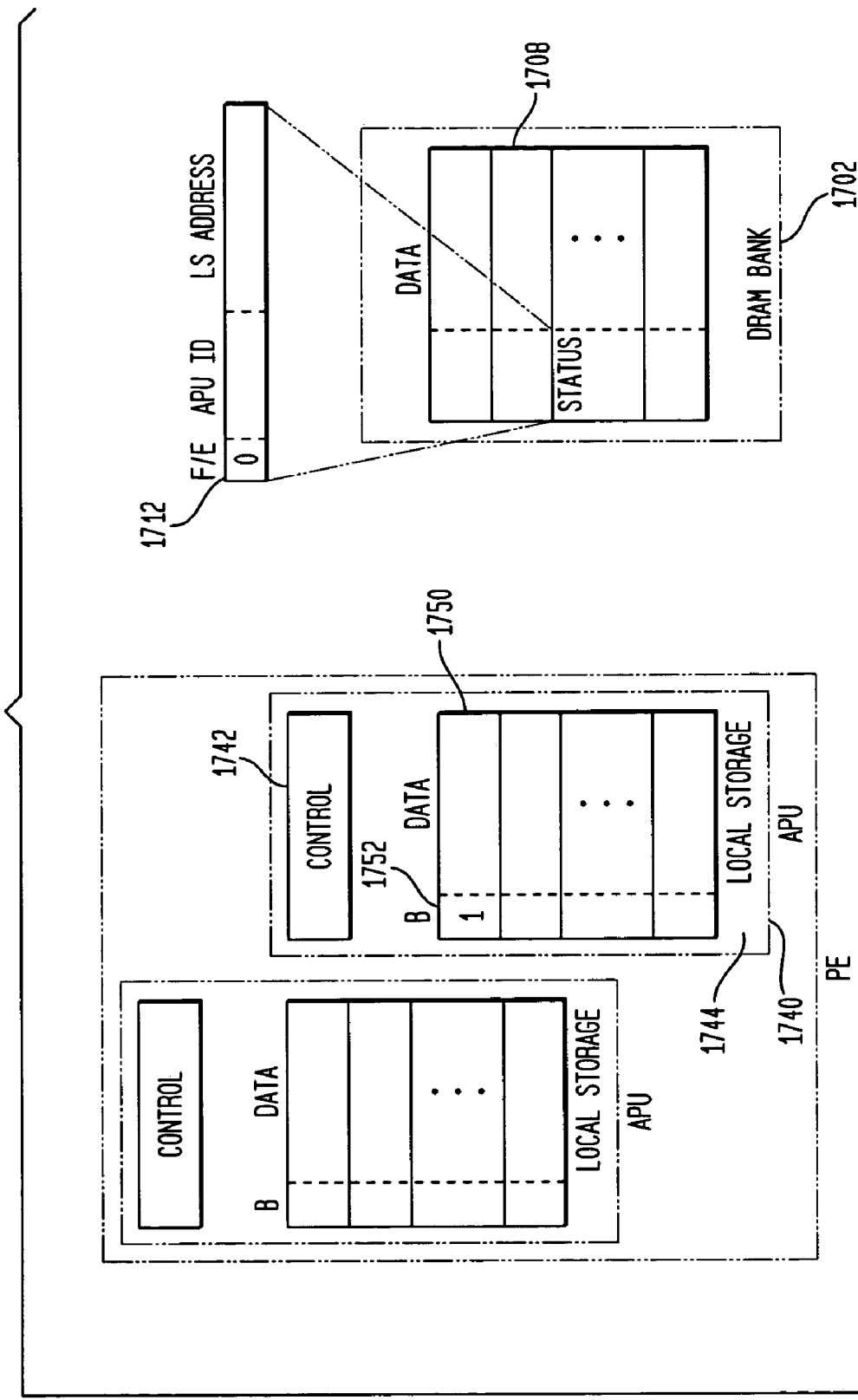
Figure 17J:
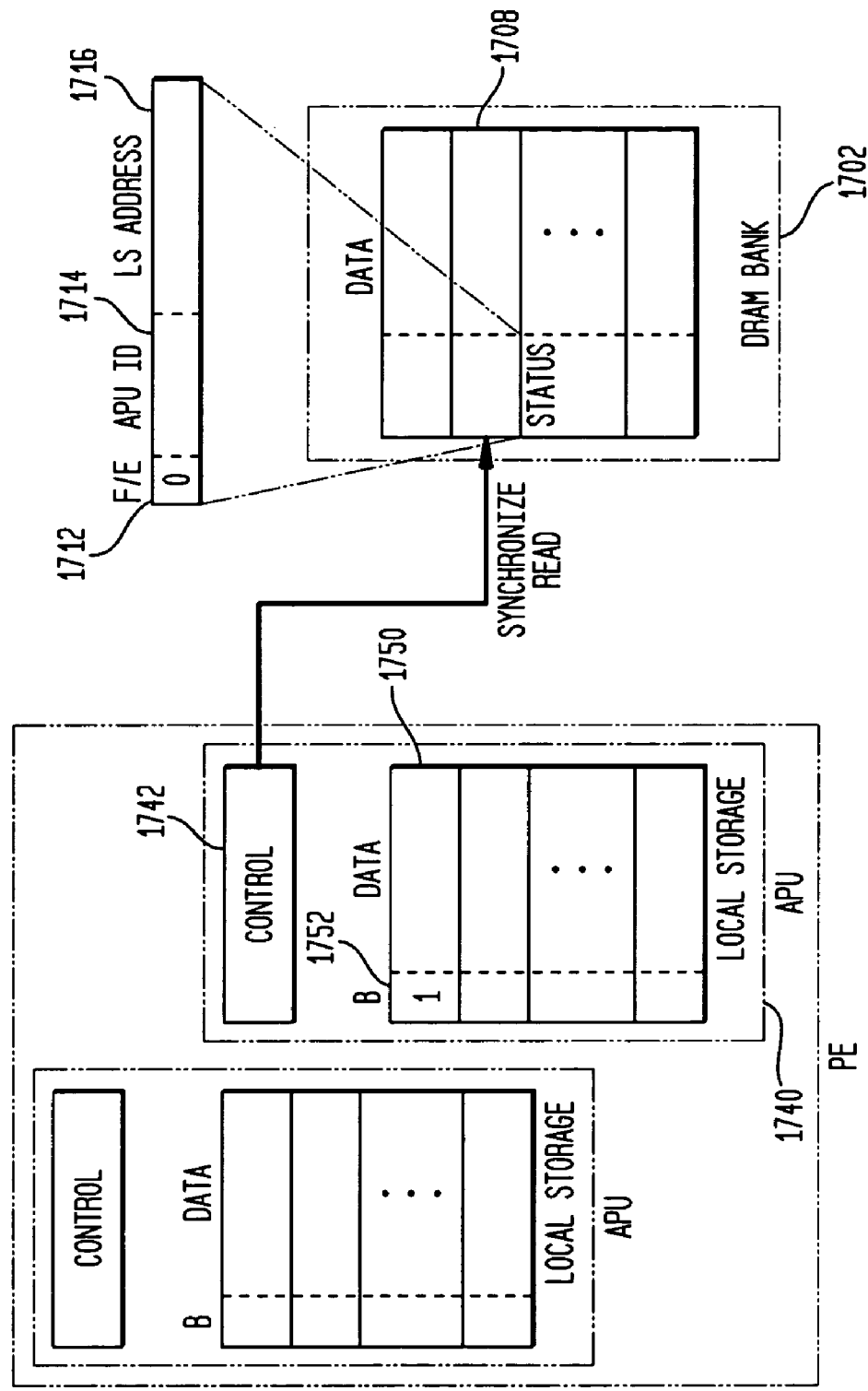

FIGS. 17I–17O illustrate the synchronized reading of data from a memory location of DRAM 1702, e.g., memory location 1708, to an LS memory location of an APU's local storage, e.g., LS memory location 1752 of local storage 1744, when the F/E bit for the memory location of DRAM 1702 is set to 0 to indicate that the data in this memory location are not current or valid. As shown in FIG. 17I, to initiate this transfer, the busy bit in memory segment 1752 of LS memory location 1750 is set to 1 to reserve this LS memory location for this transfer of data. As shown in FIG. 17J, control logic 1742 next issues a synchronize read command for memory location 1708 of DRAM 1702. Since the F/E bit associated with this memory location, F/E bit 1712, is set to 0, the data stored in memory location 1708 are invalid. As a result, a signal is transmitted to control logic 1742 to block the immediate reading of data from this memory location.

Figure 17K:
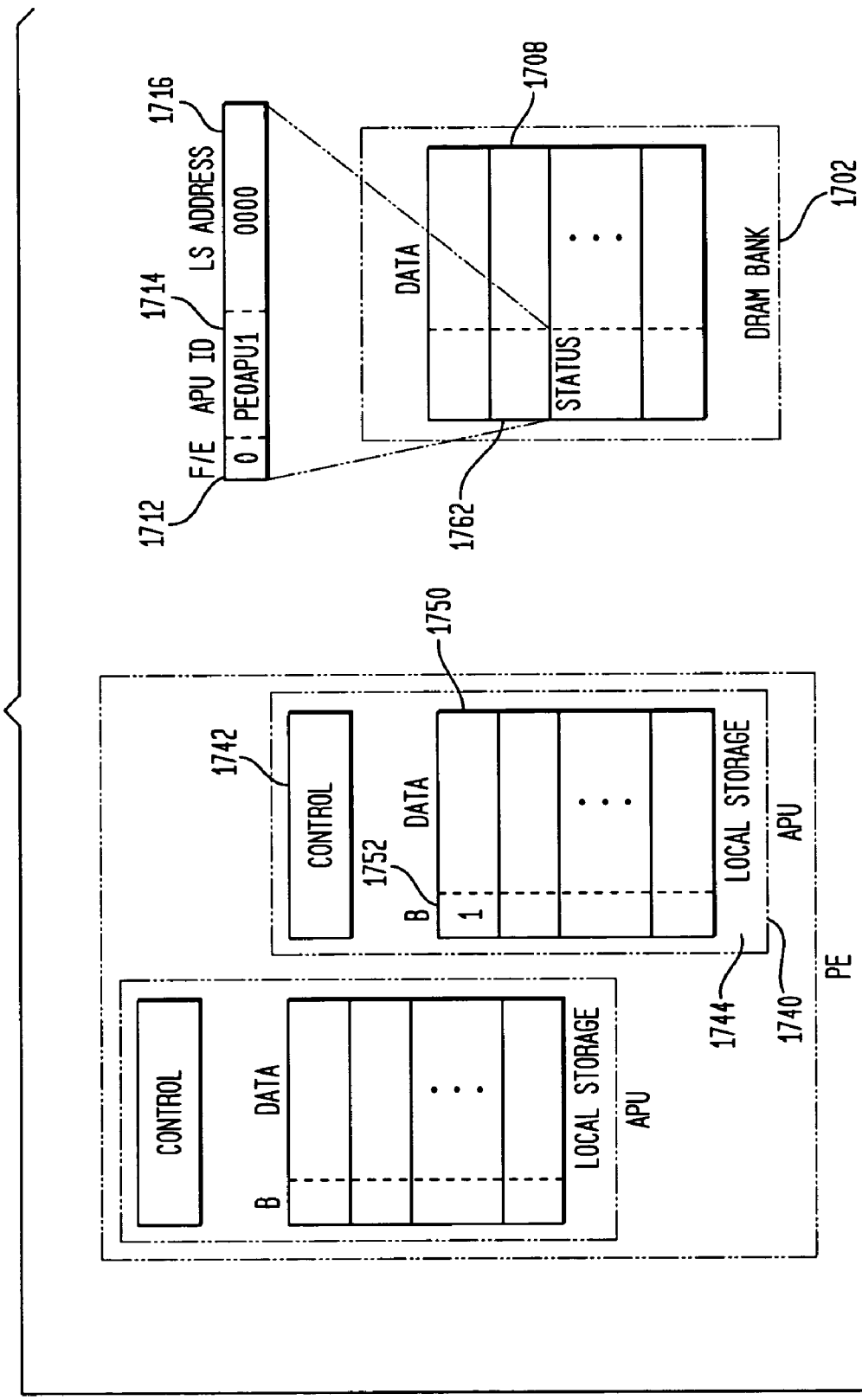

As shown in FIG. 17K, the APU ID 1714 and LS address 1716 for this read command next are written into memory segment 1762. In this case, the APU ID for APU 1740 and the LS memory location for LS memory location 1750 are written into memory segment 1762. When the data within memory location 1708 become current, therefore, this APU ID and LS memory location are used for determining the location to which the current data are to be transmitted.

Figure 17L:
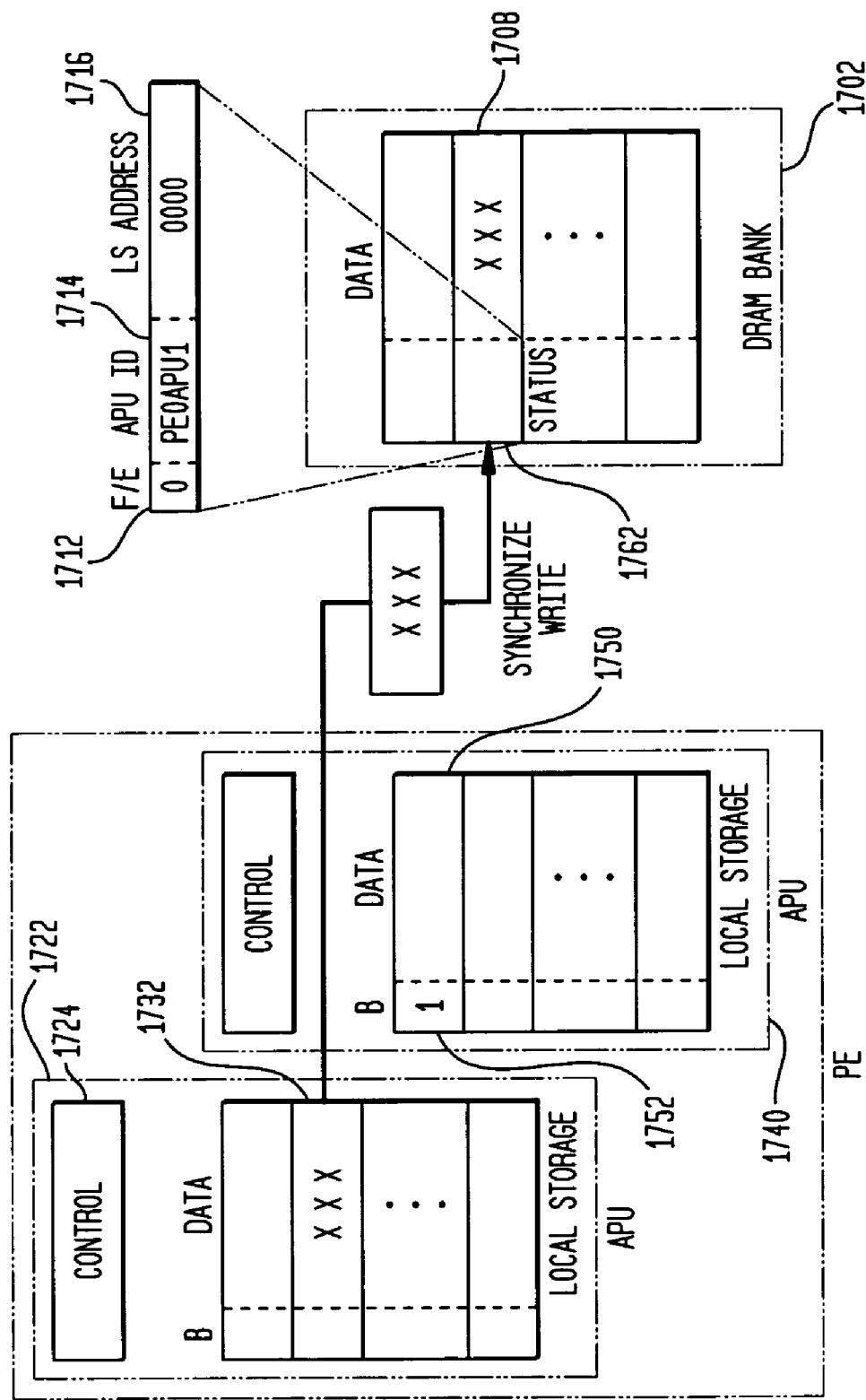

The data in memory location 1708 become valid and current when an APU writes data into this memory location. The synchronized writing of data into memory location 1708 from, e.g., memory location 1732 of APU 1722, is illustrated in FIG. 17L. This synchronized writing of these data is permitted because F/E bit 1712 for this memory location is set to 0.

Figure 17M:
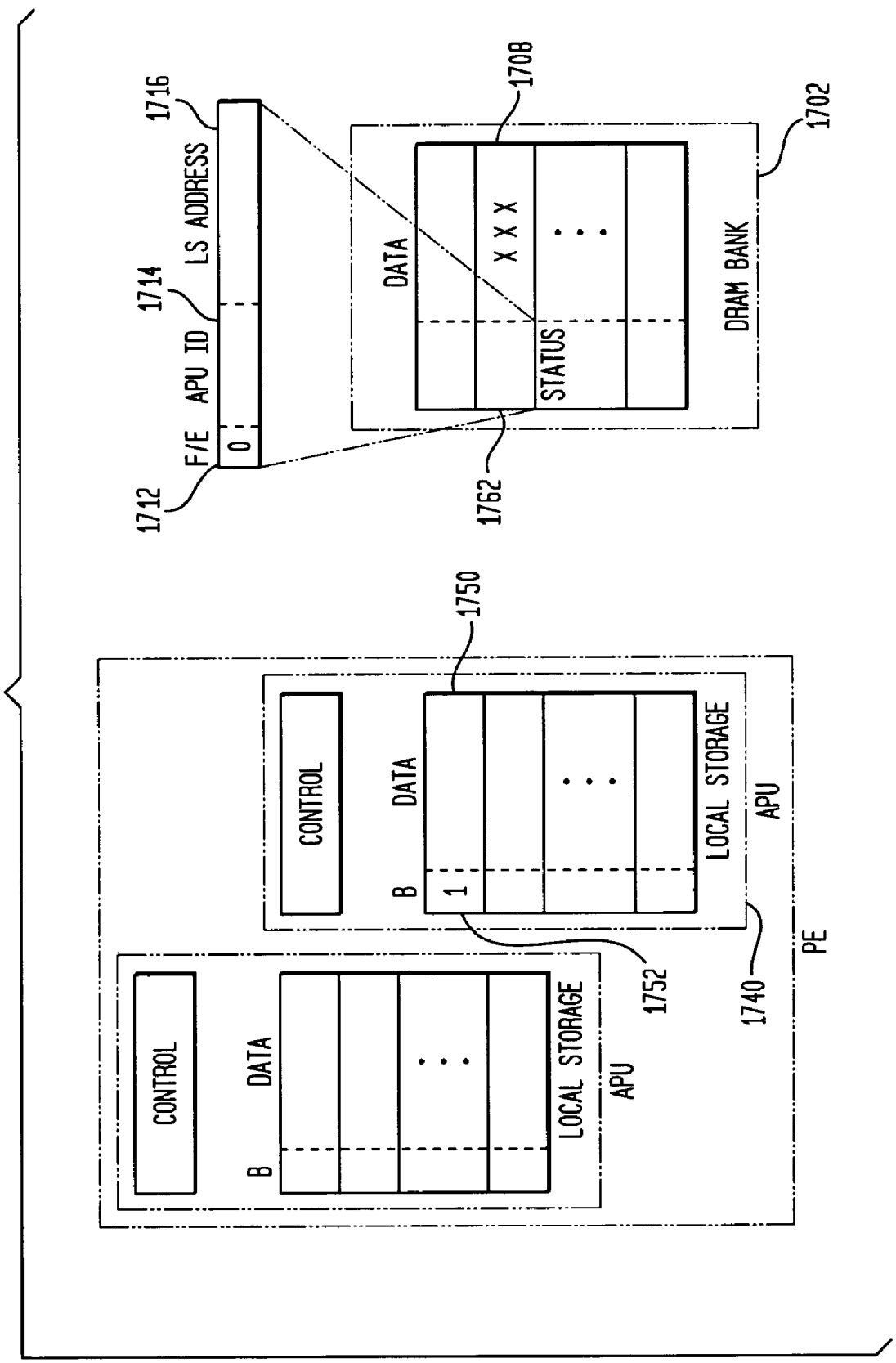
Figure 17N:
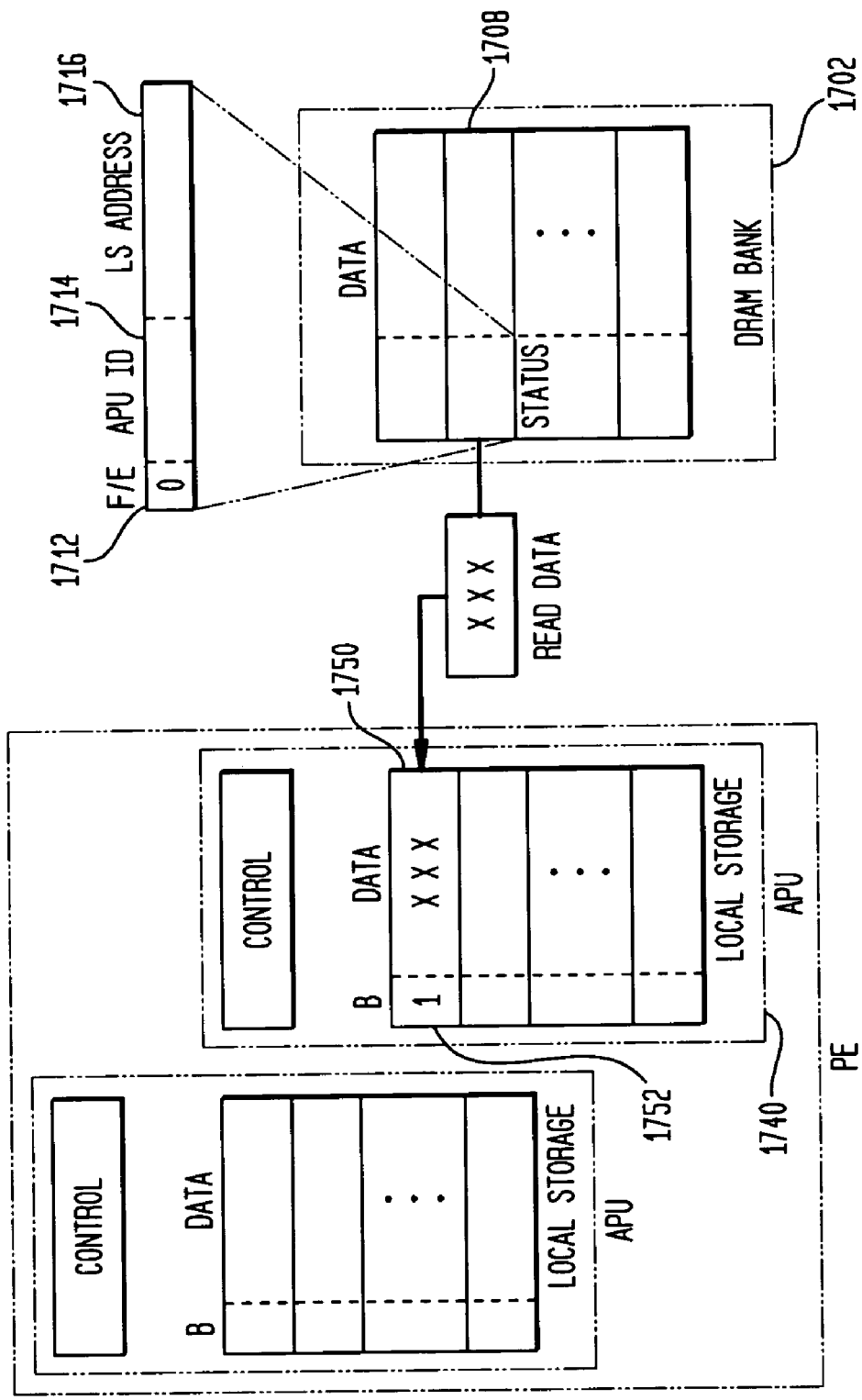

As shown in FIG. 17M, following this writing, the data in memory location 1708 become current and valid. APU ID 1714 and LS address 1716 from memory segment 1762, therefore, immediately are read from memory segment 1762, and this information then is deleted from this segment. F/E bit 1712 also is set to 0 in anticipation of the immediate reading of the data in memory location 1708. As shown in FIG. 17N, upon reading APU ID 1714 and LS address 1716, this information immediately is used for reading the valid data in memory location 1708 to LS memory location 1750 of APU 1740. The final state is shown in FIG. 17O. This figure shows the valid data from memory location 1708 copied to memory location 1750, the busy bit in memory segment 1752 set to 0 and F/E bit 1712 in memory segment 1762 set to 0. The setting of this busy bit to 0 enables LS memory location 1750 now to be accessed by APU 1740 for any purpose. The setting of this F/E bit to 0 indicates that the data in memory location 1708 no longer are current and valid.

Figures 18, 19:
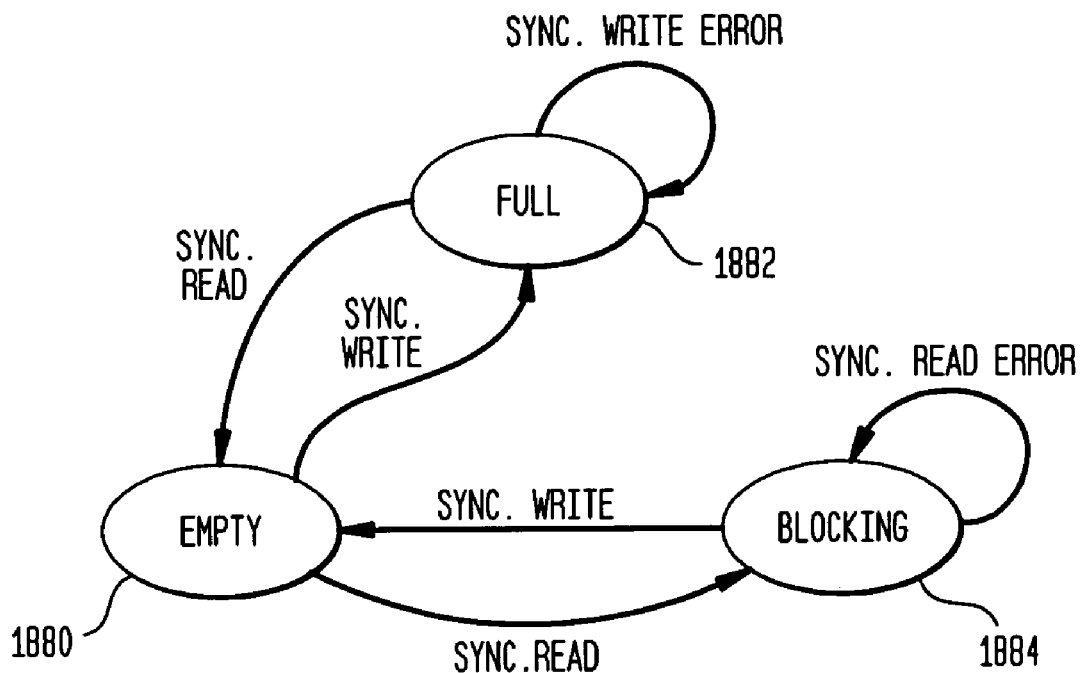
FIG. 18 is a three-state memory diagram illustrating the various states of a memory location in accordance with the data synchronization scheme of the present invention.
FIG. 19 illustrates the structure of a key control table for a hardware sandbox in accordance with the present invention.

FIG. 18 summarizes the operations described above and the various states of a memory location of the DRAM based upon the states of the F/E bit, the APU ID and the LS address stored in the memory segment corresponding to the memory location. The memory location can have three states. These three states are an empty state 1880 in which the F/E bit is set to 0 and no information is provided for the APU ID or the LS address, a full state 1882 in which the F/E bit is set to 1 and no information is provided for the APU ID or LS address and a blocking state 1884 in which the F/E bit is set to 0 and information is provided for the APU ID and LS address.

As shown in this figure, in empty state 1880, a synchronized writing operation is permitted and results in a transition to full state 1882. A synchronized reading operation, however, results in a transition to the blocking state 1884 because the data in the memory location, when the memory location is in the empty state, are not current.

In full state 1882, a synchronized reading operation is permitted and results in a transition to empty state 1880. On the other hand, a synchronized writing operation in full state 1882 is prohibited to prevent overwriting of valid data. If such a writing operation is attempted in this state, no state change occurs and an error message is transmitted to the APU's corresponding control logic.

In blocking state 1884, the synchronized writing of data into the memory location is permitted and results in a transition to empty state 1880. On the other hand, a synchronized reading operation in blocking state 1884 is prohibited to prevent a conflict with the earlier synchronized reading operation which resulted in this state. If a synchronized reading operation is attempted in blocking state 1884, no state change occurs and an error message is transmitted to the APU's corresponding control logic.

The scheme described above for the synchronized reading and writing of data from and to the shared DRAM also can be used for eliminating the computational resources normally dedicated by a processor for reading data from, and writing data to, external devices. This input/output (I/O) function could be performed by a PU. However, using a modification of this synchronization scheme, an APU running an appropriate program can perform this function. For example, using this scheme, a PU receiving an interrupt request for the transmission of data from an I/O interface initiated by an external device can delegate the handling of this request to this APU. The APU then issues a synchronize write command to the I/O interface. This interface in turn signals the external device that data now can be written into the DRAM. The APU next issues a synchronize read command to the DRAM to set the DRAM's relevant memory space into a blocking state. The APU also sets to 1 the busy bits for the memory locations of the APU's local storage needed to receive the data. In the blocking state, the additional memory segments associated with the DRAM's relevant memory space contain the APU's ID and the address of the relevant memory locations of the APU's local storage. The external device next issues a synchronize write command to write the data directly to the DRAM's relevant memory space. Since this memory space is in the blocking state, the data are immediately read out of this space into the memory locations of the APU's local storage identified in the additional memory segments. The busy bits for these memory locations then are set to 0. When the external device completes writing of the data, the APU issues a signal to the PU that the transmission is complete.

Using this scheme, therefore, data transfers from external devices can be processed with minimal computational load on the PU. The APU delegated this function, however, should be able to issue an interrupt request to the PU, and the external device should have direct access to the DRAM.

The DRAM of each PE includes a plurality of "sandboxes." A sandbox defines an area of the shared DRAM beyond which a particular APU, or set of APUs, cannot read or write data. These sandboxes provide security against the corruption of data being processed by one APU by data being processed by another APU. These sandboxes also permit the downloading of software cells from network 104 into a particular sandbox without the possibility of the software cell corrupting data throughout the DRAM. In the present invention, the sandboxes are implemented in the hardware of the DRAMs and DMACs. By implementing these sandboxes in this hardware rather than in software, advantages in speed and security are obtained.

The PU of a PE controls the sandboxes assigned to the APUs. Since the PU normally operates only trusted programs, such as an operating system, this scheme does not jeopardize security. In accordance with this scheme, the PU builds and maintains a key control table. This key control table is illustrated in FIG. 19. As shown in this figure, each entry in key control table 1902 contains an identification (ID) 1904 for an APU, an APU key 1906 for that APU and a key mask 1908. The use of this key mask is explained below. Key control table 1902 preferably is stored in a relatively fast memory, such as a static random access memory (SRAM), and is associated with the DMAC. The entries in key control table 1902 are controlled by the PU. When an APU requests the writing of data to, or the reading of data from, a particular storage location of the DRAM, the DMAC evaluates the APU key 1906 assigned to that APU in key control table 1902 against a memory access key associated with that storage location.

Figure 20:
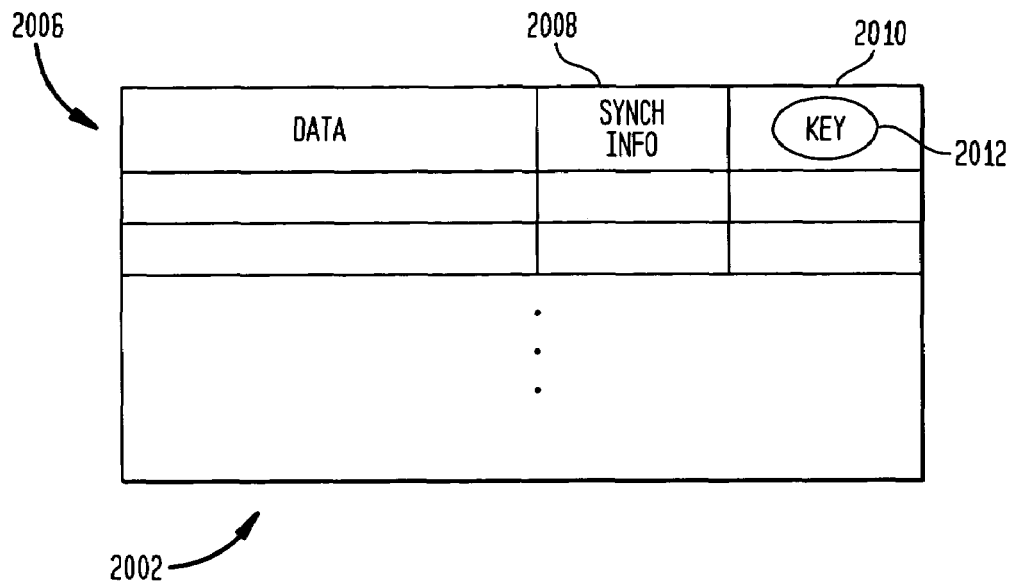
FIG. 20 illustrates a scheme for storing memory access keys for a hardware sandbox in accordance with the present invention.

As shown in FIG. 20, a dedicated memory segment 2010 is assigned to each addressable storage location 2006 of a DRAM 2002. A memory access key 2012 for the storage location is stored in this dedicated memory segment. As discussed above, a further additional dedicated memory segment 2008, also associated with each addressable storage location 2006, stores synchronization information for writing data to, and reading data from, the storage location.

In operation, an APU issues a DMA command to the DMAC. This command includes the address of a storage location 2006 of DRAM 2002. Before executing this command, the DMAC looks up the requesting APU's key 1906 in key control table 1902 using the APU's ID 1904. The DMAC then compares the APU key 1906 of the requesting APU to the memory access key 2012 stored in the dedicated memory segment 2010 associated with the storage location of the DRAM to which the APU seeks access. If the two keys do not match, the DMA command is not executed. On the other hand, if the two keys match, the DMA command proceeds and the requested memory access is executed.

Figure 21:
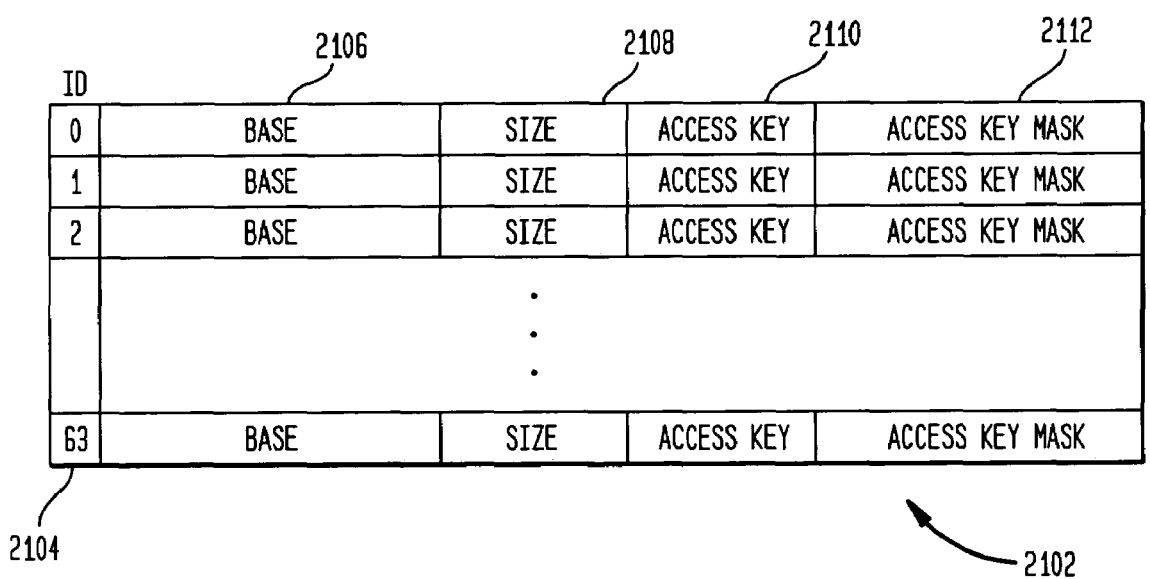
FIG. 21 illustrates the structure of a memory access control table for a hardware sandbox in accordance with the present invention.

An alternative embodiment is illustrated in FIG. 21. In this embodiment, the PU also maintains a memory access control table 2102. Memory access control table 2102 contains an entry for each sandbox within the DRAM. In the particular example of FIG. 21, the DRAM contains 64 sandboxes. Each entry in memory access control table 2102 contains an identification (ID) 2104 for a sandbox, a base memory address 2106, a sandbox size 2108, a memory access key 2110 and an access key mask 2110. Base memory address 2106 provides the address in the DRAM which starts a particular memory sandbox. Sandbox size 2108 provides the size of the sandbox and, therefore, the endpoint of the particular sandbox.

Figure 22:
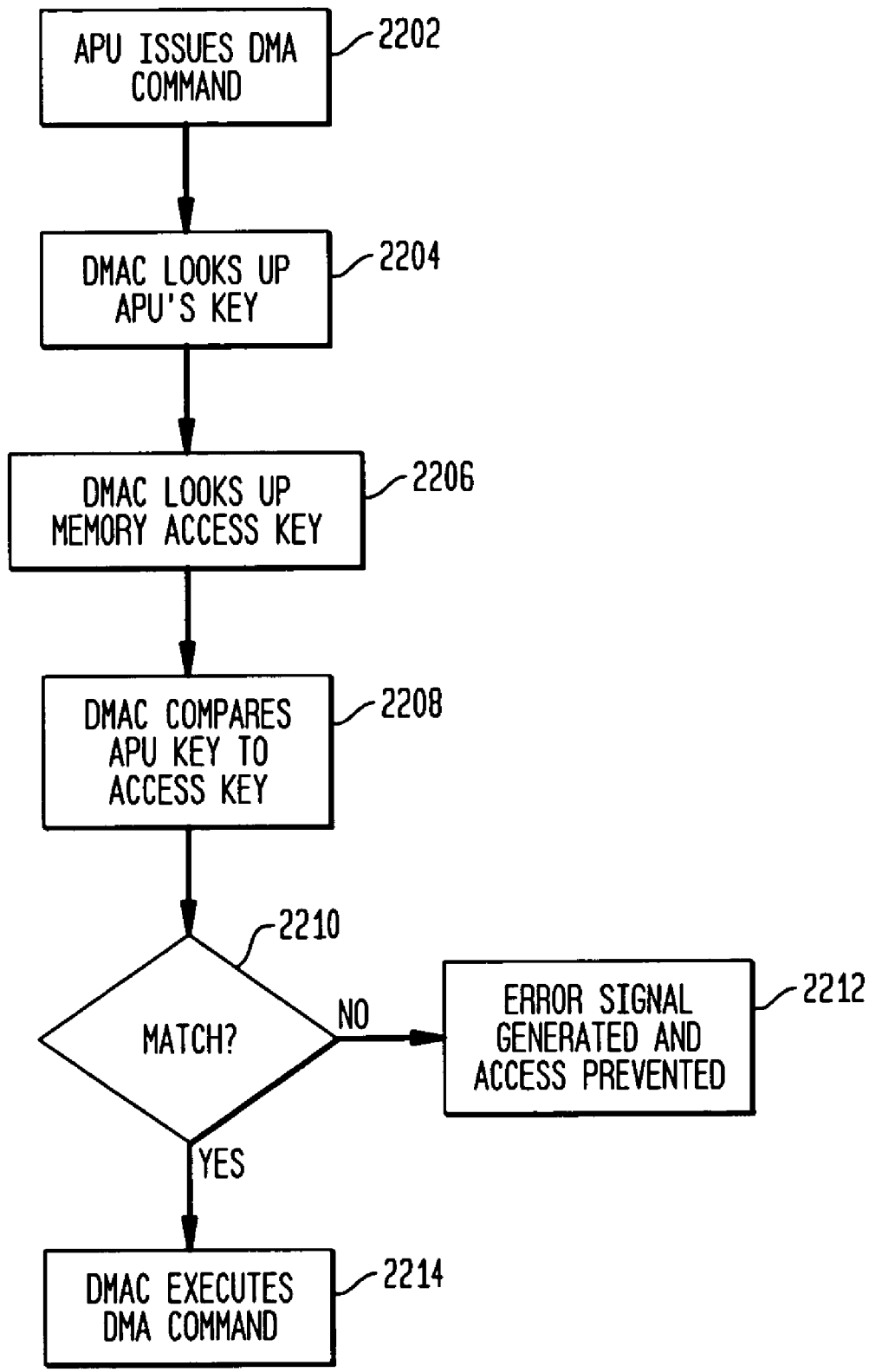
FIG. 22 is a flow diagram of the steps for accessing a memory sandbox using the key control table of FIG. 19 and the memory access control table of FIG. 21.

FIG. 22 is a flow diagram of the steps for executing a DMA command using key control table 1902 and memory access control table 2102. In step 2202, an APU issues a DMA command to the DMAC for access to a particular memory location or locations within a sandbox. This command includes a sandbox ID 2104 identifying the particular sandbox for which access is requested. In step 2204, the DMAC looks up the requesting APU's key 1906 in key control table 1902 using the APU's ID 1904. In step 2206, the DMAC uses the sandbox ID 2104 in the command to look up in memory access control table 2102 the memory access key 2110 associated with that sandbox. In step 2208, the DMAC compares the APU key 1906 assigned to the requesting APU to the access key 2110 associated with the sandbox. In step 2210, a determination is made of whether the two keys match. If the two keys do not match, the process moves to step 2212 where the DMA command does not proceed and an error message is sent to either the requesting APU, the PU or both. On the other hand, if at step 2210 the two keys are found to match, the process proceeds to step 2214 where the DMAC executes the DMA command.

The key masks for the APU keys and the memory access keys provide greater flexibility to this system. A key mask for a key converts a masked bit into a wildcard. For example, if the key mask 1908 associated with an APU key 1906 has its last two bits set to "mask," designated by, e.g., setting these bits in key mask 1908 to 1, the APU key can be either a 1 or a 0 and still match the memory access key. For example, the APU key might be 1010. This APU key normally allows access only to a sandbox having an access key of 1010. If the APU key mask for this APU key is set to 0001, however, then this APU key can be used to gain access to sandboxes having an access key of either 1010 or 1011. Similarly, an access key 1010 with a mask set to 0001 can be accessed by an APU with an APU key of either 1010 or 1011. Since both the APU key mask and the memory key mask can be used simultaneously, numerous variations of accessibility by the APUs to the sandboxes can be established.

The present invention also provides a new programming model for the processors of system 101. This programming model employs software cells 102. These cells can be transmitted to any processor on network 104 for processing. This new programming model also utilizes the unique modular architecture of system 101 and the processors of system 101.

Software cells are processed directly by the APUs from the APU's local storage. The APUs do not directly operate on any data or programs in the DRAM. Data and programs in the DRAM are read into the APU's local storage before the APU processes these data and programs. The APU's local storage, therefore, includes a program counter, stack and other software elements for executing these programs. The PU controls the APUs by issuing direct memory access (DMA) commands to the DMAC.

Figure 23:
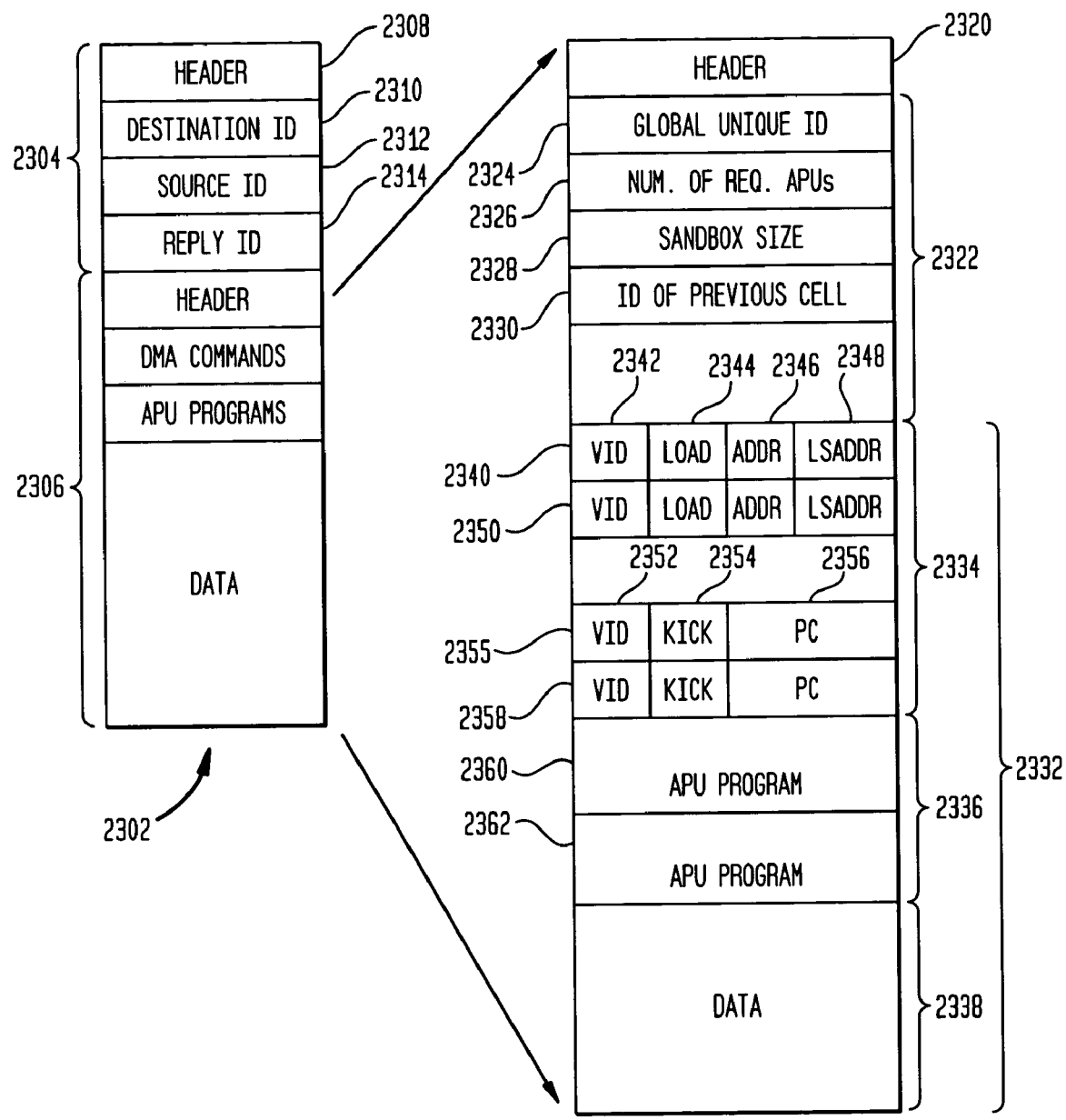
FIG. 23 illustrates the structure of a software cell in accordance with the present invention.

The structure of software cells 102 is illustrated in FIG. 23. As shown in this figure, a software cell, e.g., software cell 2302, contains routing information section 2304 and body 2306. The information contained in routing information section 2304 is dependent upon the protocol of network 104. Routing information section 2304 contains header 2308, destination ID 2310, source ID 2312 and reply ID 2314. The destination ID includes a network address. Under the TCP/IP protocol, e.g., the network address is an Internet protocol (IP) address. Destination ID 2310 further includes the identity of the PE and APU to which the cell should be transmitted for processing. Source ID 2314 contains a network address and identifies the PE and APU from which the cell originated to enable the destination PE and APU to obtain additional information regarding the cell if necessary. Reply ID 2314 contains a network address and identifies the PE and APU to which queries regarding the cell, and the result of processing of the cell, should be directed.

Cell body 2306 contains information independent of the network's protocol. The exploded portion of FIG. 23 shows the details of cell body 2306. Header 2320 of cell body 2306 identifies the start of the cell body. Cell interface 2322 contains information necessary for the cell's utilization. This information includes global unique ID 2324, required APUs 2326, sandbox size 2328 and previous cell ID 2330.

Global unique ID 2324 uniquely identifies software cell 2302 throughout network 104. Global unique ID 2324 is generated on the basis of source ID 2312, e.g. the unique identification of a PE or APU within source ID 2312, and the time and date of generation or transmission of software cell 2302. Required APUs 2326 provides the minimum number of APUs required to execute the cell. Sandbox size 2328 provides the amount of protected memory in the required APUs' associated DRAM necessary to execute the cell. Previous cell ID 2330 provides the identity of a previous cell in a group of cells requiring sequential execution, e.g., streaming data.

Implementation section 2332 contains the cell's core information. This information includes DMA command list 2334, programs 2336 and data 2338. Programs 2336 contain the programs to be run by the APUs (called "apulets"), e.g., APU programs 2360 and 2362, and data 2338 contain the data to be processed with these programs. DMA command list 2334 contains a series of DMA commands needed to start the programs. These DMA commands include DMA commands 2340, 2350, 2355 and 2358. The PU issues these DMA commands to the DMAC.

DMA command 2340 includes VID 2342. VID 2342 is the virtual ID of an APU which is mapped to a physical ID when the DMA commands are issued. DMA command 2340 also includes load command 2344 and address 2346. Load command 2344 directs the APU to read particular information from the DRAM into local storage. Address 2346 provides the virtual address in the DRAM containing this information. The information can be, e.g., programs from programs section 2336, data from data section 2338 or other data. Finally, DMA command 2340 includes local storage address 2348. This address identifies the address in local storage where the information should be loaded. DMA commands 2350 contain similar information. Other DMA commands are also possible.

DMA command list 2334 also includes a series of kick commands, e.g., kick commands 2355 and 2358. Kick commands are commands issued by a PU to an APU to initiate the processing of a cell. DMA kick command 2355 includes virtual APU ID 2352, kick command 2354 and program counter 2356. Virtual APU ID 2352 identifies the APU to be kicked, kick command 2354 provides the relevant kick command and program counter 2356 provides the address for the program counter for executing the program. DMA kick command 2358 provides similar information for the same APU or another APU.

As noted, the PUs treat the APUs as independent processors, not co-processors. To control processing by the APUs, therefore, the PU uses commands analogous to remote procedure calls. These commands are designated "APU Remote Procedure Calls" (ARPCs). A PU implements an ARPC by issuing a series of DMA commands to the DMAC. The DMAC loads the APU program and its associated stack frame into the local storage of an APU. The PU then issues an initial kick to the APU to execute the APU Program.

Figure 24:
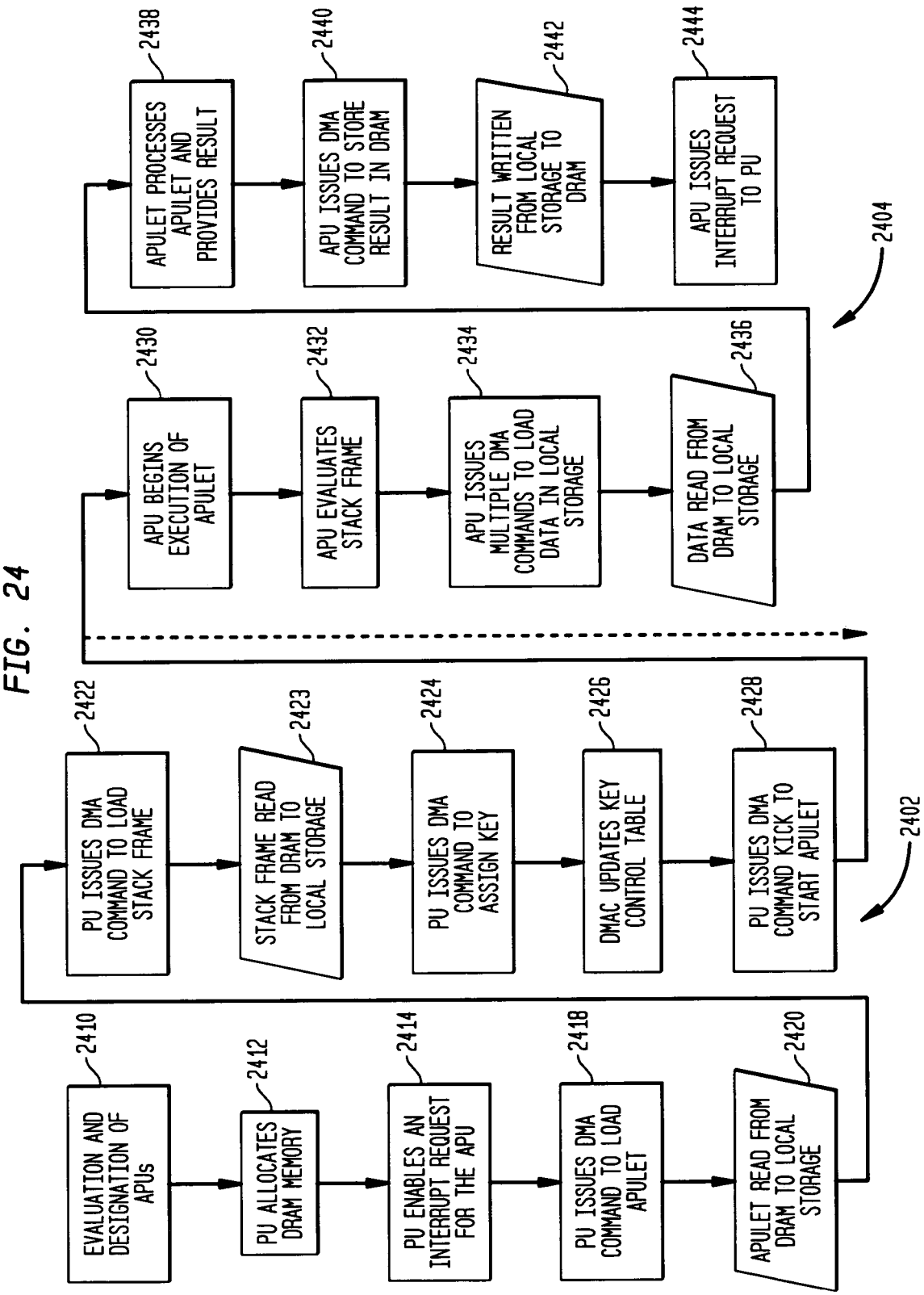
FIG. 24 is a flow diagram of the steps for issuing remote procedure calls to APUs in accordance with the present invention.

FIG. 24 illustrates the steps of an ARPC for executing an apulet. The steps performed by the PU in initiating processing of the apulet by a designated APU are shown in the first portion 2402 of FIG. 24, and the steps performed by the designated APU in processing the apulet are shown in the second portion 2404 of FIG. 24.

In step 2410, the PU evaluates the apulet and then designates an APU for processing the apulet. In step 2412, the PU allocates space in the DRAM for executing the apulet by issuing a DMA command to the DMAC to set memory access keys for the necessary sandbox or sandboxes. In step 2414, the PU enables an interrupt request for the designated APU to signal completion of the apulet. In step 2418, the PU issues a DMA command to the DMAC to load the apulet from the DRAM to the local storage of the APU. In step 2420, the DMA command is executed, and the apulet is read from the DRAM to the APU's local storage. In step 2422, the PU issues a DMA command to the DMAC to load the stack frame associated with the apulet from the DRAM to the APU's local storage. In step 2423, the DMA command is executed, and the stack frame is read from the DRAM to the APU's local storage. In step 2424, the PU issues a DMA command for the DMAC to assign a key to the APU to allow the APU to read and write data from and to the hardware sandbox or sandboxes designated in step 2412. In step 2426, the DMAC updates the key control table (KTAB) with the key assigned to the APU. In step 2428, the PU issues a DMA command "kick" to the APU to start processing of the program. Other DMA commands may be issued by the PU in the execution of a particular ARPC depending upon the particular apulet.

As indicated above, second portion 2404 of FIG. 24 illustrates the steps performed by the APU in executing the apulet. In step 2430, the APU begins to execute the apulet in response to the kick command issued at step 2428. In step 2432, the APU, at the direction of the apulet, evaluates the apulet's associated stack frame. In step 2434, the APU issues multiple DMA commands to the DMAC to load data designated as needed by the stack frame from the DRAM to the APU's local storage. In step 2436, these DMA commands are executed, and the data are read from the DRAM to the APU's local storage. In step 2438, the APU executes the apulet and generates a result. In step 2440, the APU issues a DMA command to the DMAC to store the result in the DRAM. In step 2442, the DMA command is executed and the result of the apulet is written from the APU's local storage to the DRAM. In step 2444, the APU issues an interrupt request to the PU to signal that the ARPC has been completed.

The ability of APUs to perform tasks independently under the direction of a PU enables a PU to dedicate a group of APUs, and the memory resources associated with a group of APUs, to performing extended tasks. For example, a PU can dedicate one or more APUs, and a group of memory sandboxes associated with these one or more APUs, to receiving data transmitted over network 104 over an extended period and to directing the data received during this period to one or more other APUs and their associated memory sandboxes for further processing. This ability is particularly advantageous to processing streaming data transmitted over network 104, e.g., streaming MPEG or streaming ATRAC audio or video data. A PU can dedicate one or more APUs and their associated memory sandboxes to receiving these data and one or more other APUs and their associated memory sandboxes to decompressing and further processing these data. In other words, the PU can establish a dedicated pipeline relationship among a group of APUs and their associated memory sandboxes for processing such data.

In order for such processing to be performed efficiently, however, the pipeline's dedicated APUs and memory sandboxes should remain dedicated to the pipeline during periods in which processing of apulets comprising the data stream does not occur. In other words, the dedicated APUs and their associated sandboxes should be placed in a reserved state during these periods. The reservation of an APU and its associated memory sandbox or sandboxes upon completion of processing of an apulet is called a "resident termination." A resident termination occurs in response to an instruction from a PU.

Figure 26A:
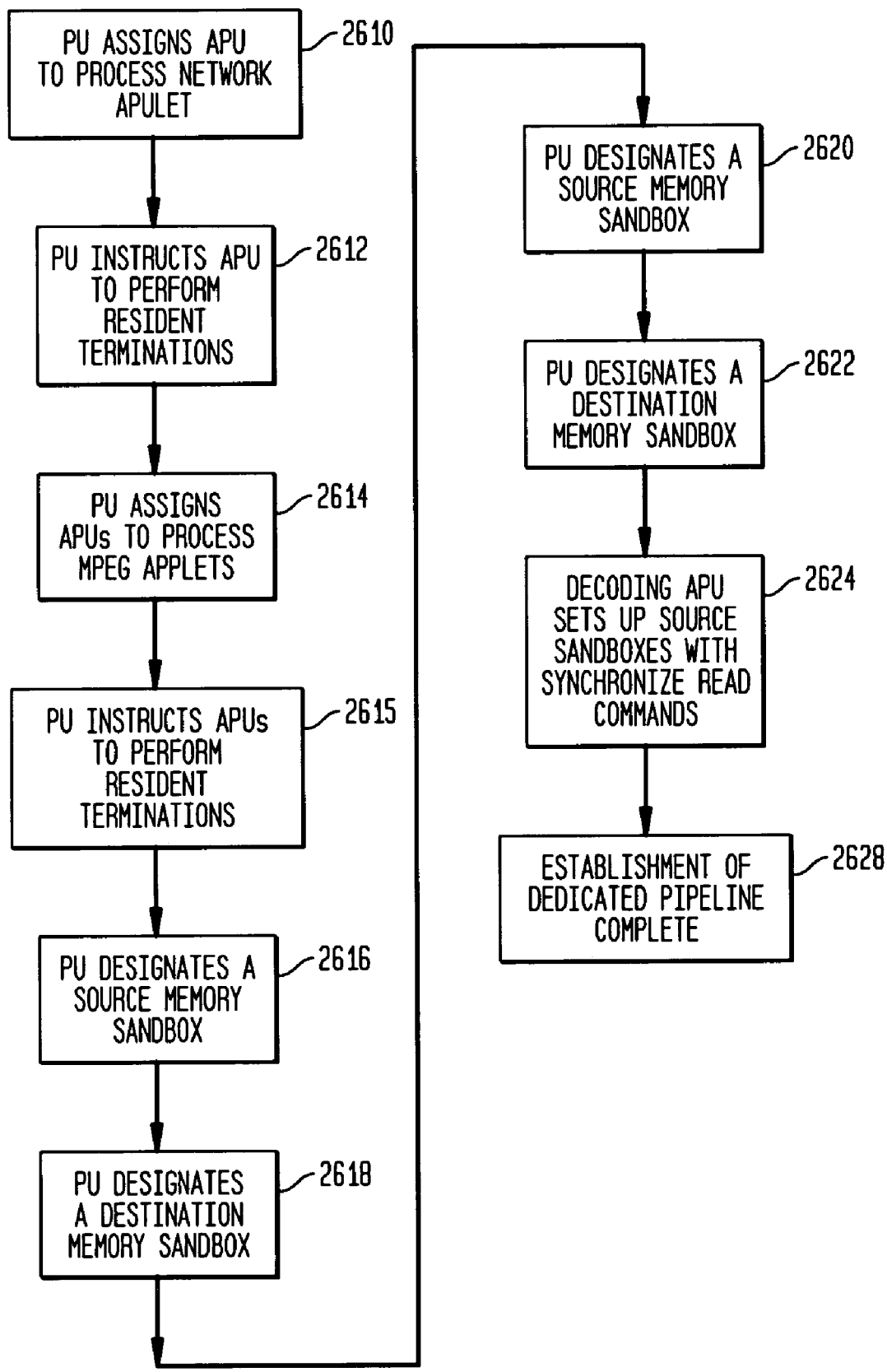
FIG. 26 is a flow diagram of the steps performed by the dedicated pipeline of FIG. 25 in the processing of streaming data in accordance with the present invention.
Figure 26B:
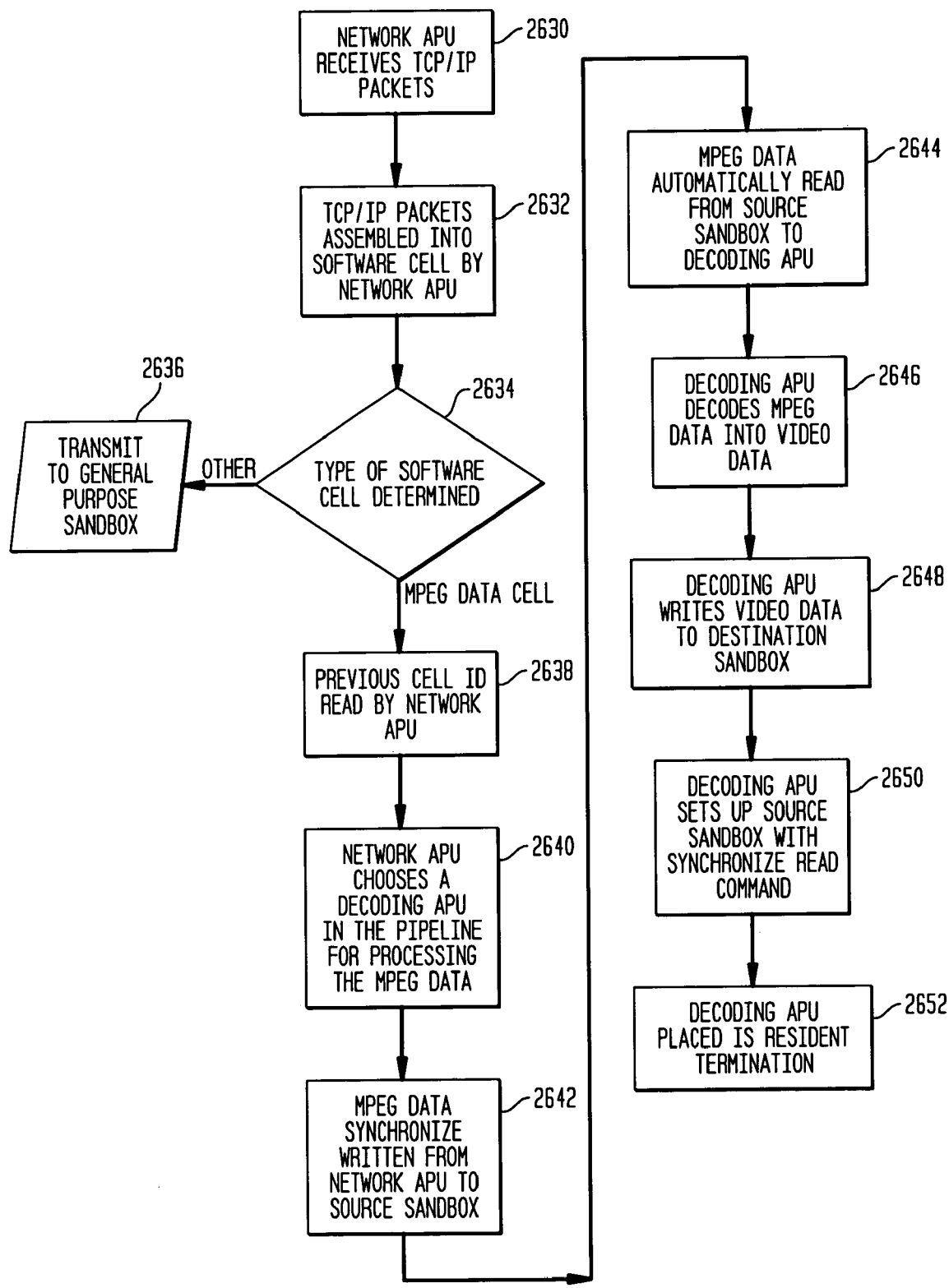

FIGS. 25, 26A and 26B illustrate the establishment of a dedicated pipeline structure comprising a group of APUs and their associated sandboxes for the processing of streaming data, e.g., streaming MPEG data. As shown in FIG. 25, the components of this pipeline structure include PE 2502 and DRAM 2518. PE 2502 includes PU 2504, DMAC 2506 and a plurality of APUs, including APU 2508, APU 2510 and APU 2512. Communications among PU 2504, DMAC 2506 and these APUs occur through PE bus 2514. Wide bandwidth bus 2516 connects DMAC 2506 to DRAM 2518. DRAM 2518 includes a plurality of sandboxes, e.g., sandbox 2520, sandbox 2522, sandbox 2524 and sandbox 2526.

FIG. 26A illustrates the steps for establishing the dedicated pipeline. In step 2610, PU 2504 assigns APU 2508 to process a network apulet. A network apulet comprises a program for processing the network protocol of network 104. In this case, this protocol is the Transmission Control Protocol/Internet Protocol (TCP/IP). TCP/IP data packets conforming to this protocol are transmitted over network 104. Upon receipt, APU 2508 processes these packets and assembles the data in the packets into software cells 102. In step 2612, PU 2504 instructs APU 2508 to perform resident terminations upon the completion of the processing of the network apulet. In step 2614, PU 2504 assigns PUs 2510 and 2512 to process MPEG apulets. In step 2615, PU 2504 instructs APUs 2510 and 2512 also to perform resident terminations upon the completion of the processing of the MPEG apulets. In step 2616, PU 2504 designates sandbox 2520 as a source sandbox for access by APU 2508 and APU 2510. In step 2618, PU 2504 designates sandbox 2522 as a destination sandbox for access by APU 2510. In step 2620, PU 2504 designates sandbox 2524 as a source sandbox for access by APU 2508 and APU 2512. In step 2622, PU 2504 designates sandbox 2526 as a destination sandbox for access by APU 2512. In step 2624, APU 2510 and APU 2512 send synchronize read commands to blocks of memory within, respectively, source sandbox 2520 and source sandbox 2524 to set these blocks of memory into the blocking state. The process finally moves to step 2628 where establishment of the dedicated pipeline is complete and the resources dedicated to the pipeline are reserved. APUs 2508, 2510 and 2512 and their associated sandboxes 2520, 2522, 2524 and 2526, therefore, enter the reserved state.

FIG. 26B illustrates the steps for processing streaming MPEG data by this dedicated pipeline. In step 2630, APU 2508, which processes the network apulet, receives in its local storage TCP/IP data packets from network 104. In step 2632, APU 2508 processes these TCP/IP data packets and assembles the data within these packets into software cells 102. In step 2634, APU 2508 examines header 2320 (FIG. 23) of the software cells to determine whether the cells contain MPEG data. If a cell does not contain MPEG data, then, in step 2636, APU 2508 transmits the cell to a general purpose sandbox designated within DRAM 2518 for processing other data by other APUs not included within the dedicated pipeline. APU 2508 also notifies PU 2504 of this transmission.

On the other hand, if a software cell contains MPEG data, then, in step 2638, APU 2508 examines previous cell ID 2330 (FIG. 23) of the cell to identify the MPEG data stream to which the cell belongs. In step 2640, APU 2508 chooses an APU of the dedicated pipeline for processing of the cell. In this case, APU 2508 chooses APU 2510 to process these data. This choice is based upon previous cell ID 2330 and load balancing factors. For example, if previous cell ID 2330 indicates that the previous software cell of the MPEG data stream to which the software cell belongs was sent to APU 2510 for processing, then the present software cell normally also will be sent to APU 2510 for processing. In step 2642, APU 2508 issues a synchronize write command to write the MPEG data to sandbox 2520. Since this sandbox previously was set to the blocking state, the MPEG data, in step 2644, automatically is read from sandbox 2520 to the local storage of APU 2510. In step 2646, APU 2510 processes the MPEG data in its local storage to generate video data. In step 2648, APU 2510 writes the video data to sandbox 2522. In step 2650, APU 2510 issues a synchronize read command to sandbox 2520 to prepare this sandbox to receive additional MPEG data. In step 2652, APU 2510 processes a resident termination. This processing causes this APU to enter the reserved state during which the APU waits to process additional MPEG data in the MPEG data stream.

Figure 27:
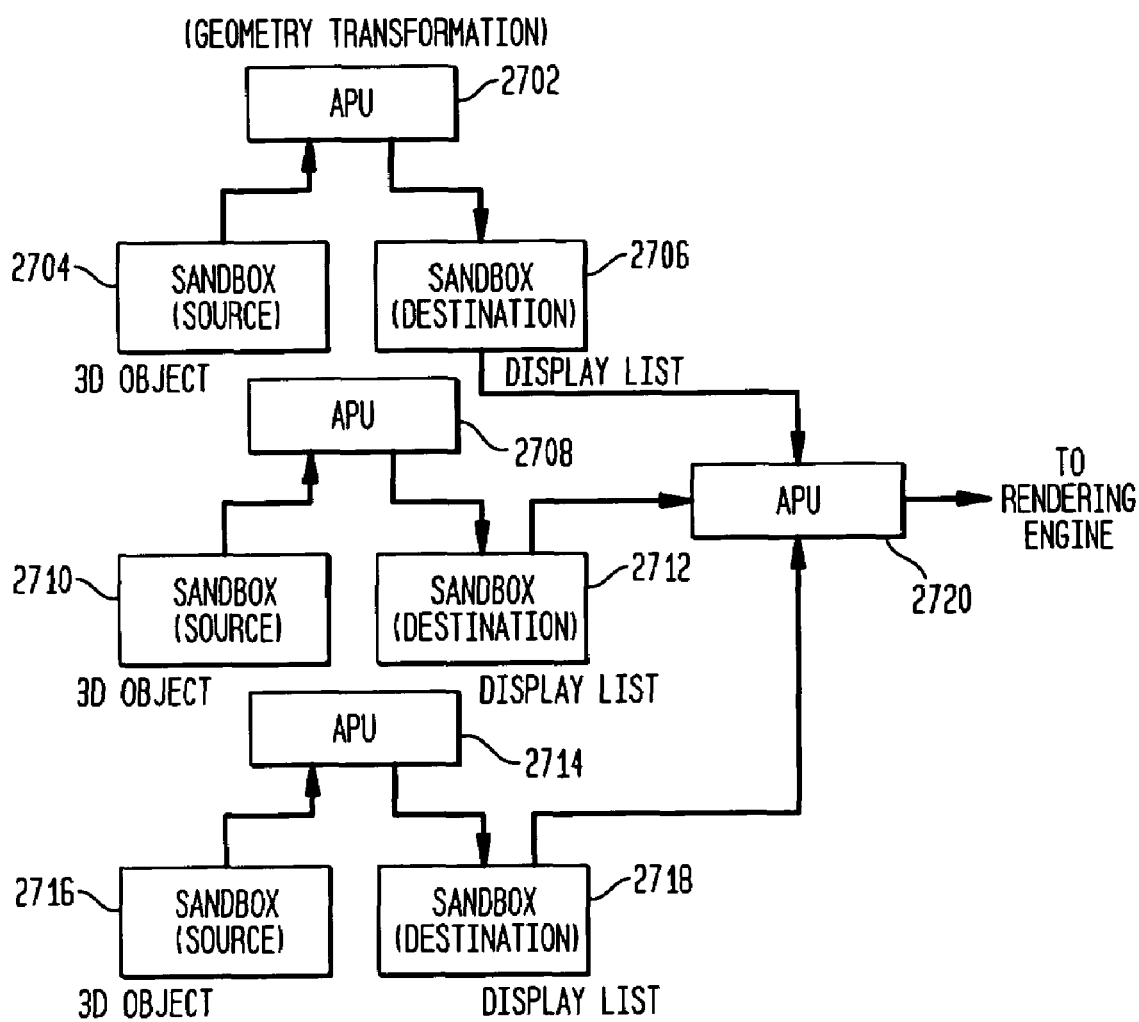
FIG. 27 illustrates an alternative structure for a dedicated pipeline for the processing of streaming data in accordance with the present invention.

Other dedicated structures can be established among a group of APUs and their associated sandboxes for processing other types of data. For example, as shown in FIG. 27, a dedicated group of APUs, e.g., APUs 2702, 2708 and 2714, can be established for performing geometric transformations upon three dimensional objects to generate two dimensional display lists. These two dimensional display lists can be further processed (rendered) by other APUs to generate pixel data. To perform this processing, sandboxes are dedicated to APUs 2702, 2708 and 2414 for storing the three dimensional objects and the display lists resulting from the processing of these objects. For example, source sandboxes 2704, 2710 and 2716 are dedicated to storing the three dimensional objects processed by, respectively, APU 2702, APU 2708 and APU 2714. In a similar manner, destination sandboxes 2706, 2712 and 2718 are dedicated to storing the display lists resulting from the processing of these three dimensional objects by, respectively, APU 2702, APU 2708 and APU 2714.

Coordinating APU 2720 is dedicated to receiving in its local storage the display lists from destination sandboxes 2706, 2712 and 2718. APU 2720 arbitrates among these display lists and sends them to other APUs for the rendering of pixel data.

Figure 28:
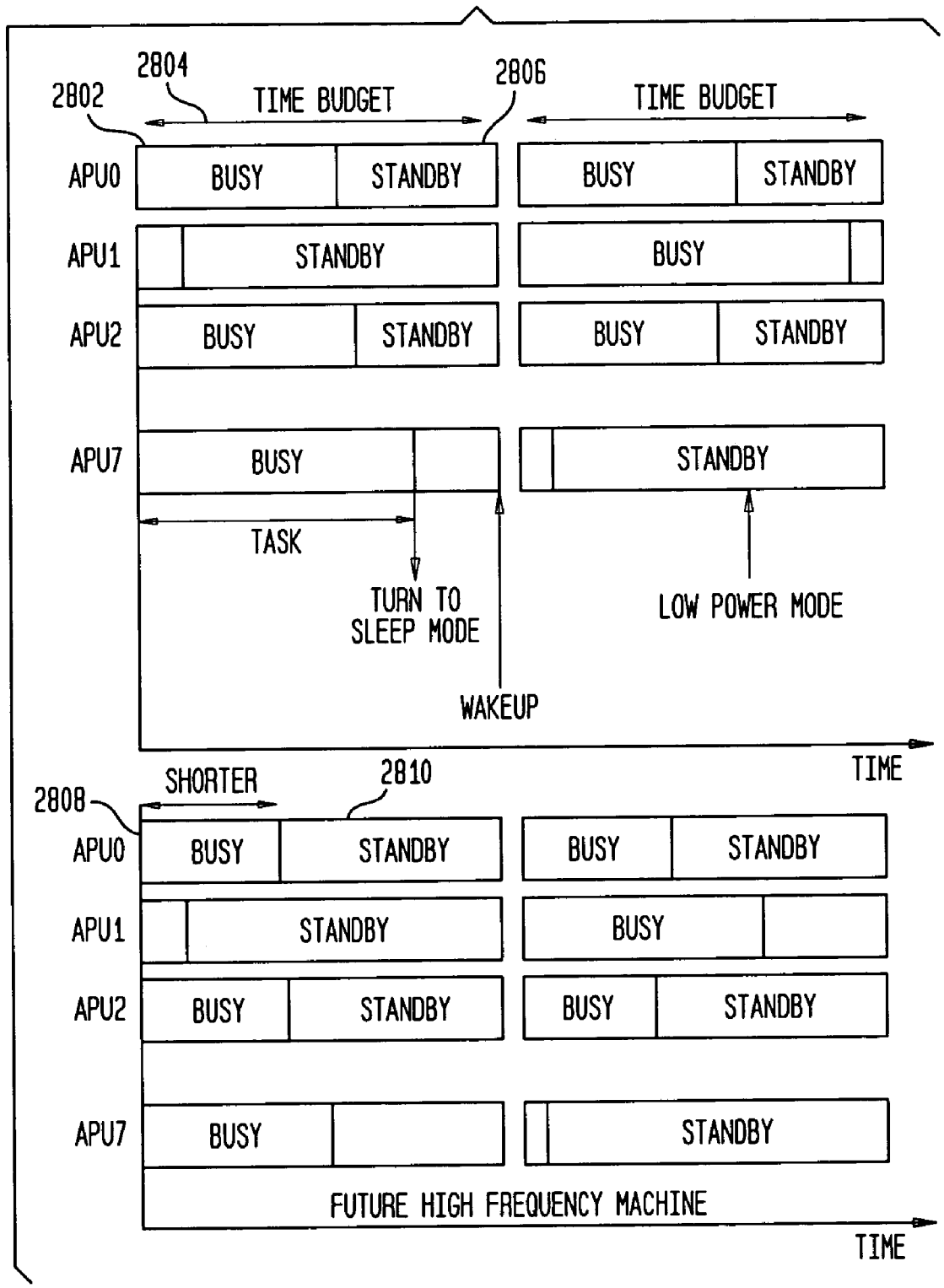
FIG. 28 illustrates a scheme for an absolute timer for coordinating the parallel processing of applications and data by APUs in accordance with the present invention.

The processors of system 101 also employ an absolute timer. The absolute timer provides a clock signal to the APUs and other elements of a PE which is both independent of, and faster than, the clock signal driving these elements. The use of this absolute timer is illustrated in FIG. 28.

As shown in this figure, the absolute timer establishes a time budget for the performance of tasks by the APUs. This time budget provides a time for completing these tasks which is longer than that necessary for the APUs' processing of the tasks. As a result, for each task, there is, within the time budget, a busy period and a standby period. All apulets are written for processing on the basis of this time budget regardless of the APUs' actual processing time or speed.

For example, for a particular APU of a PE, a particular task may be performed during busy period 2802 of time budget 2804. Since busy period 2802 is less than time budget 2804, a standby period 2806 occurs during the time budget. During this standby period, the APU goes into a sleep mode during which less power is consumed by the APU.

The results of processing a task are not expected by other APUs, or other elements of a PE, until a time budget 2804 expires. Using the time budget established by the absolute timer, therefore, the results of the APUs' processing always are coordinated regardless of the APUs' actual processing speeds.

In the future, the speed of processing by the APUs will become faster. The time budget established by the absolute timer, however, will remain the same. For example, as shown in FIG. 28, an APU in the future will execute a task in a shorter period and, therefore, will have a longer standby period. Busy period 2808, therefore, is shorter than busy period 2802, and standby period 2810 is longer than standby period 2806. However, since programs are written for processing on the basis of the same time budget established by the absolute timer, coordination of the results of processing among the APUs is maintained. As a result, faster APUs can process programs written for slower APUs without causing conflicts in the times at which the results of this processing are expected.

In lieu of an absolute timer to establish coordination among the APUs, the PU, or one or more designated APUs, can analyze the particular instructions or microcode being executed by an APU in processing an apulet for problems in the coordination of the APUs' parallel processing created by enhanced or different operating speeds. "No operation" ("NOOP") instructions can be inserted into the instructions and executed by some of the APUs to maintain the proper sequential completion of processing by the APUs expected by the apulet. By inserting these NOOPs into the instructions, the correct timing for the APUs' execution of all instructions can be maintained.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A computer processing system, said processing system comprising:
    a plurality of first processing units;
    a main memory shared by said plurality of first processing units; and
    a second processing unit for controlling said plurality of first processing units, said second processing unit being operable to dynamically assign portions of said main memory among said plurality of first processing units.

2. The computer processing system of claim 1, further comprising means for preventing certain of said plurality of first processing units from accessing said portions of main memory assigned to other ones of said plurality of first processing units.

3. The computer processing system of claim 1, further comprising a memory access controller for preventing certain of said plurality of first processing units from accessing said portions of main memory assigned to other ones of said plurality of first processing units.

4. The computer processing system of claim 1, wherein the dynamic assignment to at least one of said plurality of first processing units is based on a request to said second processing unit.

5. The computer processing system of claim 4, wherein the request comes from a software cell.

6. The computer processing system of claim 4, wherein the request includes an amount of space required from said main memory to be assigned.

7. A computer processing method, said method comprising:
    controlling a plurality of first processing units with a second processing unit; and
    dynamically assigning with said second processing unit portions of a main memory among said plurality of first processing units such that said main memory is shared among said plurality of first processing units.

8. The computer processing method of claim 7, wherein the dynamically assigning step includes the step of assigning one of said plurality of first processing units to a portion of said main memory such that the remainder of said plurality of first processing units are locked out of accessing said portion.

9. The computer processing method of claim 7, wherein the dynamically assigning step includes the step of receiving a request for assigning a portion of said memory to at least one of said plurality of first processing units.

10. The computer processing method of claim 9, wherein the request comes from a software cell.

11. The computer processing method of claim 9, wherein the request includes an amount of space required from said main memory to be assigned.

* * * * *